(12) United States Patent
Abdulhalim

(10) Patent No.: US 11,774,824 B2
(45) Date of Patent: Oct. 3, 2023

(54) SPECTRAL AND PHASE MODULATION TUNABLE BIREFRINGENCE DEVICES

(71) Applicant: Ibrahim Abdulhalim, Neveh Shalom (IL)

(72) Inventor: Ibrahim Abdulhalim, Neveh Shalom (IL)

( * ) Notice: Subject to any disclaimer, the term of this patent is extended or adjusted under 35 U.S.C. 154(b) by 0 days.

(21) Appl. No.: 18/071,713

(22) Filed: Nov. 30, 2022

(65) Prior Publication Data

US 2023/0093121 A1 Mar. 23, 2023

Related U.S. Application Data

(60) Continuation-in-part of application No. 17/234,341, filed on Apr. 19, 2021, now Pat. No. 11,567,381,
(Continued)

(51) Int. Cl.
*G02F 1/137* (2006.01)
*E06B 3/67* (2006.01)
(Continued)

(52) U.S. Cl.
CPC ............ *G02F 1/137* (2013.01); *E06B 3/6715* (2013.01); *E06B 9/24* (2013.01); *G02F 1/132* (2013.01);
(Continued)

(58) Field of Classification Search
CPC ........... E06B 2009/2464; G02F 1/1337; G02F 1/133502; G02F 1/132
See application file for complete search history.

(56) References Cited

U.S. PATENT DOCUMENTS 5,760,860 A 6/1998 Mason et al.
11,309,616 B2 * 4/2022 Lu .................... G02F 1/1313
(Continued)

FOREIGN PATENT DOCUMENTS

JP H0713137 A 1/1995
KR 20070107439 A 11/2007

OTHER PUBLICATIONS

PCT International Search Report for International Application No. PCT/IL2018/050756, dated Jan. 17, 2019, 6pp.
(Continued)

*Primary Examiner* — Mariam Qureshi
(74) *Attorney, Agent, or Firm* — The Roy Gross Law Firm, LLC; Roy Gross

(57) ABSTRACT

The present invention describes a liquid crystal composite tuneable device for fast polarisation-independent modulation of an incident light beam comprising: (a) two supporting and functional panels, at least one of them coated with a transparent conductive electrode layer and with optionally at least one additional layer selected from an alignment layer, antireflective coating layer, thermochromic or electrochromic layer, photoconductive or photosensitive layer, and (b) a composite structure sandwiched between said two panels and made of a liquid crystal and porous microparticles infiltrated with said liquid crystal. The porous microparticles have an average refractive index approximately equals to one of the liquid crystal principal refractive indices, matching that of the liquid crystal at one orientational state (for example, parallel $n_\parallel$), and exhibiting large mismatch at another orientational state (for example, perpendicular $n_\perp$). This refractive index mismatch between said microparticles and said liquid crystal is tuned by applying an external electric or magnetic field, thermally or optically.

14 Claims, 46 Drawing Sheets
(9 of 46 Drawing Sheet(s) Filed in Color)

Related U.S. Application Data which is a division of application No. 16/644,637, filed as application No. PCT/IL2018/050756 on Jul. 11, 2018, now Pat. No. 11,112,671.

(60) Provisional application No. 62/623,566, filed on Jan. 30, 2018, provisional application No. 62/553,954, filed on Sep. 4, 2017.

(51) Int. Cl.
| | | |
|---|---|---|
| *E06B 9/24* | (2006.01) | |
| *G02F 1/13* | (2006.01) | |
| *G02F 1/1335* | (2006.01) | |
| *G02F 1/13363* | (2006.01) | |
| *G02F 1/1337* | (2006.01) | |
| *G02F 1/1343* | (2006.01) | |

(52) U.S. Cl.
CPC ........ *G02F 1/1337* (2013.01); *G02F 1/13363* (2013.01); *G02F 1/13439* (2013.01); *G02F 1/133502* (2013.01); *G02F 1/133504* (2013.01); *G02F 1/133528* (2013.01); *E06B 2009/2417* (2013.01); *E06B 2009/2464* (2013.01); *G02F 1/13756* (2021.01); *G02F 1/133548* (2021.01); *G02F 1/133565* (2021.01); *G02F 1/133638* (2021.01); *G02F 2202/36* (2013.01); *G02F 2203/06* (2013.01); *G02F 2413/01* (2013.01)

(56) References Cited

U.S. PATENT DOCUMENTS

2016/0160557 A1* 6/2016 Kim .......................... E06B 9/24
427/108
2017/0307939 A1* 10/2017 Banin ............... G02F 1/133617

OTHER PUBLICATIONS

PCT Written Opinion for International Application No. PCT/IL2018/050756, dated Jan. 17, 2019, 9pp.

PCT International Preliminary Report on Patentability for International Application No. PCT/IL2018/050756, dated Mar. 10, 2020, 10pp.

* cited by examiner

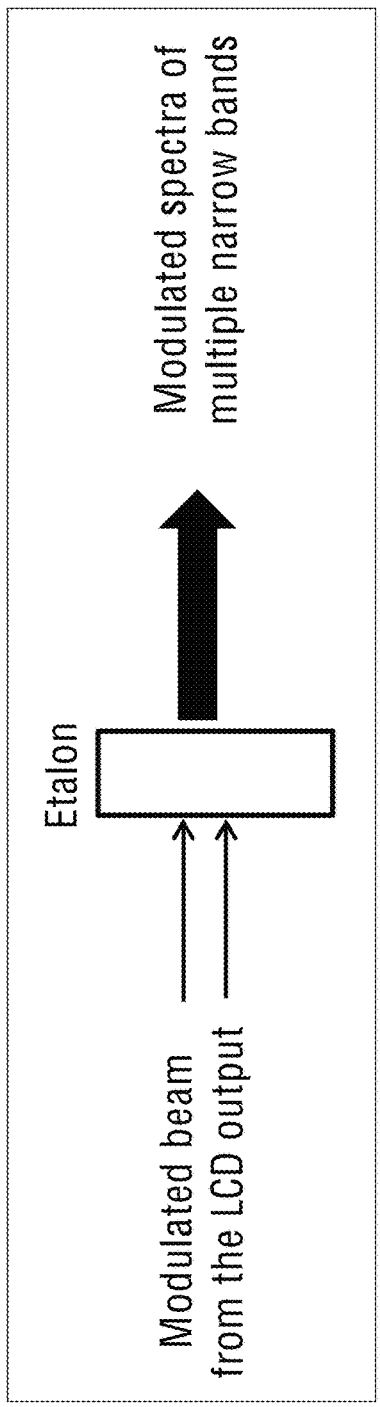
Fig. 5b
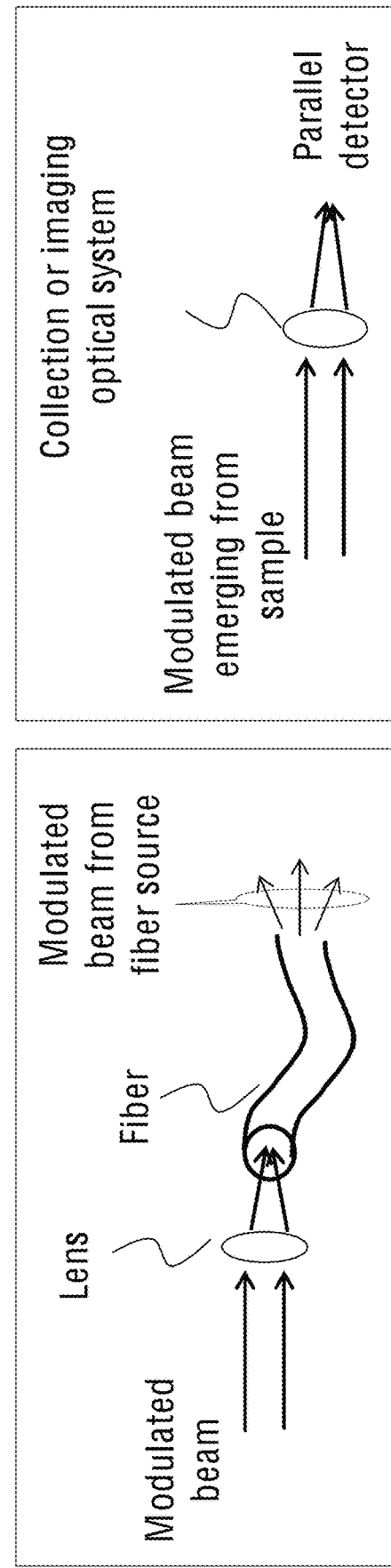
Fig. 5c
Fig. 5d

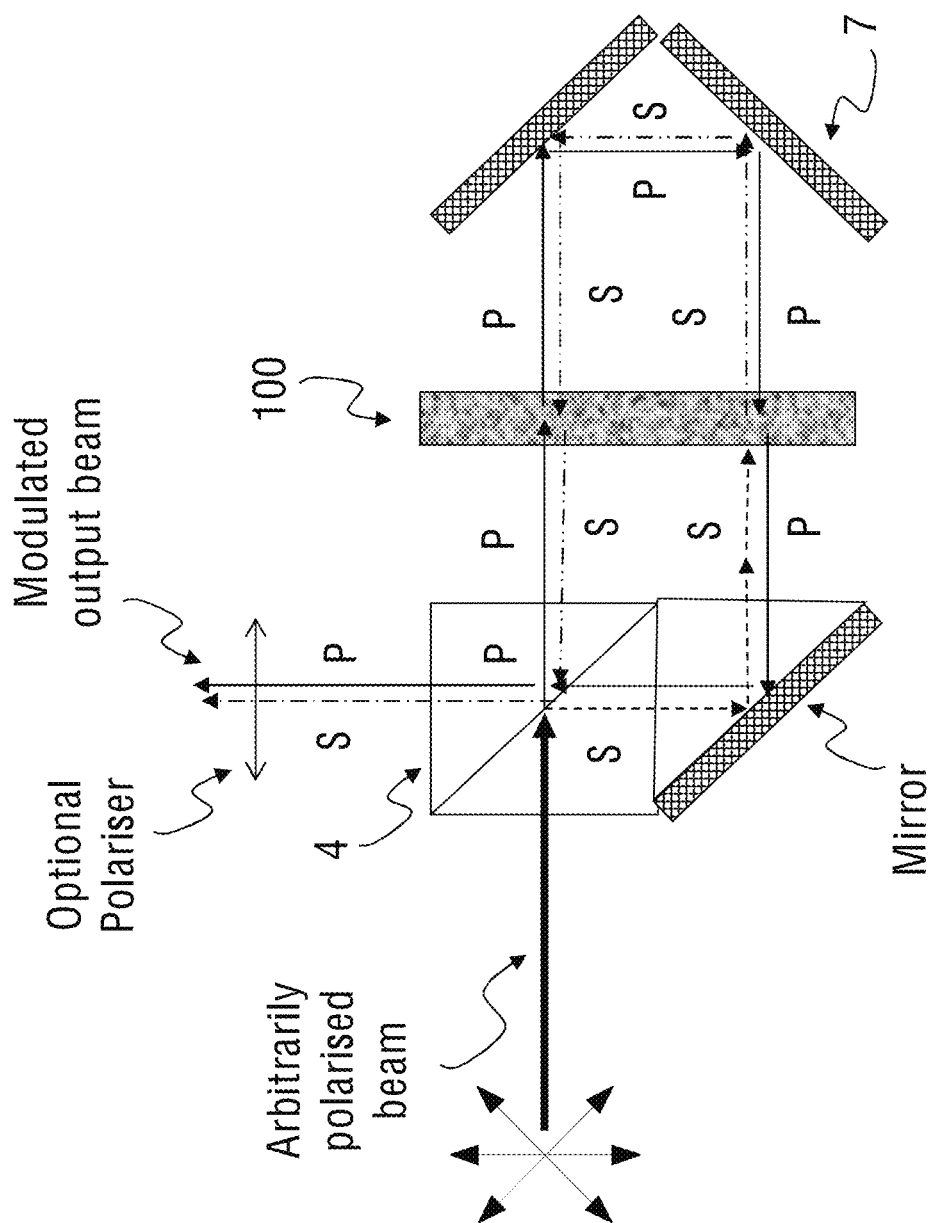

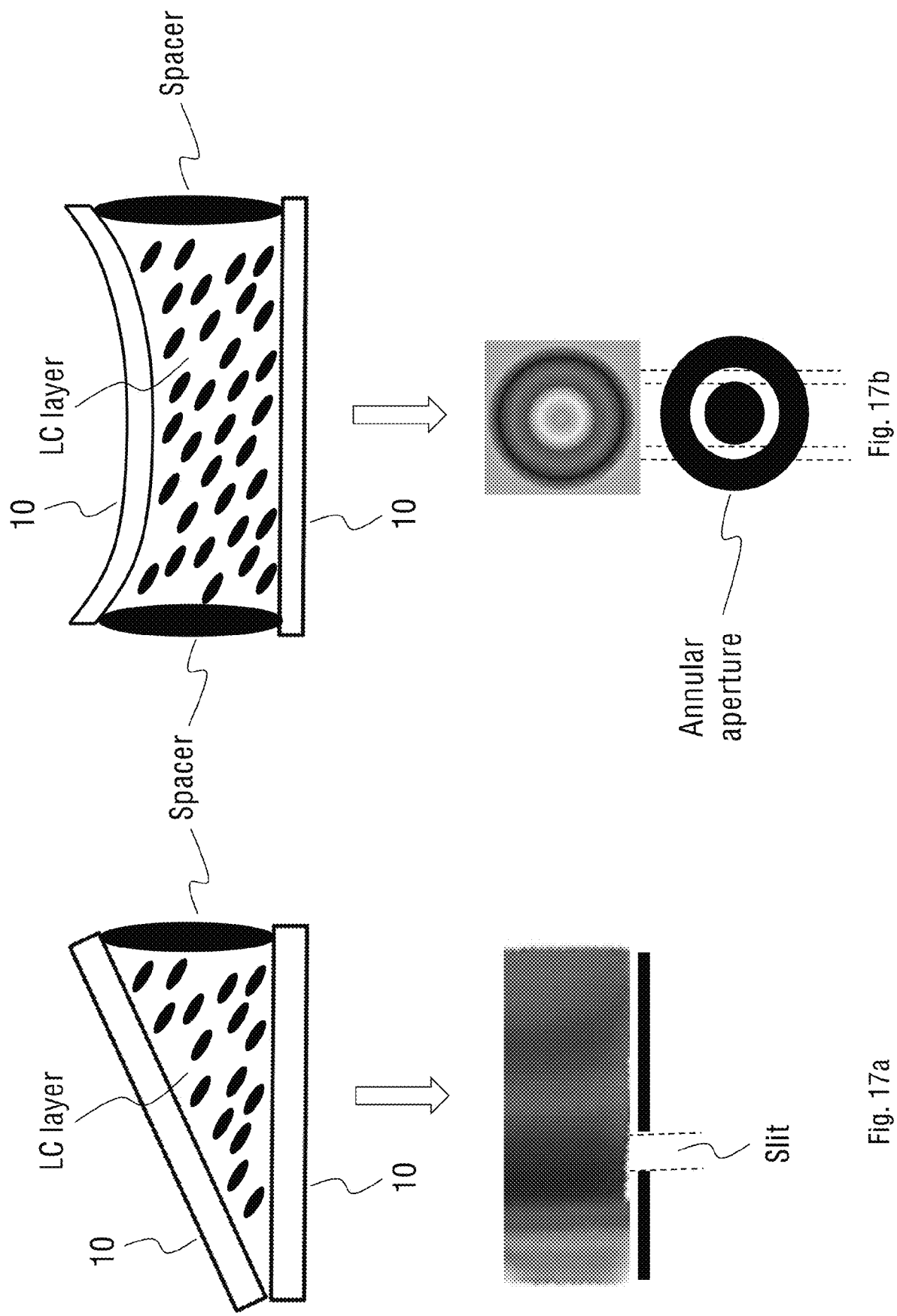

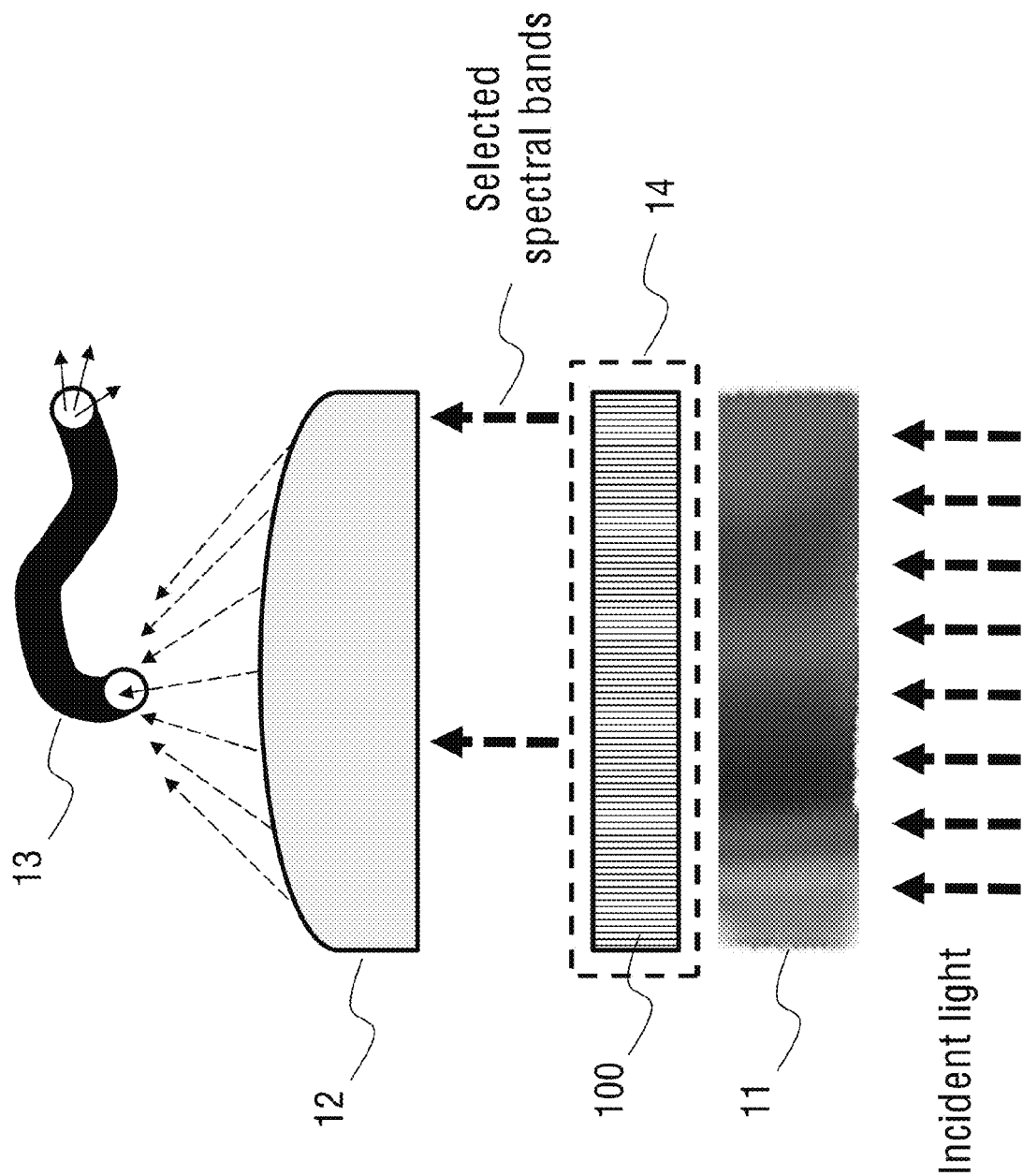

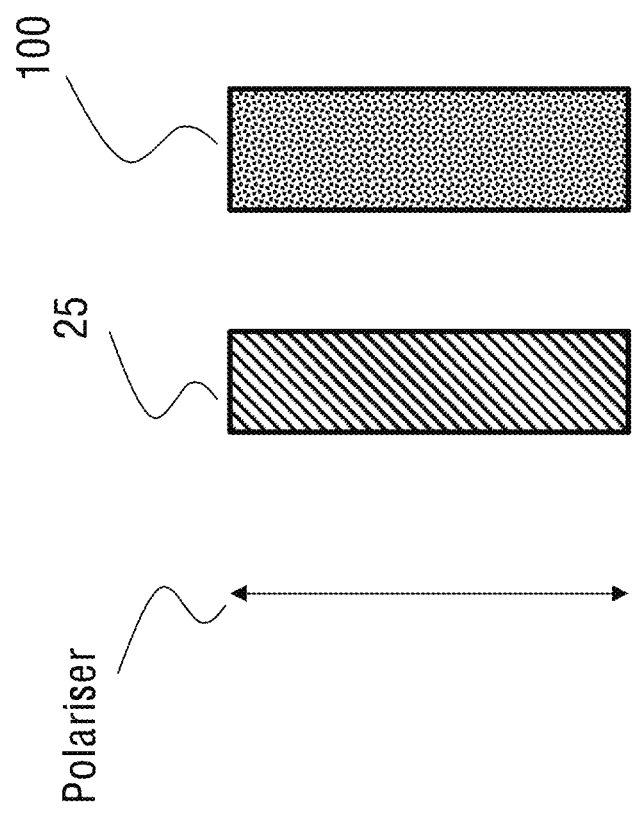

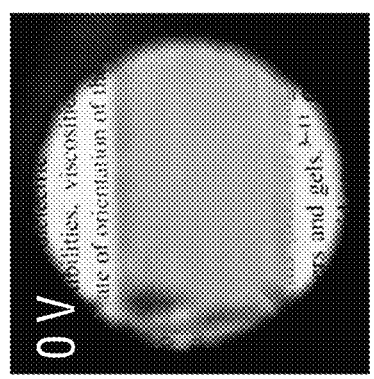 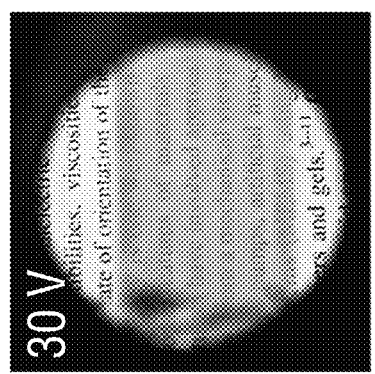
Fig. 29a
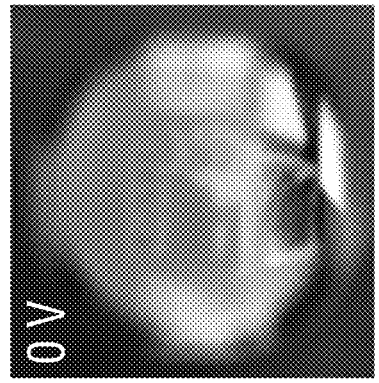 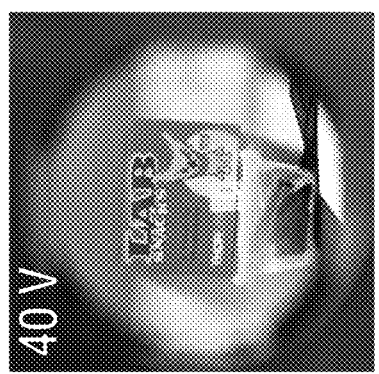
Fig. 29b

SPECTRAL AND PHASE MODULATION TUNABLE BIREFRINGENCE DEVICES

CROSS REFERENCE TO RELATED APPLICATIONS

This application is a Continuation in part of U.S. patent application Ser. No. 17/234,341 filed Apr. 19, 2021, which is a Divisional Patent Application of U.S. patent application Ser. No. 16/644,637 filed Mar. 5, 2020, Issued as U.S. Pat. No. 11,112,671 on Sep. 7, 2021, which is a National Phase of PCT Patent Application No. PCT/IL2018/050756 having International filing date of Jul. 11, 2018, which claims the benefit of and priority to U.S. Provisional Application No. 62/553,954 filed on Sep. 4, 2017 and 62/623,566 filed Jan. 30, 2018. The contents of the above applications are all incorporated by reference as if fully set forth herein in their entirety.

TECHNICAL FIELD

The present application relates to the field of tuneable spectrum, intensity and phase modulation devices. In particular, the present application relates to a liquid crystal composite tuneable device for fast polarisation-independent light modulation.

BACKGROUND

Tuneable spectrum, intensity, and phase modulation devices, such as liquid crystals, have recently become of great interest due to their ability to provide spectral filtering, intensity modulation, polarisation control, tuneable lensing and other many applications in privacy and smart windows, optical imaging, sensing and optical telecommunications. However, when it comes to practical implementation in various field systems, these devices show some serious drawbacks, such as strong incidence angle and polarisation dependence, slow speed, and narrow tuning range. These problems of tuneable and spectral modulation devices are yet to be overcome.

There are several situations where polarisation independence of incident light helps increasing the light throughput, for example in spectral imaging, privacy windows operation, vision tuneable correction and wave-front sensing through the atmosphere. In privacy windows, for instance, the light polarisation dependence is a drawback because it deteriorates the light throughput. As a result, the need for polarisers makes such privacy window extremely expensive and less efficient.

The present application describes new birefringence-tuneable devices, such as liquid crystals, which are built to solve the aforementioned problems. These devices can be used, for example, in privacy windows and other photonic applications.

SUMMARY

One of the aspects of the present application is a liquid crystal composite tuneable device for fast polarisation-independent modulation of an incident light beam comprising:
  (a) two supporting and functional panels, at least one of them coated with a transparent conductive electrode layer and with optionally at least one additional layer selected from an alignment layer, antireflective coating layer, thermochromic or electrochromic layer, photoconductive or photosensitive layer; and
  (b) a composite structure sandwiched between said two panels and made of a liquid crystal and porous microparticles infiltrated with said liquid crystal;
characterised in that:
  (i) said porous microparticles have an average refractive index approximately equals to one of the liquid crystal principal refractive indices;
  (ii) an effective refractive index of the porous microparticles matches that of the liquid crystal at one orientational state (for example, parallel $n_\parallel$) of said liquid crystal and exhibits large mismatch at another orientational state (for example, perpendicular $n_\perp$), of said liquid crystal;
  (iii) a refractive index mismatch between said microparticles and said liquid crystal is tuned by applying an external electric or magnetic field, thermally or optically; and
  (iv) concentration of said microparticles in said composite is in the range of 0.1%-50% for providing optimum contrast of the device upon switching it between different orientational states of the liquid crystal, when said device is used as a scattering device, and less than 0.1% for avoiding significant light scattering, when said device is used as a spectrum, phase, or polarisation modulator.

In a specific embodiment, said microparticles have spatial dimensions in the range of about 0.3-30 microns. These microparticles may be dielectric, organic, ceramic, magnetic, fluorescent, semiconducting, semi-metallic, or metallic. They may have a shape of tubes, rods, hollow fibres, cones, or shells. In another embodiment, these microparticles may be made of photosensitive, thermochromic or electrochromic materials. Said photo-conductive or photosensitive materials are sensitive to one part of the solar spectrum but transparent to the other part. The device of the present invention can therefore be controlled at least partially by part of the solar spectrum that generates a photovoltage or photoresistance variation on the liquid crystal. Alternatively, it can be controlled at least partially by part of the solar spectrum that generates a photovoltage or photoresistance variation on the liquid crystal, and partially by temperature of the environment.

In a further embodiment, the melting point of the microparticles is preferably less than that of the liquid crystal. In yet further embodiment, the device of the present invention is a temperature-controlled scattering device designed to scatter light above a certain temperature upon applying the external field, wherein said temperature is a melting point of the microparticles.

In a further embodiment, concentration of the microparticles in the composite is less than 30%, preferably less than 1.0%, more preferably less than 0.1%. In yet further embodiment, the microparticles may be made of oxidised or nitrogenised porous silicon, they may be formed by coagulation of nanoscale particles, and prepared lithographically, by laser patterning, embossing or by chemical etching, and randomly distributed on at least one of said panels. They may be further functionalised with an organic or inorganic molecular nano-layer.

In another embodiment, the liquid crystal of the present device has a negative dielectric anisotropy and aligned perpendicular to the plane of the panels. In still another embodiment, the liquid crystal of the present device has a negative dielectric anisotropy, and the composite structure further comprises more than 0.5% of surfactant material having a melting point preferably lower than that of the liquid crystal.

In a certain embodiment, said panels are made of transparent material, such as glass or transparent flexible material, and coated with a transparent conducting oxide to form said transparent conductive electrode layer. This transparent conductive electrode layer may be patterned into pixels and said external field is applied to each pixel separately or to a group of pixels, thereby resulting in said device being pixelated. Each pixel of this pixelated device is adjusted to modify polarisation, intensity, or phase of an optical beam, thereby turning said device into a spatial or polarisation light modulator for improving image quality and creating polarimetric or ellipsometric images. In this device, said panels may be further coated with a thin polymer layer to form the alignment layer over said transparent conductive electrode layer for providing a mono-domain alignment of the liquid crystal molecules. The alignment layer of the device may be made of random liquid crystal micro-domains by nano-patterning of said transparent conductive electrode layer or by photo-alignment of the photosensitive polymer layer. The neighbouring random liquid crystal micro-domains of the alignment layer have a large refractive index mismatch between them at one orientational state of the liquid crystal and nearly full matching at another orientational state. Said refractive index mismatch is tuned by modulating the external field strength, frequency, or duty cycle.

In a particular embodiment, the microparticles are preferably porous and preferably with porosity not exceeding about 75%. The optimum porosity of the microparticles is determined by the effective average refractive index of the microparticles infiltrated with the liquid crystal. The requirements to the effective average refractive index which guarantee that the high contrast of the device of the present invention will be achieved are stated above and can be summarised as follows:
1) The effective average refractive index must be close to the refractive index of the liquid crystal molecules in the micro-domains surrounding the microparticles at one orientational state (so that the mismatch is minimised); and
2) The effective average refractive index must be close to the other refractive index of the liquid crystal molecules in the micro-domains surrounding the microparticle at another orientational state of the molecules, governed by the applied external field (so that the mismatch is maximised).

Microparticles having low porosity or no-porosity at all may be also used in the device of the present invention, but this can affect the contrast of the device if the refractive indices of the microparticles are not matching one of the principal refractive indices of the liquid crystal at one of the orientational states. Therefore, some porosity of the microparticles can always help in meeting the criterion mentioned above for obtaining the high contrast scattering-based device, and it also helps in selection of the microparticles with a specifically required refractive index.

In a further embodiment, the photosensitive layer is an intrinsic photo-conducting layer or a photodiode layer, and the refractive index mismatch between said microparticles and said liquid crystal is optically tuneable. In yet further embodiment, the panels are partially transparent and said device is of a wedge type. The panels of the wedge-type device may be coated with a transparent electrode layer and with an alignment layer, and the said device is designed to produce colour interference bands on the facets of the wedge, said coloured bands are selected serially using a slit aperture tuneable with the applied external field and correspond to the maxima in transmission or reflection. The wedge may be spherical, and the produced colour bands appear as the colour concentric rings on the surface and are configured to be selected using the annular aperture. In a particular embodiment, the device of the present invention is used as a tuneable birefringent or tuneable phase plate.

Another aspect of the present application is a polarisation liquid-crystal retarder system for obtaining polarisation-independent phase or spectrum modulation, comprising at least one device of the present invention and at least one polarised beam splitter installed in at least one channel, said beam splitter is configured to split a polarised light beam into two orthogonally polarised and collimated beams, and said system has a Mach-Zehnder interferometer configuration. This system may comprise two devices of the present invention and two said polarised beam splitters installed in two channels for two-channel operation of said system.

In a further embodiment, the polarisation liquid-crystal retarder system comprises the device of the invention, a polarised beam splitter configured to split a polarised light beam into two orthogonally polarised and collimated beams directed into two arms, and two polarisation mirrors installed in said arms, said arms are glued with a refractive-index matching glue to the sides of the polarised beam splitter, and said system has a Michelson interferometer configuration. In yet further embodiment, the polarisation liquid-crystal retarder system comprises the device of the invention, a polarised beam splitter, and a retroreflector or polarisation conversion mirror, said beam splitter is configured to split a polarised light beam into two orthogonally polarised and collimated beams, and said system has a Sagnac interferometer configuration. In another embodiment, the polarisation liquid-crystal retarder system comprises the device of the invention and two Wollaston or Rochon polarisers, wherein said two polarisers are configured to split a light beam into two orthogonally polarised beams with a small angle between them. In still another embodiment, the polarisation liquid-crystal retarder system comprises the device of the invention and two dielectric mirrors or two polarisation conversion mirrors, wherein said system has a Fabry-Perot interferometer configuration.

A further aspect of the present invention is an imaging system for minimising an angular dependence of a phase retardation comprising the two devices of the invention, said two devices are anti-parallel aligned and positioned at 180 degrees to each other.

Yet further aspect of the present invention is a tuneable filtering system for filtering an incident light beam comprising at least one pixelated device of the present embodiments, wherein said device is integrated within a polarisation-independent assembly, said system is configured to select one or more different transmitted spectral passbands at a time. This system may further comprise a passive linearly variable bandpass filter and/or a lens sub-system configured to direct the filtered light beam and couple it into an optical fibre or focus it onto an imaging or sensing device.

The polarisation-independent assembly of this system may comprise two polarisers positioned either in a parallel or crossed configuration so that the external field applied to each pixel or the group of pixels facing the beam coming from one single spectral passband is transmitted, while all other spectral bands are blocked. In a specific embodiment, this system comprises the three pixelated devices, wherein two of them form a two-stage Lyot filter, and the third device is installed between said two polarisers positioned in the crossed configuration, said third device is thus capable of blocking side interferences of the Lyot filter, thereby improving the dynamic range of said tuneable filtering system by approximately the factor of two. Each one of the three pixilated devices in this system may be installed between said two polarisers positioned in the crossed configuration.

In another embodiment, the tuneable filtering system, comprising at least one pixelated device of the present embodiments, further comprises a dispersive element producing an array of the filtered light beams. This dispersive element may be a prism or grating.

In still another embodiment, the tuneable filtering system, comprising at least one pixelated device of the present embodiments, further comprises a passive wedged cavity, mirrors, lenses, and polarised beam splitters, said system is configured to operate in a reflection mode without the external field applied to said devices. The wedged cavity may be empty or filled with any passive material.

A still another aspect of the present invention is a double-focus optical system comprising the device of the invention, a birefringent plate, a lens, or a lens sub-system installed in the path of a converging beam. An example of said lens sub-system is a microscope objective.

A further aspect of the present invention is an orthogonally-polarised-beam in-line interferometer for performing optical measurements of an object comprising:
  a) the double-focus optical system of the present embodiments;
  b) an illumination unit directing the incident light beam onto the microscope objective of the double-focus optical system;
  c) a beam splitter installed in the path of the incident light beam between the illumination unit and the microscope objective;
  d) a phase-retardation modulator installed above the beam splitter and configured to phase-modulate a combined beam;
  e) a polarisation splitting mirror, which may be made of a planar wire grid polariser and oriented with one side of said polariser facing the object, wherein said mirror is capable of reflecting only an ordinary wave component of the light beam and installed after the device of the invention at the focal plane of the ordinary wave component, thereby producing a reference beam;
  f) at least two non-polarising beam splitters configured to split the combined beam into at least three beams directed towards three detectors; and
  g) at least three achromatic waveplates with their polarisers installed in front of each of said detectors, thereby configured to produce at least three different phase-shifted signals in parallel;
wherein to preform optical measurements with said interferometer, said object is placed at the focal plane of the extraordinary wave component of the light beam.

Yet further aspect of the present invention is an orthogonally polarised beam in-line interferometer for operating with circularly polarised beams and for performing optical measurements of an object comprising:
  a) the double-focus optical system of the present embodiments, wherein the device of the invention further comprises a birefringent helical structure capable of reflecting one circular polarisation and transmitting the other;
  b) an illumination unit directing the incident light beam onto the microscope objective of the double-focus optical system;
  c) a beam splitter installed in the path of the incident light beam between the illumination unit and the microscope objective;
  d) a phase-retardation modulator installed above the beam splitter and configured to phase-modulate a combined beam;
  e) a quarter waveplate installed between said helical structure and the object, and within the temporal coherence region of the light beam, thereby making both left and right circularly polarised beams reflected from within the focal region of the objective; and
  f) at least two beam splitters configured to split the combined beam into at least three beams directed towards three detectors, wherein polarisers installed in front of each of said detectors are oriented at different angles for providing at least three different phase shifts between the two recombined circularly polarised beams.

Another aspect of the present invention is a wide-range tuneable spectral filter comprising a coupling medium coated directly with a multilayer resonant structure, or connected optically with index matching fluid to a substrate coated with the resonant multilayer structure, said multilayer structure reflects a narrowband tuned by varying the angle of incidence or the refractive index or thickness of one of the layers, wherein said resonant multilayer structure comprising:
  (a) A thin absorbing layer placed in contact with said coupling medium;
  (b) A low refractive index dielectric layer deposited on top of said absorbing layer;
  (c) The liquid crystal layer of the present invention superimposed on top of said dielectric layer as a waveguide layer;
  (d) A top cladding layer with low refractive index to separate the optical field from approaching the next electrode layer;
  (e) A transparent top electrode layer coating the top panel of said top cladding layer;
  (f) A top substrate of low refractive index acting as semi-infinite dielectric medium substrate on which the top cladding layer and the transparent top electrode layer are deposited; and
  (g) Liquid crystal alignment layers deposited both on the bottom and top cladding layers oriented so that maximum tunability is obtained by applying electric or magnetic fields on the liquid crystal.

In a particular embodiment, said one of the layers of the multilayer structure acts as a waveguide. In another particular embodiment, said thin absorbing layer placed in contact with said coupling medium is conducting. It is optionally made of Cr or W so it can act as a bottom electrode in addition to functioning as the source for broadband absorption under total internal reflection conditions. In a specific embodiment, said top cladding layer with low refractive index and/or said top substrate of low refractive index is made of magnesium fluoride or silica oxide.

The coupling medium in this wide-range tuneable spectral filter may be a prism, gratings, a waveguide, or an optical fibre. In a specific embodiment, said coupling medium has a high refractive index, such as 1.7 or higher. In a further specific embodiment, the absorbing layer is a conducting metal, such as chromium or tungsten, having thickness, for example, 4-8 nm for the visible or near infrared range or thicker, such as 15 nm for the short-wave infrared range. The exemplified low refractive index dielectric cladding layers are magnesium fluoride or silica oxide having thickness, for example, in the range of 100-1500 nm depending on the wavelength range used.

In a particular aspect of the present invention, a smart window or a privacy window comprises the device of the invention. The smart or privacy window may comprise the device of the invention, wherein its microparticles are capable of strongly scattering the infrared radiation from the sun and partially reflecting or absorbing it, while transmitting the light in the visible range, thereby making said window thermochromic smart and privacy window at the same time. These microparticles may be made of vanadium oxide, germanium-antimony-tellurium chalcogenide glass, zinc oxide, tungsten oxide or titanium oxide.

In a further embodiment, the smart window or privacy window comprises the device of the invention having the photosensitive layer, wherein said photosensitive layer is an intrinsic photo-conducting layer or a photodiode layer, and the refractive index mismatch between said microparticles and said liquid crystal is optically tuneable, said window is designed to self-control its transparency depending on the incident light intensity. Bias voltages may be applied on the photosensitive and liquid crystal layers to maximise the optical tuning effect. Alternatively, if the optical tuning effect is large enough, the two transparent electrodes maybe shorted in order for the device to return to its original state when the tuning optical field is missing. The self-controlled transparency device maybe used as an energy saving privacy window, protection window against laser or any UV radiation, or as eye goggles with self-controlled transparency.

The smart window or privacy window of the invention may further comprise an achromatic waveplate and a polariser, said waveplate is tuneable and designed to manipulate the polarisation state of the incident light and its transmission through said device, said device is in turn controlled via said tuneable achromatic waveplate. Said polariser may be reflective or a metallic wire-grid polariser configured to reflect one polarisation component of unpolarised light and transmit its other polarisation component.

In yet further embodiment, the liquid crystal in the device of the invention used in the smart window or privacy window may be a helical anisotropic or helical photonic structure prepared by the oblique angle deposition technique, said liquid crystal is capable of reflecting only circular polarisation having the same helicity of the helical structure and transmitting the circular polarisation having the opposite helicity. This helical anisotropic liquid crystal may be chiral smectic, cholesteric or heliconical.

In another embodiment, the tuneable achromatic waveplate in the device of the invention used in the smart window or privacy window is configured to be switched-on, thereby acting as an achromatic quarter waveplate, and thus, turning the light passing through it to circularly polarised with the opposite helicity to the helix of said helical structure. In still another embodiment, said tuneable achromatic waveplate is configured to be switched-off, thereby acting as a quarter waveplate with 180-degrees phase retardation shift from the previous state, and thus, turning the light passing through it to circularly polarised with the same helicity as the helix of said helical structure. In an additional embodiment, said tuneable achromatic waveplate is configured to be switched at intermediate state, thereby providing elliptically polarized light, and thus controlling gradually the light passing through the window. In a particular embodiment, the pitch and birefringence of the helical structure are selected to exhibit the circular Bragg reflection phenomenon in the infrared range, and the achromatic waveplate is designed to operate in that same range.

A further aspect of the present invention is the device of the invention used as a tuneable birefringent or tuneable phase plate, wherein said tuneable birefringent or tuneable phase plate is a tuneable-focus achromatic liquid-crystal Fresnel diffractive-type lens made of annular regions. Each annulus in this lens is divided into several sub-annuli so that different external fields are applied to each sub-region to cause the focal lengths of all wavelengths within wide spectral range to coincide or to cause extension of the depth of field. This device can also be used as a tuneable focus achromatic lens made by combining a passive diffractive Fresnel lens with a tuneable liquid crystal lens so that the external fields applied to the liquid crystal lens cause dispersion compensation and an achromatic combined focal length is achieved. The annular regions and sub-regions of the lens of this embodiment may be replaced with rectangular regions and sub-regions so that the tuneable achromatic lens becomes a tuneable achromatic cylindrical lens wherein two of such cylindrical lenses oriented at 90 degrees to each other function as tuneable achromatic lens.

Various embodiments may allow various benefits and may be used in conjunction with various applications. The details of one or more embodiments are set forth in the accompanying figures and the description below. Other features, objects and advantages of the described techniques will be apparent from the description and drawings and from the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Disclosed embodiments will be understood and appreciated more fully from the following detailed description taken in conjunction with the appended figures. The drawings included and described herein are schematic and are not limiting the scope of the disclosure. It is also noted that in the drawings, the size of some elements may be exaggerated and, therefore, not drawn to scale for illustrative purposes. The dimensions and the relative dimensions do not necessarily correspond to actual reductions to practice of the disclosure.

FIG. 1a illustrates a scattering state of the device in which the microparticles infiltrated with the liquid crystal molecules act as scattering centres due to large refractive index mismatch.

FIG. 1b illustrates a transparent state of the device in which the liquid crystal molecules are oriented on the average along one direction and hence, the refractive index mismatch is minimized.

FIG. 3a illustrates random micro-fibres inside the liquid crystal medium.

FIG. 3b illustrates random micro-posts or micro-walls oriented almost perpendicular between the two transparent panels, and the liquid crystal molecules filling the space between them.

FIG. 3c shows a skeleton structure of the micro-posts filled with the liquid crystal.

FIG. 3d shows a mesoporous matrix of random micro-fibres filled with the liquid crystal.

FIG. 3e illustrates an exemplary device of the embodiments with one of the panels having different micro-domains (R1-R5) that can induce different liquid crystal molecular orientations.

FIG. 5b schematically shows the output of the LCD modulated beam received from the system shown in FIG. 5a onto an etalon.

FIG. 5c schematically shows the output of the LCD modulated beam received from the system shown in FIG. 5a into an optical fibre and use thereof remotely as a light source.

FIG. 5d schematically shows the output of the LCD modulated beam received from the system shown in FIG. 5a and passed through a sample onto collection or imaging optical system for measuring the spectral characteristics of the sample.

FIG. 8a schematically shows a liquid-crystal retarder system with improved light throughput based on the Sagnac interferometer configuration.

FIG. 16a shows a patterned vertically aligned mode of the LCD of the present invention.

FIG. 16b shows a multi-domain vertically aligned mode of the LCD of the present invention.

FIG. 17a schematically shows a wedge-type LCD of the present embodiments with partially reflecting panels and producing interference-coloured bands at its facet which can be selected serially using the slit aperture.

FIG. 17b schematically shows a spherical-type LCD of the present embodiments with partially reflecting panels and producing interference-coloured concentric rings at its facet which can be selected using the annular aperture.

FIG. 18 schematically shows a tuneable filtering system comprising the LCD of the present invention with a passive variable bandpass filter.

FIG. 24b schematically shows a wide-range tuneable spectral filter comprising the LC layer 100 of the present invention acting as the waveguide layer within a resonantly reflective multi-layered guided wave structure together with top cladding layer 22b to prevent the guided mode optical field from reaching the top electrode to prevent losses and the two LC alignment layers 100a.

FIG. 28 schematically shows a smart or privacy window comprising a polariser, a tuneable achromatic waveplate and the LCD of the present invention.

FIGS. 29a-29b shows a prototype privacy window of the present invention with no voltage applied on the left and with applied voltage on the right.

FIG. 29a shows the prototype privacy window based on the liquid crystal composite tuneable device of the present invention comprising the porous microparticles made of porous silica of about 2-3 µm in size and 4% concentration. The liquid crystal used in this example is Nematic BL036 purchased from Merck, and the gap thickness was 12 µm.

FIG. 29b shows the prototype privacy window based on the liquid crystal composite tuneable device of the present invention comprising the non-porous microparticles made of non-porous silica of about 2-3 µm in size and 4% concentration. The liquid crystal used in this example is Nematic BL036 purchased from Merck, and the gap thickness was 12 µm.

DETAILED DESCRIPTION

Figure 1B:
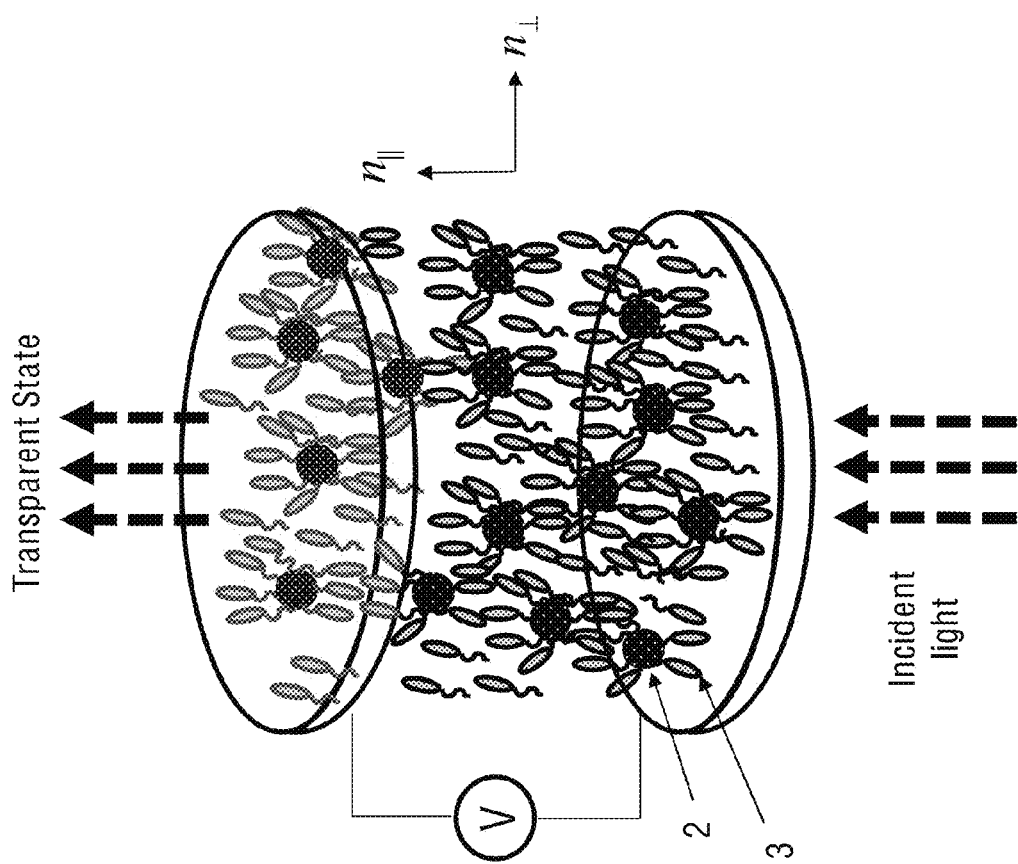
FIGS. 1a-1b schematically show the porous microparticles embedded in the liquid crystal composite tuneable device of the present invention for polarisation-independent scattering.

In the following description, various aspects of the present application will be described. For purposes of explanation, specific configurations and details are set forth in order to provide a thorough understanding of the present application. However, it will also be apparent to one skilled in the art that the present application may be practiced without the specific details presented herein. Furthermore, well-known features may be omitted or simplified in order not to obscure the present application.

The term "comprising", used in the claims, is "open ended" and means the elements recited, or their equivalent in structure or function, plus any other element or elements which are not recited. It should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising x and z" should not be limited to devices consisting only of components x and z. Also, the scope of the expression "a method comprising the steps x and z" should not be limited to methods consisting only of these steps.

Unless specifically stated, as used herein, the term "about" is understood as within a range of normal tolerance in the art, for example within two standard deviations of the mean. In one embodiment, the term "about" means within 10% of the reported numerical value of the number with which it is being used, preferably within 5% of the reported numerical value. For example, the term "about" can be immediately understood as within 10%, 9%, 8%, 7%, 6%, 5%, 4%, 3%, 2%, 1%, 0.5%, 0.1%, 0.05%, or 0.01% of the stated value. In other embodiments, the term "about" can mean a higher tolerance of variation depending on for instance the experimental technique used. Said variations of a specified value are understood by the skilled person and are within the context of the present invention. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges, for example from 1-3, from 2-4, and from 3-5, as well as 1, 2, 3, 4, 5, or 6, individually. This same principle applies to ranges reciting only one numerical value as a minimum or a maximum. Unless otherwise clear from context, all numerical values provided herein are modified by the term "about". Other similar terms, such as "nearly", "substantially", "generally", "up to" and the like are to be construed as modifying a term or value such that it is not an absolute. Such terms will be defined by the circumstances and the terms that they modify as those terms are understood by those of skilled in the art. This includes, at very least, the degree of expected experimental error, technical error and instrumental error for a given experiment, technique or an instrument used to measure a value.

As used herein, the term "and/or" includes any and all combinations of one or more of the associated listed items. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached to", "connected to", "coupled with", "contacting", etc., another element, it can be directly on, attached to, connected to, coupled with, or contacting the other element or intervening elements may also be present. In contrast, when an element is referred to as being, for example, "directly on", "directly attached to", "directly connected to", "directly coupled" with or "directly contacting" another element, there are no intervening elements present. It will also be appreciated by those of skill in the art that references to a structure or feature that is disposed "adjacent" another feature may have portions that overlap or underlie the adjacent feature.

In one aspect of the present invention, a liquid crystal composite tuneable device (hereinafter, "liquid crystal device", or "LCD" for the sake of simplicity) (100) for fast polarisation-independent modulation of a light beam comprises:

(a) at least two transparent panels, each coated with a transparent conductive electrode layer and at least one of the layers selected from alignment layer, antireflective coating layer, thermochromic layer, or photosensitive layer, and (b) a composite structure made of liquid crystal and porous microparticles infiltrated with said liquid crystal, said composite structure is sandwiched between said transparent panels;

characterised in that:

(i) said porous microparticles infiltrated with said liquid crystal have an average refractive index approximately equal to one of the liquid crystal principal refractive indices;

(ii) an effective refractive index of the porous microparticles matches that of the liquid crystal at one orientational state (for example, parallel $n_{81}$) of said liquid crystal and exhibits large mismatch at the other orientational state (for example, perpendicular $n_\perp$), of said liquid crystal;

(iii) a refractive index mismatch between said microparticles and said liquid crystal is tuned by applying an external electric or magnetic field, thermally or optically; and (iv) the microparticles concentration in said composite is less than 50% for providing optimum contrast of the device upon switching it between different orientational states of the liquid crystal for privacy and smart window applications, and preferably less than 0.1% for avoiding significant light scattering on the microparticles for other photonic applications.

In general, an index-matching material is a substance, such as liquid, gel or liquid crystal, which has a refraction index that closely approximates that of another substance, such as glass or polymer. When the two substances with the same index are in contact, light passes from one to the other with neither reflection, nor refraction or scattering. A mismatch between the refraction indices of the two substances in optical devices usually causes serious problems, such as spherical aberration, reduction of the effective numerical aperture by total internal reflection, and "fish tank" effect. However, the "refractive index mismatch" finds its application in the present invention as will be discussed below.

The composite structure of the present embodiment, made of liquid crystal and porous microparticles, is used in the LCD to modulate the incident light intensity with no polarisation dependence. Such device can therefore be used as a controlled transparency window. The idea behind the invention is that the refractive index mismatch between the microparticles and the liquid crystal, which surrounds and infiltrates these microparticles, is tuneable upon applying external fields such as electric or magnetic. The refractive index mismatch can also be tuneable under thermal or optical impact.

By a "microparticle" we mean a particle having spatial dimensions typically in the range of about 0.5-20 microns. The porous microparticles may be dielectric, magnetic, or metallic, preferably with high porosity, and may have a shape of tubes, rods, hollow fibres or shells. The aforementioned size of these microparticles is approximately in the order of magnitude or larger than the incident light wavelength.

The porous microparticles are advantageous over non-porous microparticles, since the surrounding liquid crystal molecules in the composite can infiltrate the pores of the microparticles and change the refractive index to achieve optimum modulation of the scattering. Another advantage of the porous microparticles is that their density becomes close to that of the LC as they get infiltrated with the LC molecules and therefore sedimentation effects are minimized. The transparency of such device is thus polarisation-independent and can be tuned with electric, magnetic, optical, or thermal fields. Infiltration of the liquid crystal molecules into the porous microparticles imparts additional functionality to the composite structure of the embodiments, depending on how the molecules are oriented inside the particle. The average refractive index of the liquid crystal infiltrating the porous microparticle is close to the refractive index of the isotropic state of the liquid crystal:

$$n_{iso} = \sqrt{(2n_\perp^2 + n_\|^2)/3},$$

where $n_\perp$ and $n_\|$ are refractive indices of the liquid crystal molecules perpendicular and parallel to (along) their long axis respectively. The isotropic index is close to the refractive index $n_\perp$. As a result, for a homogeneously aligned liquid crystal device, the refractive index mismatch between the bulk of the liquid crystal molecules and the microparticles is large, thereby resulting in large scattering. Therefore, and as mentioned above, the microparticles used in the device of the present embodiments are preferably porous. These porous microparticles may be functional and made of thermochromic material such as vanadium oxide, tungsten oxide, zinc oxide or titanium oxide which allows their transparency to be controlled thermally or electrically, or thermally and electrically. The microparticles may also be magnetic, photosensitive, fluorescent, or electrochromic.

Figure 1A:
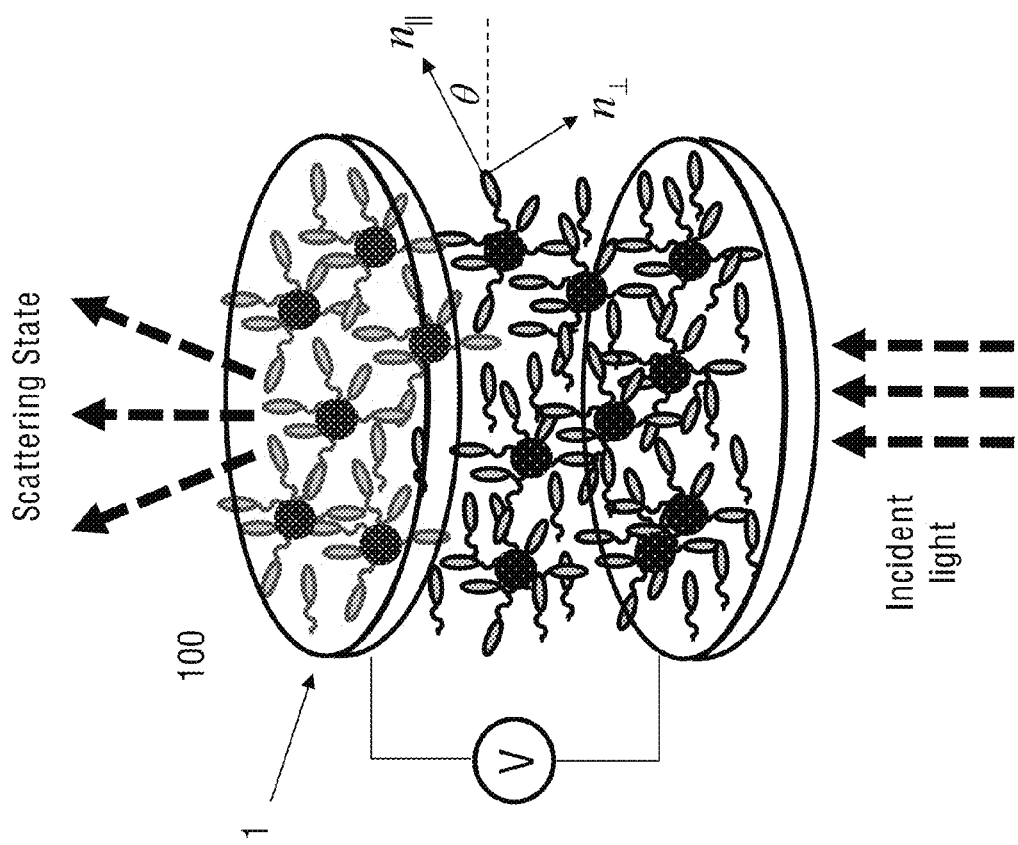

Thus, the LCD of the present embodiments allows polarisation-independent intensity modulation and is based on tuneable scattering, which uses a composite of a liquid crystal mixed with transparent microparticles. Reference is now made to FIG. 1*a-b* showing schematically the porous microparticles embedded in the liquid crystal composite tuneable device of the embodiments for polarisation-independent scattering. These microparticles have a refractive index nearly equals to one of the liquid crystal refractive indices, for example $n_\perp$, so that at zero voltage, no index matching exists, and large scattering occurs. The LCD of the present embodiments comprises the transparent panels (1) coated with a transparent conductive electrode (TCE) layer and with an exemplary alignment layer, and the composite made of porous microparticles (2) surrounded by liquid crystal molecules (3). FIG. 1*a* illustrates a scattering state of the LCD in which the microparticles infiltrated with the liquid crystal molecules act as scattering centres due to large refractive index mismatch. FIG. 1*b* illustrates a transparent state of the LCD in which the liquid crystal molecules are oriented on the average along one direction and hence, the refractive index mismatch is minimized. As the voltage increases, the liquid crystal molecules re-orient with the field direction. As a result, the index mismatch gradually decreases, and so does the scattering. The composite structure of the embodiments may also be transparent at zero voltage and scatters at high voltage, for example when the liquid crystal material has a negative dielectric anisotropy and homeotropically aligned.

The microparticles are formed by coagulation or agglomeration of nanoscale particles so that the porosity of each coagulated particle is high. The porous microparticles may be prepared lithographically or by chemical etching, templating, electrospinning, embossing, laser patterning or milling and then randomly distributed on at least one of the panels. Examples of such particles include porous silica, partially oxidised or nitrogenised porous silicon with various porosities and oxidation or nitrogenation levels. The microparticles may also be prepared at room temperature from a raw solid material, such as the surfactant dimethyloctadecyl[3-(trimethoxysilyl)-propyl]ammonium chloride (DMOAP) or N-methyl-3-aminopropyltrimethoxy-silane (MAP). Such materials can be in solid form or in solution form.

This solid material preferably has its melting point slightly lower than that of the liquid crystal used in the composite. The composite is prepared by dissolving the raw material and mixing it with the liquid crystal above the melting point, followed by cooling to room temperature, which then form microparticles embedded in the liquid crystal matrix. Alternatively, both the liquid crystal and the raw material of the microparticles may be dissolved in a common solvent such as toluene and the composite is formed upon heating to the isotropic temperature, thus causing the solvent to evaporate and remaining with the LC-microparticles composite. Since usually the surfactants cause the LC molecules to align perpendicular to the substrates plane, then assuming the LC molecules have positive dielectric anisotropy, they will not switch upon applying an electric field. In this case, it is preferable to choose the liquid crystal having negative dielectric anisotropy which will then result in a composite exhibiting reversed behaviour, that is transparent at zero voltage and scattering at high enough voltage. In a specific embodiment, the microparticles concentration in said composite is less than 50%, and preferably less than 30%, for providing optimum contrast of the device upon switching it between different orientational states of the liquid crystal for privacy and smart window applications. This concentration is furthermore preferably less than 0.5%, and for other non-scattering photonic devices applications even more preferably less than 0.1%, for avoiding significant light scattering. The inclusion of less than 0.1% microparticles in the LC composite device of the present invention does not provide significant scattering but can improve the switching speed between different orientational states of the liquid crystal, because of reducing the viscoelastic relaxation time. Similarly, for wavelengths much larger than the microparticles size such as in the long wave infrared or the THz ranges, the scattering becomes small and consequently, the device may then be used as a tuneable birefringence or phase plate. The microparticles concentration is thus small enough to make sure that the scattering is insignificant, and the device is used for phase, retardation or wavelength modulation, yet maintaining the faster operation in any one of the configurations of the present invention.

Examples of the porous microparticles include glass, ceramic, metallic, ferromagnetic, photosensitive, or organic microspheres, which are mixed in a liquid crystal with 1-15% concentration. The microparticles may also be partially oxidized porous silicon microspheres or any other porous dielectric microstructures. Oxidation level of the porous material determines its adsorption degree, colour, refractive index, and a scattering degree of the composite. Therefore, tuneable architectural privacy windows, which are made from this material according to the present invention, exhibit different colours. Another preferable embodiment of the microparticles is to have their melting point less than that of the liquid crystal and maybe designed to fall near the surrounding ambient temperature above which, the device will stop to be scattering. When the microparticles melt and get mixed with the liquid crystal the scattering centres disappear and the liquid crystal layer becomes transparent without dependence on the voltage. Hence with this design one can get a thermochromic type device switching between scattering and non-scattering or vice versa depending on the temperature.

As schematically shown in FIGS. 1a-1b, liquid crystal molecules are frequently rod-shaped aligned, such that their long axes are on the average in the same direction making an angle θ, called the tilt angle, with the normal to the transparent panels. The panels (1) are usually made of glass treated at their facing surfaces with transparent conducting oxide (TCO) as electrodes and a thin polymer layer to provide mono-domain alignment of the liquid crystal (LC) molecules. Some glass micro-spheres (not shown in the figures) are inserted to act as spacers to determine the thickness of the device.

Figure 2:
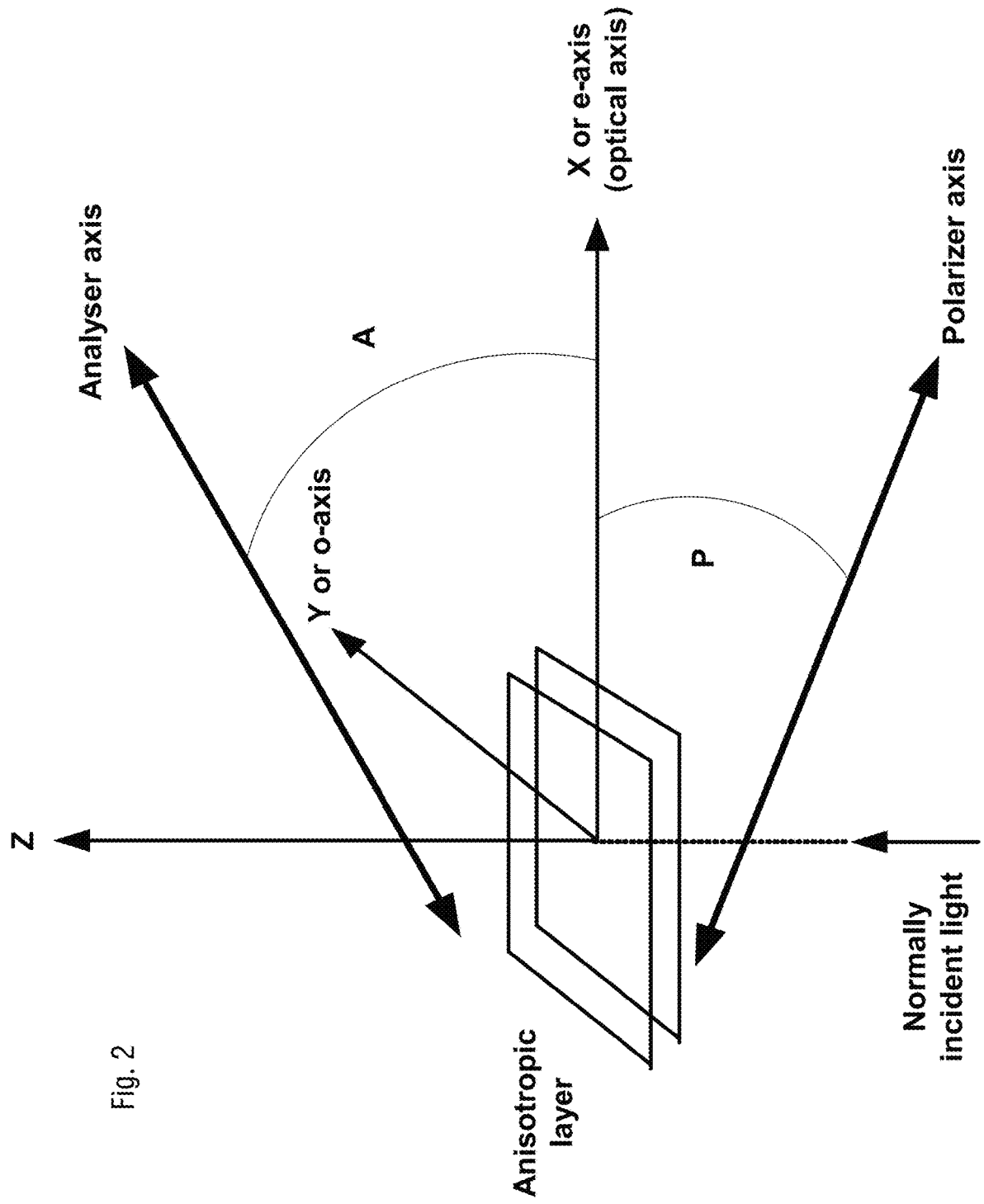
FIG. 2 illustrates a birefringence plate sandwiched between two polarisers.

Because of their shape, the LC molecules are anisotropic and the whole device would therefore act as a birefringent plate. As noted above, the majority of the liquid crystal molecules are uniaxial meaning that they have two refractive indices, one along the molecule's axis ($n_\parallel$) and one perpendicular to it ($n_\perp$). When voltage is applied between the two electrodes connected to the transparent panels, the LC molecules orientation changes. Thus, the tilt angle is a function of the voltage. As shown in FIG. 2, when a linearly polarised light impinges on a birefringent medium, two waves can propagate at different velocities or refractive indices, the ordinary and the extraordinary waves. The extraordinary wave is an electromagnetic wave which is excited with its polarisation along the projection of the molecular axis on the transparent panels, and its index is a function of the tilt angle which is a function of the applied voltage:

$$n_e = \frac{n_\parallel n_\perp}{\sqrt{n_\perp^2 + (n_\parallel^2 - n_\perp^2)\cos^2\theta}}$$

The ordinary wave index on the other hand remains fixed at $n_o = n_\perp$, so that the effective birefringence defined as $\Delta n = n_e - n_o$, varies from $\Delta n = n_\parallel - n_\perp$ at zero voltage to near zero at high voltage when the molecules closely approach the orientation θ≈0 provided that the molecules have positive dielectric anisotropy. Because of the difference in their velocities the two excited waves (ordinary and extraordinary) accumulate a phase difference, $\Gamma = 2\pi d\Delta n/\lambda$ which depends on the path length they travelled d and birefringence. This phase difference Γ causes a variation in the polarisation state. As shown in FIG. 2, assuming that the polariser axis and the analyser axis are oriented at azimuthal angles P and A with respect to the optical axis (e-axis), the light transmission can be written as:

$$T = \cos^2(P-A) - \sin(2P) \times \sin(2A) \times \sin^2(\Gamma/2)$$

As an example, when liquid crystal is sandwiched between two crossed polarizers and P=π/4, the transmission varies according to $T = \sin^2(\pi d\Delta n/\lambda)$, while when the liquid crystal is between two parallel polarizers, it is $T = \cos^2(\pi d\Delta n/\lambda)$. This is the principle of polarisation or intensity modulation of the LCD of the embodiments. When the incident light polarisation is along the projection of the molecular axis on the transparent panel plane, only one wave is excited. This wave is the extraordinary wave with its polarisation direction remaining unaltered however the device in this case acts as a variable index device. There are liquid crystal modes which by their nature exhibit isotropic change of the refractive index such as blue phases of short pitch, and polymer dispersed liquid crystals with small LC droplets. Variable index modes are important to provide phase-only modulations which is of importance for spatial light modulators.

However, because of the variation of the extraordinary index with the voltage, its phase is varying. This is the principle of phase-only modulation action of the LCD of the embodiments. If the electrodes are patterned into small pixels, then each pixel is able to modify a small part of an optical beam (polarisation, intensity, or phase modification). As a result, a pixilated LCD can be used as a spatial light modulator useful for improving image quality. Based on a spatial phase modulation, aberrations correction of wavefronts can be achieved. Similarly based on a spatial polarisation modulation, polarimetric or ellipsometric images can be formed.

There are many LCD electro-optic modes which are based on the effective birefringence variation and the optic axis rotation when an electric field is applied between the two electrodes. Non-limiting examples include the hybrid mode, twisted nematic mode, in-plane switching mode, pi-cell, vertically aligned LC, smectic modes, chiral smectic mode, flexoelectric mode, smectic A, dual frequency mode, cholesteric LC with small pitch, blue phases, heliconical LC phases, distorted helix ferroelectric (DHF), and surface stabilized ferroelectric LC (SSFLC). In particular, the smectic and cholesteric modes exhibit other characteristics when microparticles are embedded in them. Above certain concentration, they break into regions forming focal conic texture, which is scattering. When a voltage is applied, they form a transparent nearly mono-domain state. Different voltage waveforms can be applied, and tuning can be achieved by varying the amplitude, the frequency or the duty cycle of the voltage waveform. At sufficiently high frequency and depending on the voltage applied, the temperature of the device may increase which changes the transparency of the device.

As it is evident from the above discussion, majority of the existing LCDs are usually polarisation-dependent, and therefore, the light beam passing through a linear polariser result in a 50% loss in the light throughput. This problem is thus solved in the present invention by introducing a polarisation-independent device of the embodiments. As will be discussed below, privacy and smart windows are of many possible applications of this device. However, it can also be useful in many other situations, for example when weak ambient light is used for imaging, or when two polarisers are used, for instance in interferometric imaging and sensing applications. Non-limiting examples are hyperspectral and wave-front correction devices based on liquid crystals.

Another problem solved in the present invention is the strong dependence on the angle of incidence. When a light beam impinges along the LC molecules principal axis, the retardation vanishes, and phase modulation becomes asymmetric with respect to the normal to the transparent panels. Because, in imaging systems, the angular extent of light contains a wide spectrum of angles, each light beam may experience different phase retardation. The devices of the embodiments are capable of extending their angular field of view. Slow switching speed attributed to the majority of the existing LCDs, particularly when thick liquid crystal layers are used, is also overcome by the devices of the present embodiments.

In a further embodiment, the composite structure may be formed from liquid crystal by creating random liquid crystal micro-domains on at least one of the panels, so that there is a large index mismatch between neighbouring micro-domains at one orientational state of the liquid crystal. This mismatch actually decreases as the liquid crystal molecular orientation changes with external field tuning. The alignment layer deposited on the transparent panels is made of random liquid crystal micro-domains by one of the methods of nano-patterning of the transparent conductive electrode (TCE) layer or photo-alignment of the photosensitive polymer layer or thin chalcogenide glass. Thus, the liquid crystal micro-domains are created with refractive index mismatching between them at one state (for example, parallel $n_{\parallel}$) and nearly full matching at the other state (for example, perpendicular $n_{\perp}$), which is tuned by an external field. In the above discussion, the index matching, or mismatching states (different orientational states of the liquid crystal) can be reversed depending on whether the micro-domains are hydrophilic or hydrophobic and whether the liquid crystal has negative or positive dielectric anisotropy.

Figure 3C:
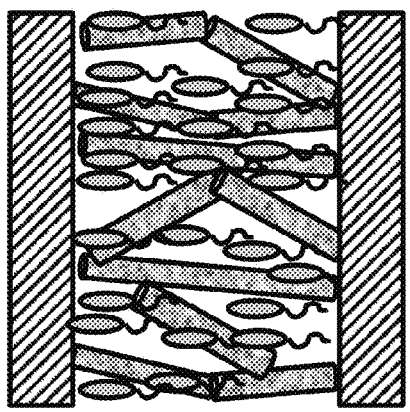
FIGS. 3a-3e schematically show the scattering medium which is achieved by having micro-domains at the panels randomly oriented.
Figure 3B:
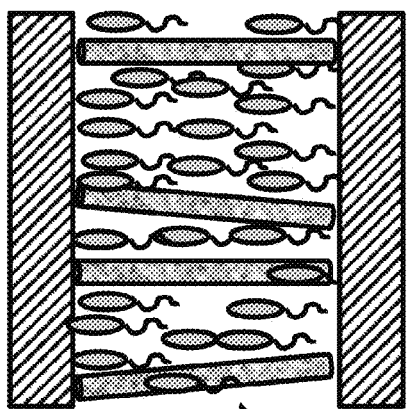
Figure 3A:
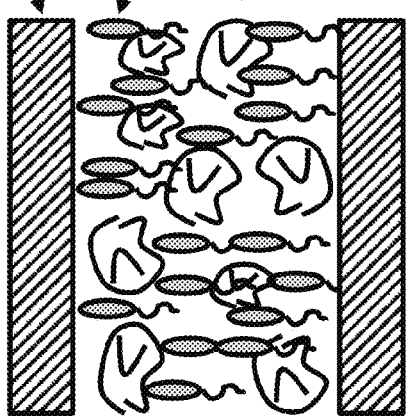
Figure 3E:
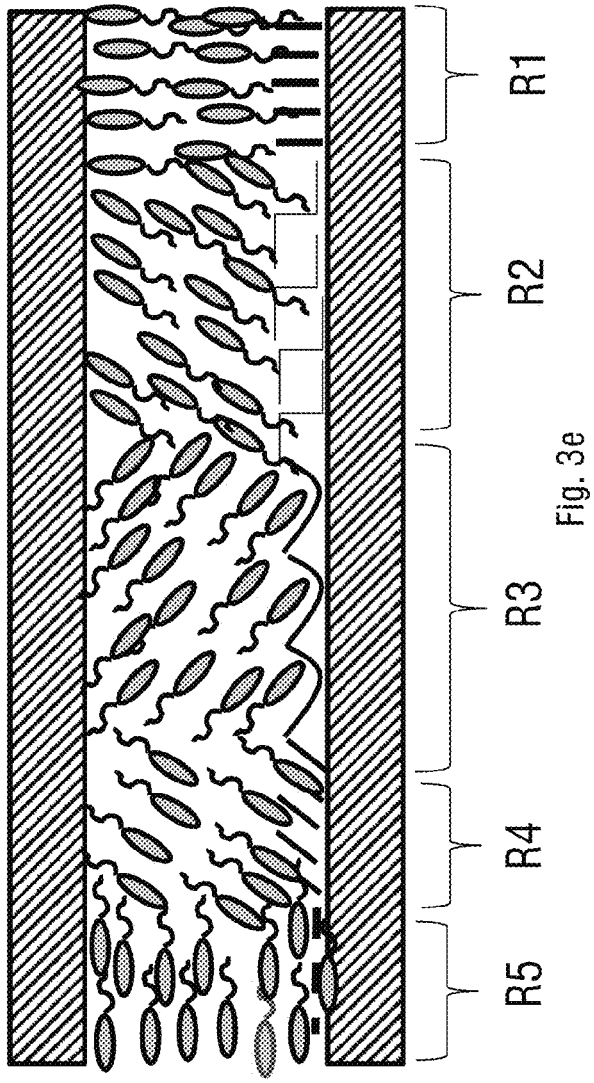
Figure 3D:
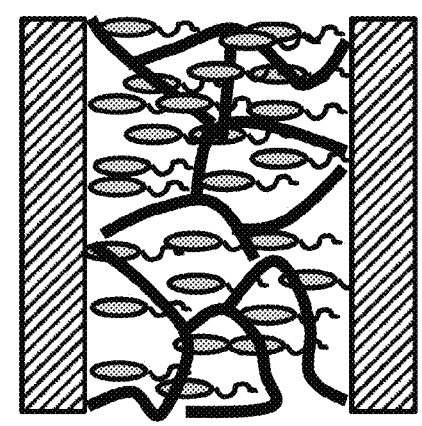

Reference is now made to FIGS. 3a-3e illustrating the above embodiment describing the scattering medium which is achieved by having micro-domains at the panels randomly oriented. As noted above, the microparticles (2) may have a different shape, thereby resulting in different formed structures of the micro-domains. For example, FIG. 3a shows random micro-fibres (2) inside the liquid crystal (3) medium. FIG. 3b shows random micro-posts or micro-walls (2) oriented almost perpendicular between the two transparent panels (1), and the liquid crystal molecules (3) filling the space between them and maybe even infiltrating them at least partially. The micro-posts (2) may have various shapes, such as helices, cones, or zigzag shapes, which can reduce the angular dependence of the scattering. FIG. 3c shows a skeleton structure of the micro-posts filled with the liquid crystal. FIG. 3d shows a mesoporous matrix of random micro-fibres filled with the liquid crystal. FIG. 3e illustrates an exemplary device of the embodiments with one of the panels having different micro-domains (R1-R5) that can induce different liquid crystal molecular orientations so that the refractive index mismatch between the neighbouring domains is large at one orientational state of the liquid crystal molecules and becomes smaller at different orientational states.

The random orientation of the micro-domains causes large scattering at zero voltage. But when the voltage increases, the index mismatch between the micro-domains starts to decrease and so does the scattering. Furthermore, the colour of the device may be tuned by selecting different sizes of the microparticles, different raw materials, different porosities, or different refractive indices. As noted above, the porous silicon microparticles having different porosity and oxidation levels produce different colours of scattered light. Mesoporous silicon matrix at different oxidation levels is another possibility for a random scattering structure which becomes tuneable when infiltrated with liquid crystals. In one of the embodiments, the porous microparticles may be functionalised with an organic or inorganic molecular layer or nano-layer to control the way the liquid crystal molecules are oriented on their surface and to maximise the randomness of the micro-regions comprising the microparticles and the liquid crystal surrounding. The pores size of the microparticles is not limited and can range from few nm in diameter to hundreds of nm or even more. The larger the number of pores and their diameter, the better as long as they are on the micron scale because then the effective index of the infiltrated microparticle becomes closer to one of the principal refractive indices of the liquid crystal and their density becomes closer to that of the liquid crystal thus minimising sedimentation effects over time.

Organic or non-organic tubes normally used for drug delivery can be used as the porous microparticles to produce the composite structure of the embodiments. One non-limiting example of such organic particles are cochleates which are cigar-like microstructures consisting of a series of lipid bilayers, formed as a result of the condensation of small unilamellar negatively charged liposomes. In the presence of calcium, the small phosphatidylserine (PS) liposomes fuse and form large sheets. These sheets have hydrophobic surfaces and tend to roll-up into the cigar-like cochleate. Electron microscopy images usually show a typical cochleate cylinder characterised by the elongated shape and by the tight packed bilayers.

Cochleates are usually prepared by mixing DOPS (dioleoyl phosphatidylserine) with DMPS (dimyristoyl phosphatidylserine) at the 9:1 molar ratio, and then freeze dried to get the powder form. The samples are dialysed before freeze drying to remove salts. The obtained dry powder can be directly used for analysis or by further preparing a suspension. The suspension samples are dried at room temperature under vacuum. The suspension of the cochleate particles should be sonicated to temporarily disrupt aggregates and avoid sedimentation of the particles.

Another example of the organic porous microstructure fibre maybe made from raw cotton, wastepaper or other organic materials. Such structure when embedded between the two transparent panels of the embodiments and filled with the liquid crystal, forms the liquid crystal composite tuneable device of the present invention. In a further embodiment, the micro-particles are functionalised with a nano-layer of material that can cause preferable orientation of the liquid crystal molecules in the vicinity of the micro-particles. This will result in a randomly deformed structure which reveals to higher switching contrast. An example of such nano-layer coating is a surfactant, but any other functionalisation material may be suitable.

In a particular embodiment, the microparticles or the mesoporous structure shown in FIG. 3d is made of thermochromic material, such as vanadium oxide, which is dielectric at room temperature, but becomes metallic above its transition temperature. As a result, the device incorporating the vanadium oxide microparticles can in part strongly scatter the infrared radiation from the sun in the summer period and in part reflect or absorb it, while the transmission in the visible range can still be made high enough with proper selection of the voltage applied to the device. Such device may act both as a privacy window and smart window at the same time. The device may also be formed on a single layer of thermochromic material, such as vanadium oxide, a multi-layered structure or periodic structure containing vanadium oxide or any electrochromic material or phase change material, such as $Ge_2Sb_2Te_5$ (GST) (chalcogenide glass), on one side of a window, while the composite liquid crystal layer is adjacent to it. The thermochromic material thus acts as a smart window while the scattering composite liquid crystal layer acts as a privacy window.

The existence of the liquid crystal layer on top of the thermochromic material helps in reducing reflections from the smart window structure boundary, thereby improving the transmission characteristics of the window. Birefringence of liquid crystals is reduced with the incident light wavelength. Therefore, at high temperatures, it is possible to adjust the voltage in order to maintain less reflection in the visible range of the spectrum while the reflection in the infra-red remains high. Thus, the liquid crystal layer in the device of the embodiments has two roles: first, to provide the privacy window with its functionality, and second, to actively control the Fresnel reflection from the thermochromic material interface thus improving its contrast in the infrared range and increasing the transmission in the visible range.

Thus, the randomly aligned micro-domains formed in the composite structure of the embodiments result in strong scattering at zero voltage. When voltage is applied, the liquid crystal molecules in all the micro-domains reorient themselves with the electric field direction, thereby gradually decreasing the scattering as the voltage increases. The device of this embodiment is used in the thermochromic smart window, first, to turn the window to become both smart and privacy window, and second, to improve the transmission characteristics of the smart window by modulation of the Fresnel reflection properties with the liquid crystal composite tuneable device of the present invention. As mentioned above, in all described scattering-mode devices, the index matched, or mismatched states can be reversed depending on whether the walls of the embedded micro-domains are hydrophilic or hydrophobic and whether the LC has negative or positive dielectric anisotropy. Bistability of the devices can also be achieved depending on the choice of the liquid crystal, for example ferroelectric LC are known to exhibit bistability as well as metal-organic liquid crystalline compounds.

The LCD of the embodiments may also be tuned optically by depositing a photosensitive layer, such as an intrinsic photo-conducting layer or photodiode structure, on at least one of the transparent panels. At least part of the solar spectrum impinging on the photo-sensitive layer side changes the voltage drop across the liquid crystal layer, thereby modulating the scattering. Some photo-conducting layers, such as chalcogenide layers, can be made thin to transmit large part of the incident light. They can also act as photo-alignment layers. Of particular interest is a photosensitive layer capable of absorbing the UV part of the solar spectrum and converting it into voltage drop across the device. Thus, in addition to the efficient energy consumption, such layer also provides protection from the UV radiation. Example of such highly efficient UV photoconductive layer is an aluminium-doped zinc-oxide nanorod array annealed in oxygen environment.

Similarly, photo-conducting polymers can be used as the photosensitive layers for visible light, while InGaAs can be used as a photoconductive layer in the short-wave infrared range (SWIR). In yet further embodiment, a single layer is deposited on one of the transparent panels or two layers are deposited on the two panels on top of the transparent conductive electrode layer. Other examples of more transparent photovoltaic device include Cu based chalcogenide glasses, mixed with perovskites, and using highly transparent electrodes such as metal grids. Although the voltage change produced by solar light or part of it might not be enough to switch the liquid layer completely, it is still possible to apply a bias voltage to maximise the effect of sunlight. This optically addressed device can be used as a smart window capable of self-controlling its transparency depending on the sunlight intensity. In the summer period, the solar intensity is strong, so this window may automatically dim and keep the house cold, while in the winter period, when there is no strong sunlight, the window may brighten, thereby keeping the house warm.

Thus, the use of a photoconductive or photovoltaic layer in conjunction with the composite structure allows modulating the smart window's transparency by the photo-voltage or resistance change due to the incident sunlight shining on the window.

Figure 4A:
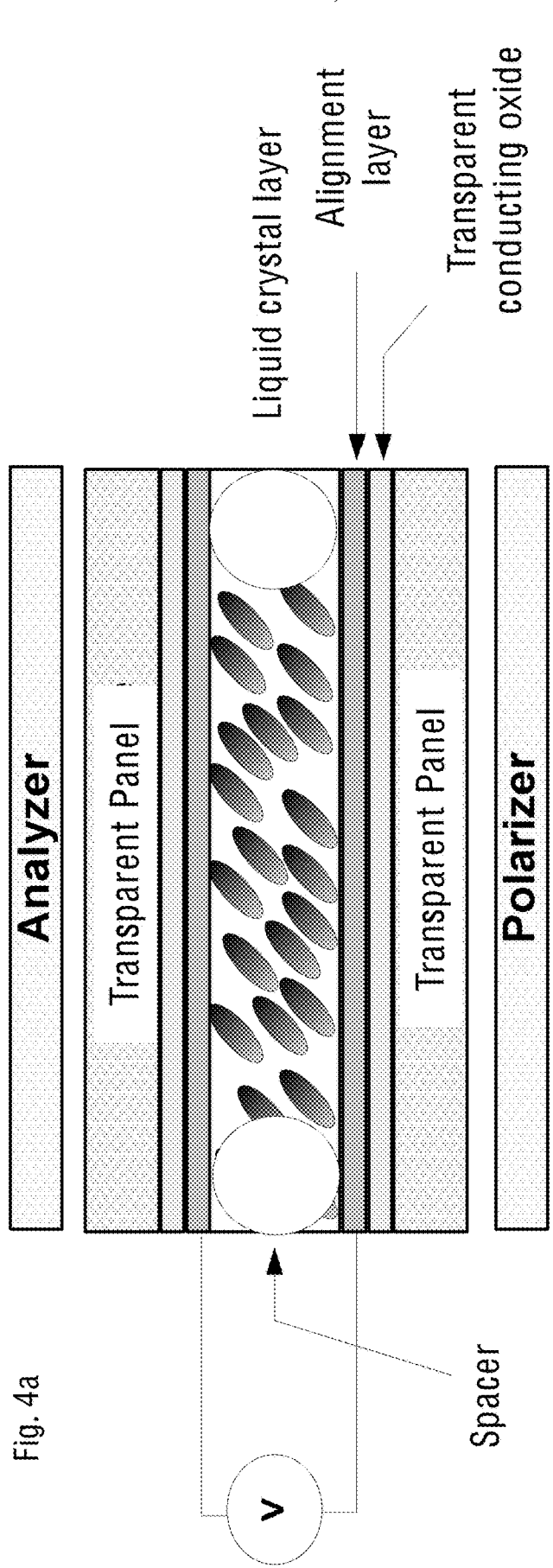
FIG. 4a schematically shows the homogeneously aligned nematic liquid crystal (LC) device comprising two transparent panels coated with electrodes and alignment layers.
Figure 4B:
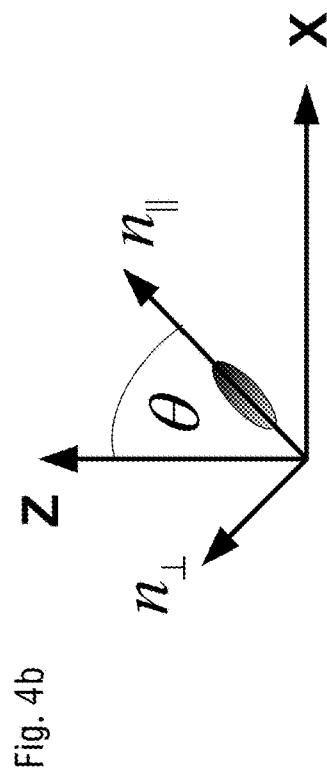
FIG. 4b shows the geometry of the LC molecule, its principal refractive indices and tilt angle.

Reference is now made to FIG. 4a schematically showing a typical birefringent device, which in the present exemplary case is a nematic liquid crystal device having an antiparallel geometry. The geometry of the dielectric tensor associated with the liquid crystal molecules is shown in FIG. 4b. The polariser and analyser are installed to obtain intensity- or wavelength-modulation. For phase-only modulation, only polariser is installed, while for polarisation-independent operation, neither polariser, nor analyser is required.

Figure 4C:
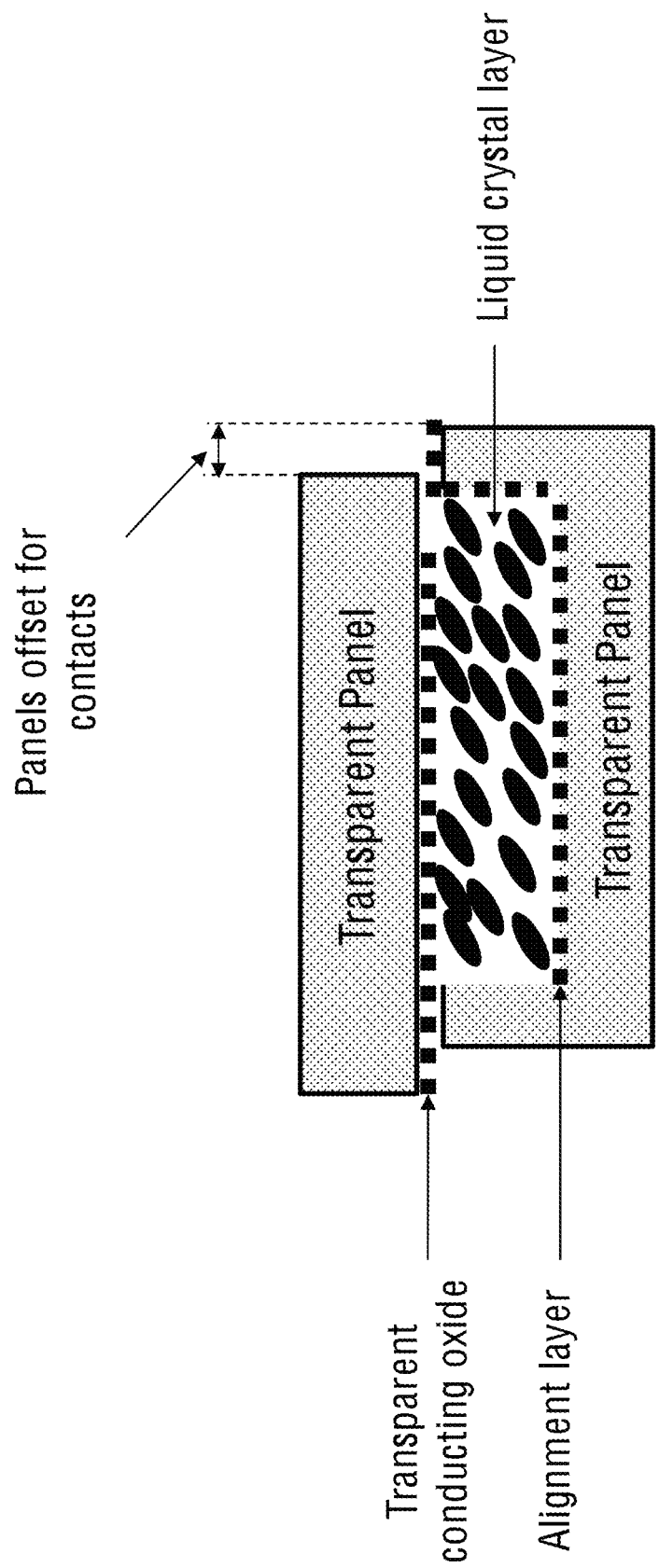
FIG. 4c schematically shows a modified configuration to obtain improved gap uniformity by etching one of the transparent panels with the etch depth equal to the desired cell gap.

One of the difficulties in liquid crystal devices used in photonic applications is obtaining uniform thickness. As shown in FIG. 4c, an improved gap uniformity can be obtained by etching one of the glass substrates with the etch depth equals to the desired cell gap. The panel surfaces are then coated with the necessary layers of transparent conducting oxide and alignment materials, and with optional layers, such as dielectric mirrors for a Fabry-Perot cavity tuneable filter or photoconductive layers. The second (bottom) panel is not etched, but simply pressed and glued to the bottom of the device without spaces.

To obtain easy electrical connections the substrates are laterally shifted by an offset so that the connection area is exposed on both substrates from right and from left. Using modern etching techniques (chemical, ion-beam, or laser-beam) one can achieve nanoscale uniformity over large area. Although not shown in these figures, different means for easy electrical connections are possible, for example by drilling holes in the transparent panels followed by filling them with a conducting material. This is important for pixelated devices in which the number of electrical connections increases with the number of pixels.

According to another aspect of the present invention, various configurations of the LCD of the present embodiments having a tuneable birefringence are described below. All these configurations based on the LCD of the invention represent tuneable, polarisation-independent optical systems effectively overcome the aforementioned problems of the existing LC devices.

System Configuration 1: Mach-Zehnder Interferometer

Figure 5A:
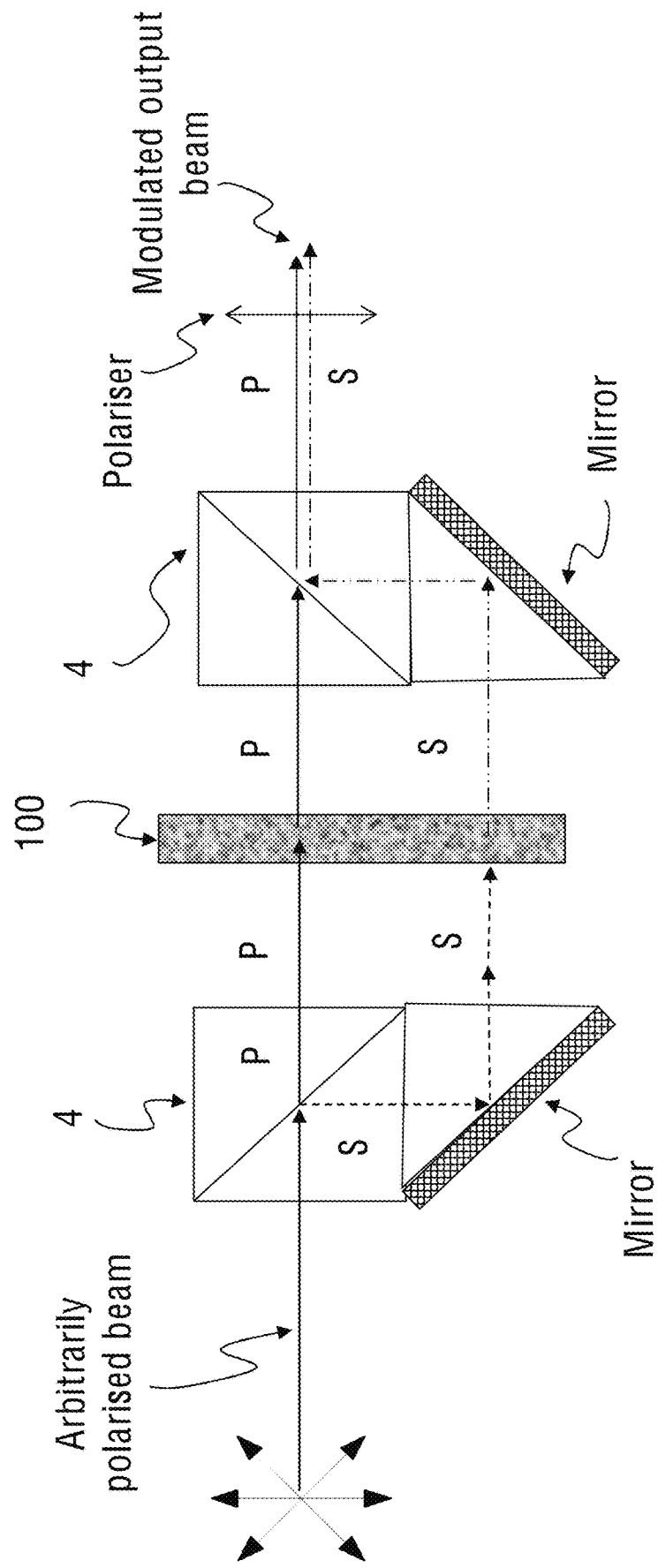
FIG. 5a schematically shows a polarisation liquid-crystal retarder system with improved light throughput based on the Mach-Zehnder interferometer configuration.

In one embodiment, a polarisation liquid-crystal retarder system with improved light throughput comprising the LCD of the present invention is shown in FIG. 5a. It is based on the Mach-Zehnder interferometer configuration having an arbitrarily polarised beam split with a conventional polarised beam splitter (4) into two orthogonally polarised and collimated beams P and S. The conventional Mach-Zehnder interferometer determines the relative phase shift variations between these two collimated beams derived by splitting light from a single source. The generated phase shifts between the two beams P and S is caused by the sample or a change in length of one of the paths.

As shown in FIG. 5a, the P-beam passes through the liquid crystal device (100) of the embodiments oriented at 90 degrees, meaning that its optic axis is parallel to (or along) the P-polarisation direction. Hence, this beam is affected by the extraordinary refractive index that varies with the applied voltage. The S-beam passes through another section of the LCD (100) and is affected by the ordinary refractive index, which does not vary with the applied voltage.

Upon recombining the P- and S-beams, the resulting combined beam is again arbitrarily polarised, but modulated as the voltage varies due to the resulting phase retardation $\Gamma = 2\pi d(n_e - n_o)/\lambda$. This is similar to the situation when the incident light beam is linearly polarised at 45 degrees to the optics axis. However, in the present system, there is no loss in the light that is usually encountered when the input linear polariser is used.

Reference is now made to FIGS. 5b, 5c and 5d schematically showing three uses of the output modulated beam from FIG. 5a. In FIG. 5b, the modulated beam is passing through an optical etalon having an output transfer function of multiple narrow spectral bands, so that by modulating the LCD (100), the output spectrum includes multiple narrow spectral bands variable with the voltage. In FIG. 5c, the modulated beam is passing through an output of an illuminator connected to an optical fibre which can be used remotely as a light source with various spectroscopic or imaging systems. In FIG. 5d, the modulated beam being reflected or transmitted through a sample is then directed to a parallel detector or to an imaging system either for spectral measurement applications, or for hyperspectral imaging purposes, respectively. In order to obtain the polarisation-independent phase modulation in the configuration of FIG. 5a, a half-waveplate or polarisation rotator should be inserted in the S-beam path both before and after the cell, so that the beam passing the cell becomes P-polarised, and then converted back to S to be reflected by the polarised beam splitter (4).

Figure 6:
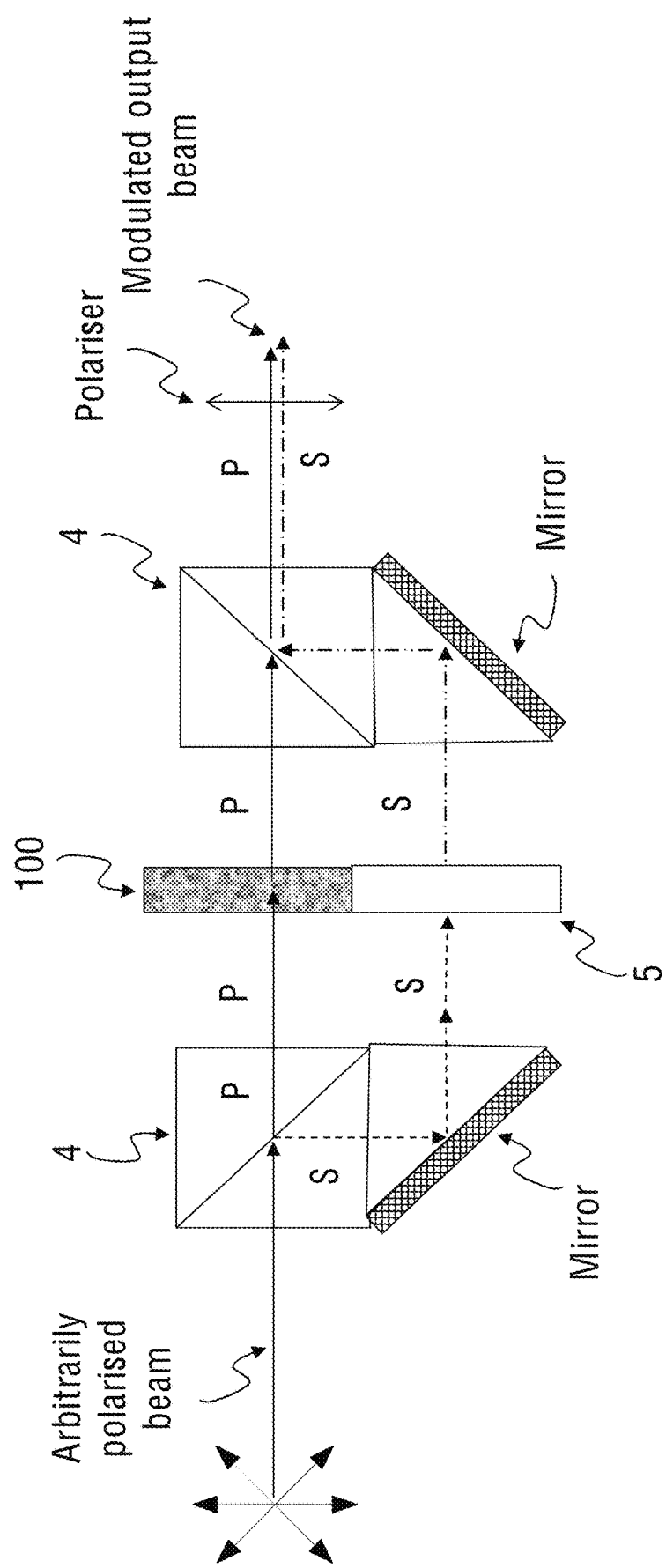
FIG. 6 schematically shows a liquid-crystal retarder system with improved light throughput, based on the Mach-Zehnder interferometer configuration, having the bottom cell empty or filled and positioned at 0 degree.

Reference is now made to FIG. 6 showing the similar configuration as above, but with the bottom cell (5) empty (without liquid crystal inside) or with the filled cell oriented at 0 degree. The S-beam is now passing through either the empty bottom cell or a filled cell oriented at 0 degree (5). The filled cell must be oriented at zero degree so that both the P- and S-polarisation have the same phase modulation. When the bottom cell (5) is filled, this configuration can work without the output polariser and for the phase-only polarisation-independent modulation, which is useful in tuneable lensing and wavefront modulation. Similarly, to the previous configuration, the polarisation-independent phase modulation can also be achieved in this configuration, provided that, for example, a half-waveplate or polarisation rotator is inserted in the path of the S-beam both before and after the cell, so that the light beam passing the cell (5) becomes P-polarised and converted back to S to be reflected by the polarised beam splitter (4).

In case of the empty cell, the phase retardation is $\Gamma = 2\pi d (n_e - 1)/\lambda$ which is larger by $\Delta\Gamma = 2\pi d(n_o - 1)/\lambda$ from the previous configuration shown in the FIG. 5a. Taking typical values for the refractive indices $n_e = 1.78$ and $n_o = 1.52$, the calculated phase retardation will increase by a factor of 3-4, which allows thinning of the liquid crystal layer by the same factor. Since switching time of nematic liquid crystals is proportional to the square value of the thickness, the response time of the device may be improved by a factor of 9-16. This is a significant improvement for spectral modulation devices with compressed sensing, FTIR spectroscopy, or phase modulators operated in a long wavelengths range (IR or THz). Thus, using the present configuration, the system of the present embodiments can be miniaturised, but still benefit from the short switching time reduced from seconds to milliseconds or less.

System Configuration 2: Michelson Interferometer

Figure 7:
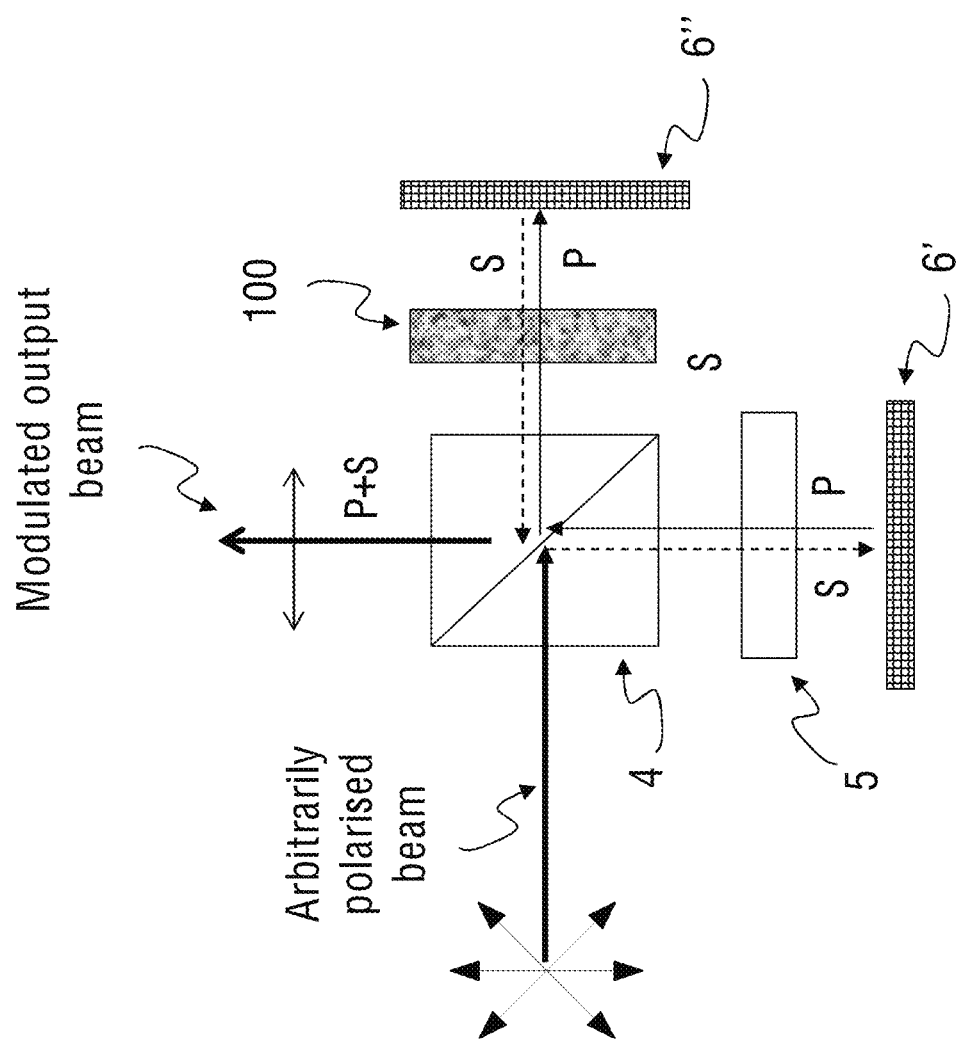
FIG. 7 schematically shows a liquid-crystal retarder system with improved light throughput based on the Michelson interferometer configuration.

Reference is now made to FIG. 7 illustrating the system of the embodiments based on the Michelson interferometer that uses polarisation conversion mirrors in both arms for light throughput and speed improvement. The whole device maybe a single solid unit with the arms glued (using the refractive index matching glue) to the sides of the polarised beam splitter (4).

The conventional Michelson interferometer uses a beam splitter splitting a light beam into two arms. Each of those light beams is reflected back toward a beam splitter which then combines their amplitudes using the superposition principle. The resulting interference pattern that is not directed back toward the source is typically directed to some type of photoelectric detector or camera.

Similarly, in the present configuration, the S-polarised beam is first transmitted through either an empty cell (5) or a filled cell positioned at 0 degree, reflected from a first polarisation conversion mirror (6') converting the beam to P-polarisation, and then transmitted through a second polarisation conversion mirror (6"). The polarised P-beam is then directed to the filled LCD (100) oriented at 90 degrees, reflected from the second polarisation conversion mirror (6"), then converted to S-polarisation and again reflected from the first polarisation conversion mirror (6') to recombine with the beam from the other interferometer channel.

The polarisation conversion can be performed by several means, for example using a quarter waveplate (QWP) and regular mirror, a Faraday mirror, a metallic grating with the Gaussian profile of the grating's lines or other means. The net phase retardation in this geometry for the case of empty cell in the bottom arm is $\Gamma=2\pi d(n_e+n_o-2)/\lambda$. However, since it is not variable with the voltage, the same modulation characteristics can be achieved as in the previous case but with a fixed phase shift. The cell (5) in the bottom arm can be empty to enhance the retardation modulation or filled, oriented at 0 degree to provide polarisation-independent phase modulation. In the latter case, the output polariser is not necessary.

System Configuration 3: Sagnac Interferometer

A Sagnac interferometer (or a ring interferometer) is based on a phenomenon of interference that is elicited by rotation. A beam of incident light is split and the two beams are made to follow the same path but in opposite directions. On return to the point of entry, the two beams are allowed to exit the ring and undergo interference. The relative phases of the two exiting beams, and thus the position of the interference fringes, are shifted according to the angular velocity of the apparatus. Thus, when the interferometer is at rest with respect to the earth, the light travels at a constant speed. However, when the interferometer system is spun, one beam of light will slow with respect to the other beam of light. Fibre-optic and ring-laser gyroscopes are based on this phenomenon.

Reference is now made to FIG. 8*a* showing a polarisation liquid-crystal retarder system with improved light throughput based on the Sagnac interferometer configuration. In this configuration, the P and S-beams pass twice through the LCD (100) with the help of a retroreflector (7) or two mirrors. The phase retardation is doubled, $\Gamma=4\pi d(n_e-n_o)/\lambda$, with the advantage of having the two beams passed along the same path.

Figure 8B:
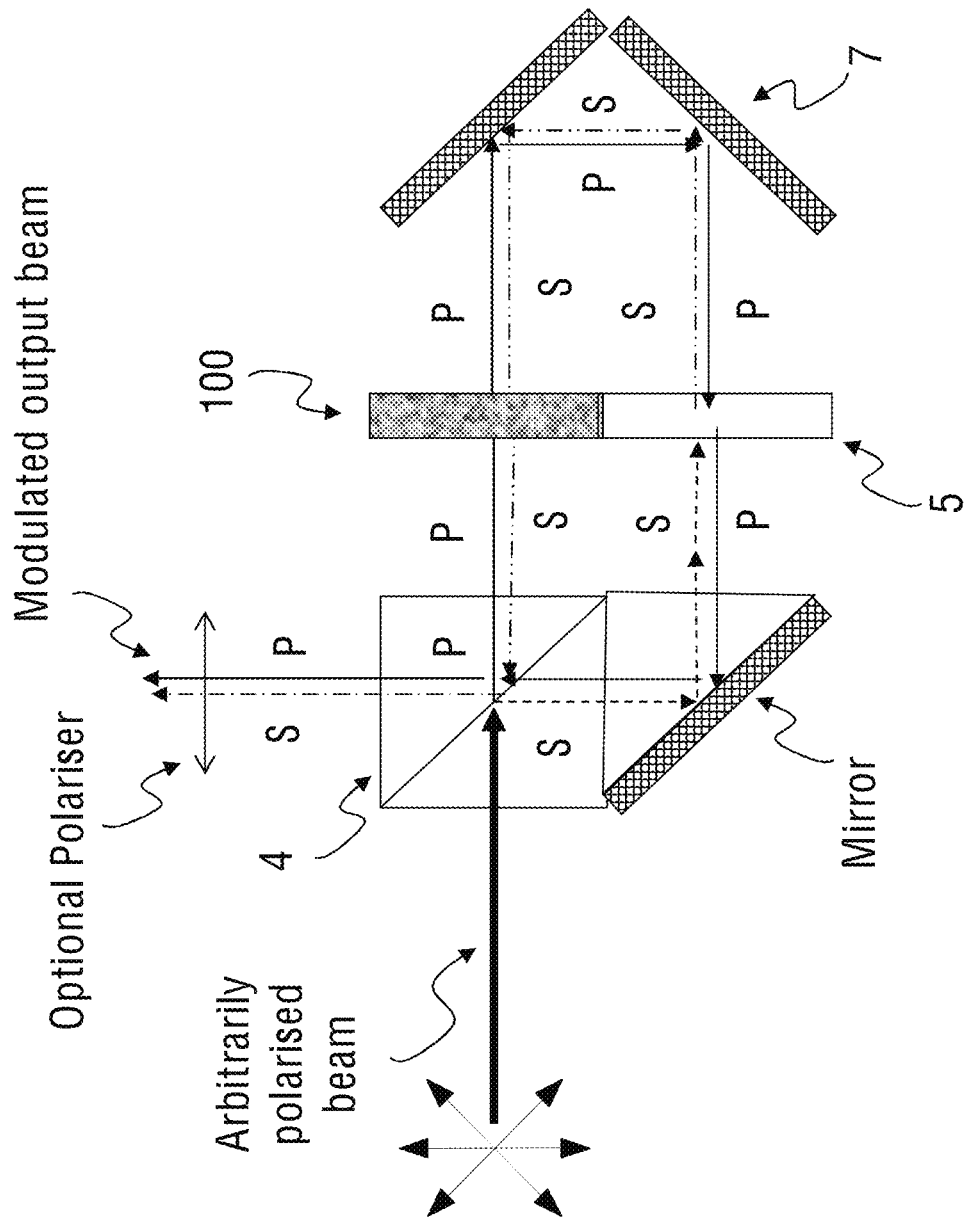
FIG. 8b schematically shows a liquid-crystal retarder system with improved light throughput based on the Sagnac interferometer configuration, having the bottom cell empty or filled and positioned at 0 degree.

In another embodiment, the configuration shown in FIG. 8*b* is similar to the previous configuration shown in FIG. 8*a* but has an empty cell (5) (without liquid crystal). In this case, the phase retardation becomes $\Gamma=2\pi d(n_e-n_o)/\lambda$, which is twice less than in the previous case (with liquid crystal). As mentioned above, the empty cell (5) can be filled with the liquid crystal, but then it should be oriented at 0 degree, and no output polariser is needed. In this configuration, polarisation-independent phase-only modulation is achieved, which is important for many applications including polarisation-independent virtual reality applications and tuneable focusing.

Figure 8C:
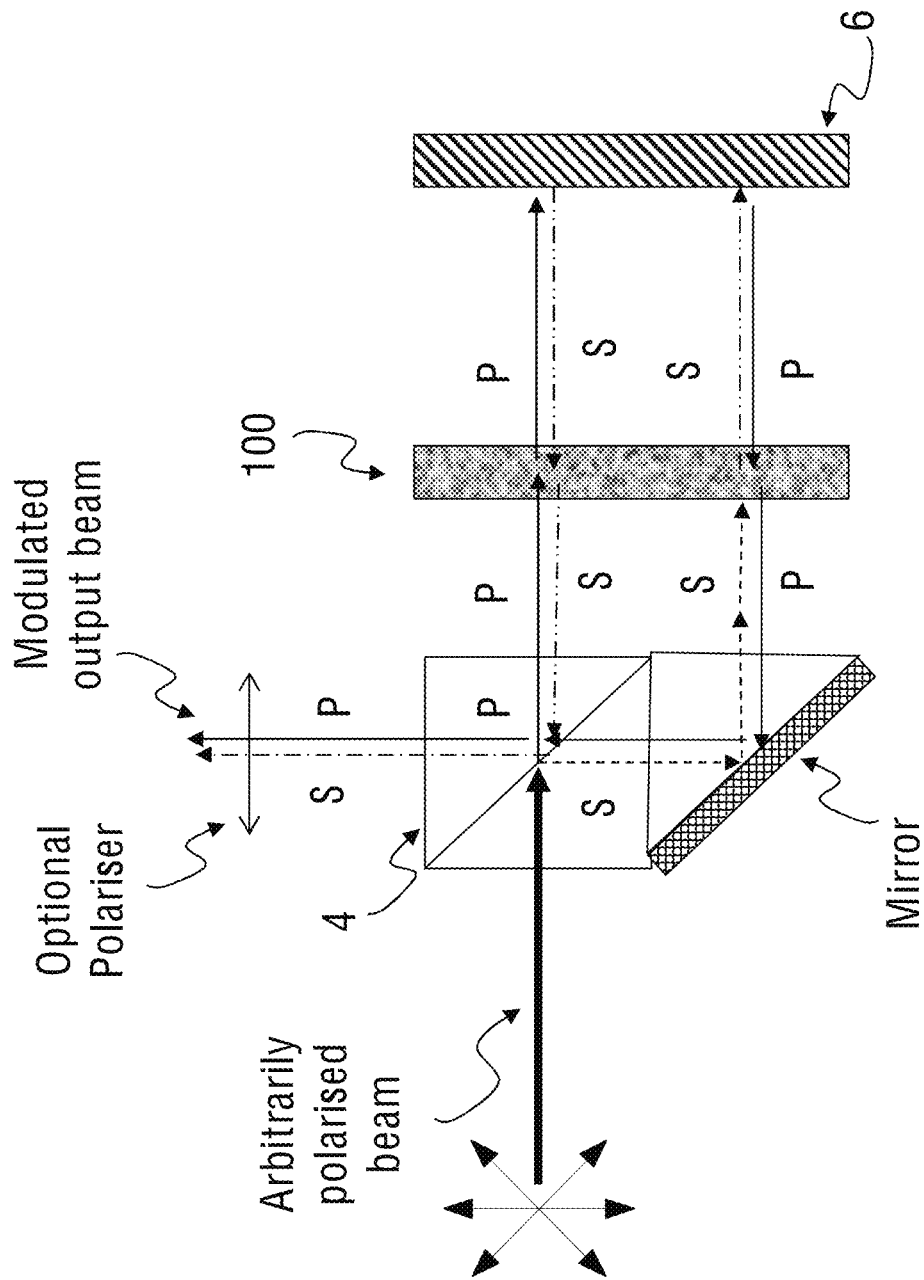
FIG. 8c schematically shows a liquid-crystal retarder system with a polarisation conversion mirror, with improved light throughput, based on the Sagnac interferometer configuration.
Figure 8D:
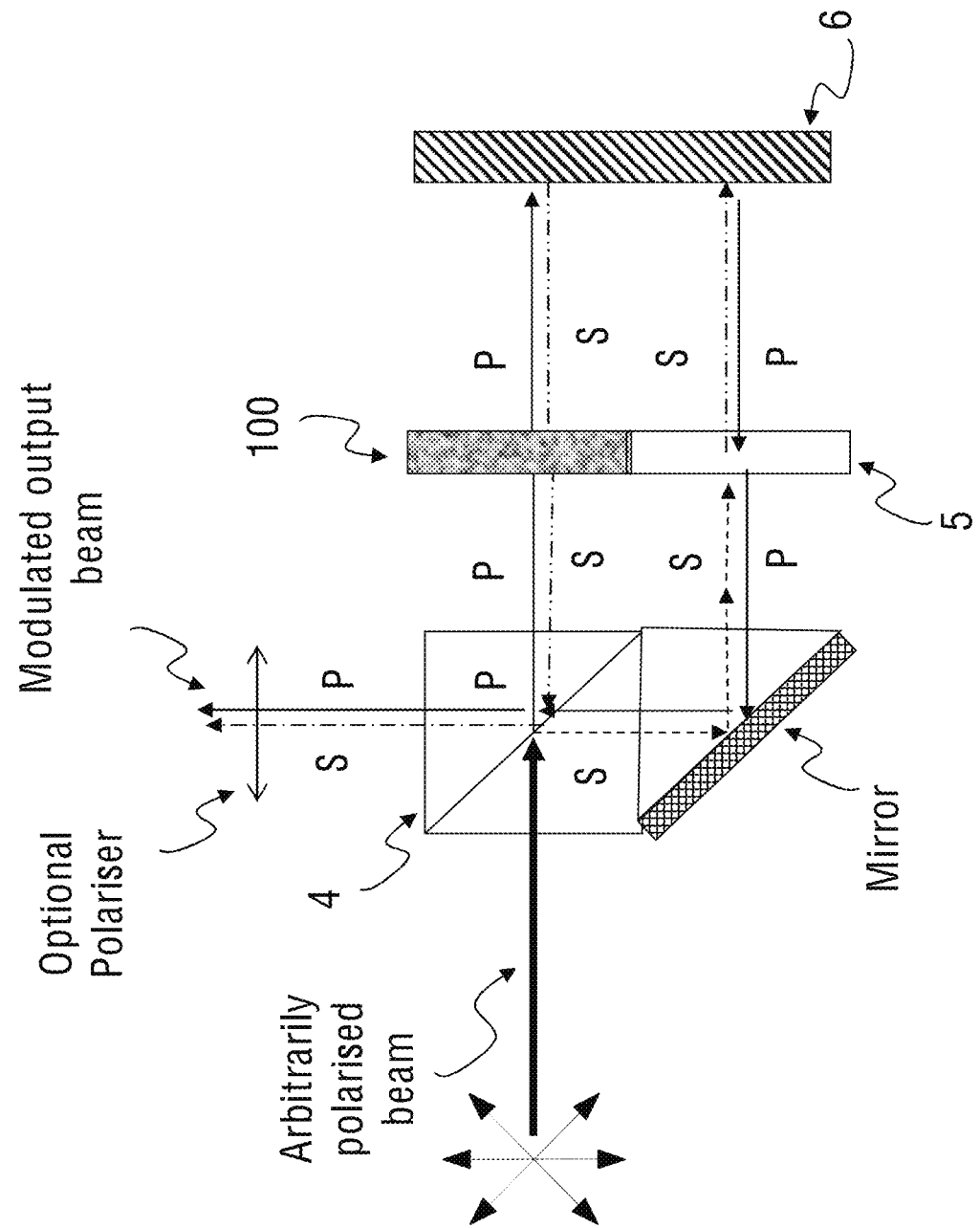
FIG. 8d schematically shows a liquid-crystal retarder system with a polarisation conversion mirror, with improved light throughput, based on the Sagnac interferometer configuration, having the bottom cell empty or filled and positioned at 0 degree.

In still another embodiment, the Sagnac interferometer configurations, which are shown in FIGS. 8*a*-8*b*, may be further supplemented with a polarisation conversion mirror (6) installed instead of the retroreflector (7). The respective Sagnac interferometer configurations are shown in FIG. 8*c*-8*d*. In all these configurations shown in FIGS. 8*a*-8*d*, the retroreflector (7) or the polarisation conversion mirror (6) may constitute one of the transparent panels (1) of the LCD (100) of the embodiments or attached with refractive index-matching glue to one of the external sides of the transparent panels (1).

System Configuration 4: Wollaston Polariser, Rochon Polariser

A Wollaston polariser consists of two birefringent right-angle triangle prisms cemented together, such that their optical axes are perpendicular. It separates randomly polarised or unpolarised light into two orthogonal linearly polarised outgoing beams. As light passes through such polariser, a symmetric deviation between the ordinary and extraordinary beams is created. The resulting beams are of orthogonal linear polarisation states and have equal intensity and a large angular deviation, which is determined by the prisms' wedge angle and the wavelength of the light. Commercial Wollaston polarisers are available with divergence angles from 15° to about 45°.

A Rochon polariser is very similar to the Wollaston polariser, but the ordinary beam passes through the prism without deviation. The Rochon polariser also consists of two birefringent material prisms in optical contact with one another. As the ordinary beam is not deviated on both sides of the prism, the ordinary and extraordinary beams remain collinear through the first prism. Upon entering the second prism, the ordinary rays do not experience a change in the refractive index and pass through the prism without deviation, while the extraordinary rays refract at the interface.

Figure 9A:
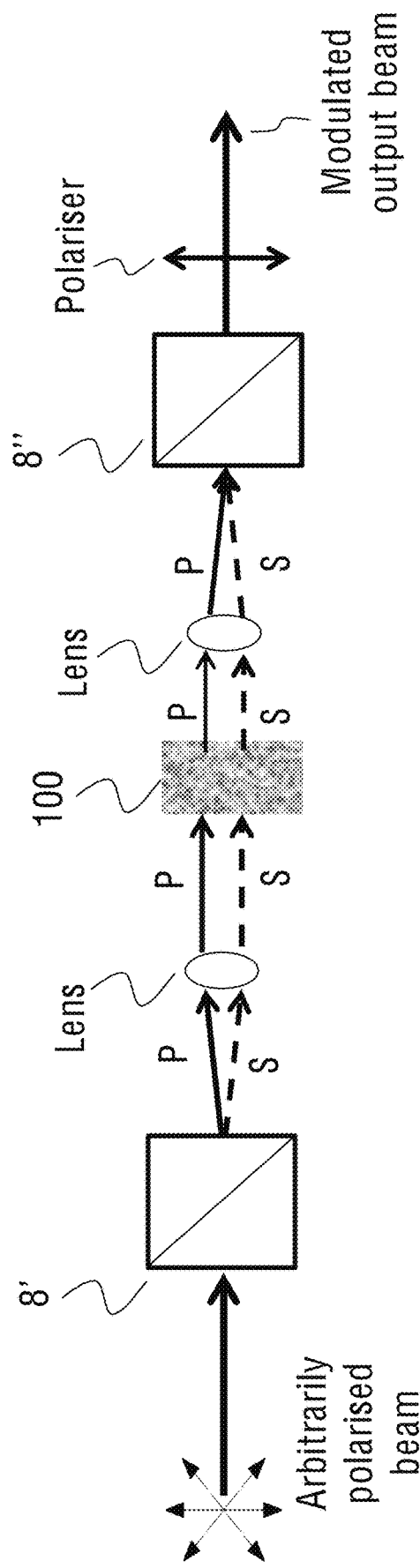
FIG. 9a schematically shows a liquid-crystal retarder system with improved light throughput, incorporating two Wollaston polarisers or two Rochon polarisers.

Reference is now made to FIG. 9*a* showing a polarisation liquid-crystal retarder system of the embodiments incorporating either two Wollaston polarisers or two Rochon polarisers (8' and 8"). As mentioned above, these two polarisers have the property of splitting the incident beam into two orthogonally polarised beams with a small angle in between. The two P- and S-beams are then collimated using a lens, passes the liquid crystal device (100) of the present invention, collected again and recombined by a polariser at the output.

Figure 9B:
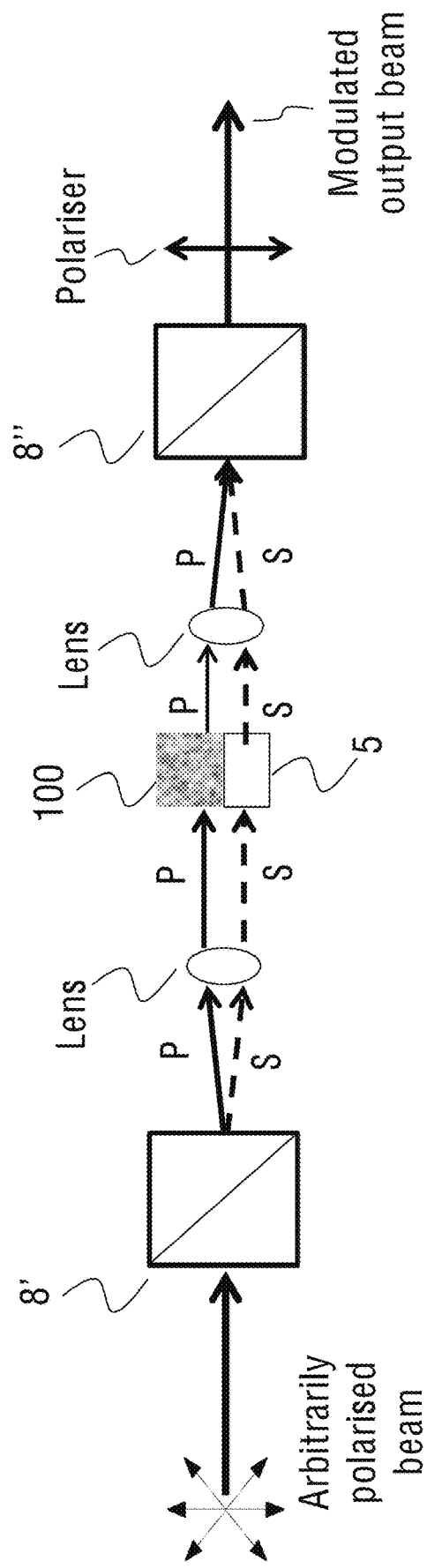
FIG. 9b schematically shows a liquid-crystal retarder system with improved light throughput, incorporating two Wollaston polarisers or two Rochon polarisers and having the bottom cell empty or filled and positioned at 0 degree.

The similar configuration, but with the bottom cell (5) empty (without liquid crystal) or filled with the liquid crystal and positioned at 0 degree is shown in FIG. 9*b*. In this case, one beam passes through the filled LCD (100) and the other beam passes through the empty bottom cell (5) or filled and oriented at 0 degrees. The phase retardation in the case with the filled bottom cell (5) is $\Gamma=2\pi d(n_e-n_o)/\lambda$, while in the case with the empty bottom cell (5) is $\Gamma=2\pi d(n_e-1)/\lambda$, which is larger. Therefore, the latter configuration shown in FIG. 9*b* with the empty bottom cell (5) is preferable. When the bottom cell is filled, polarisation independent modulation is achieved and no need for the output polariser.

Figure 9C:
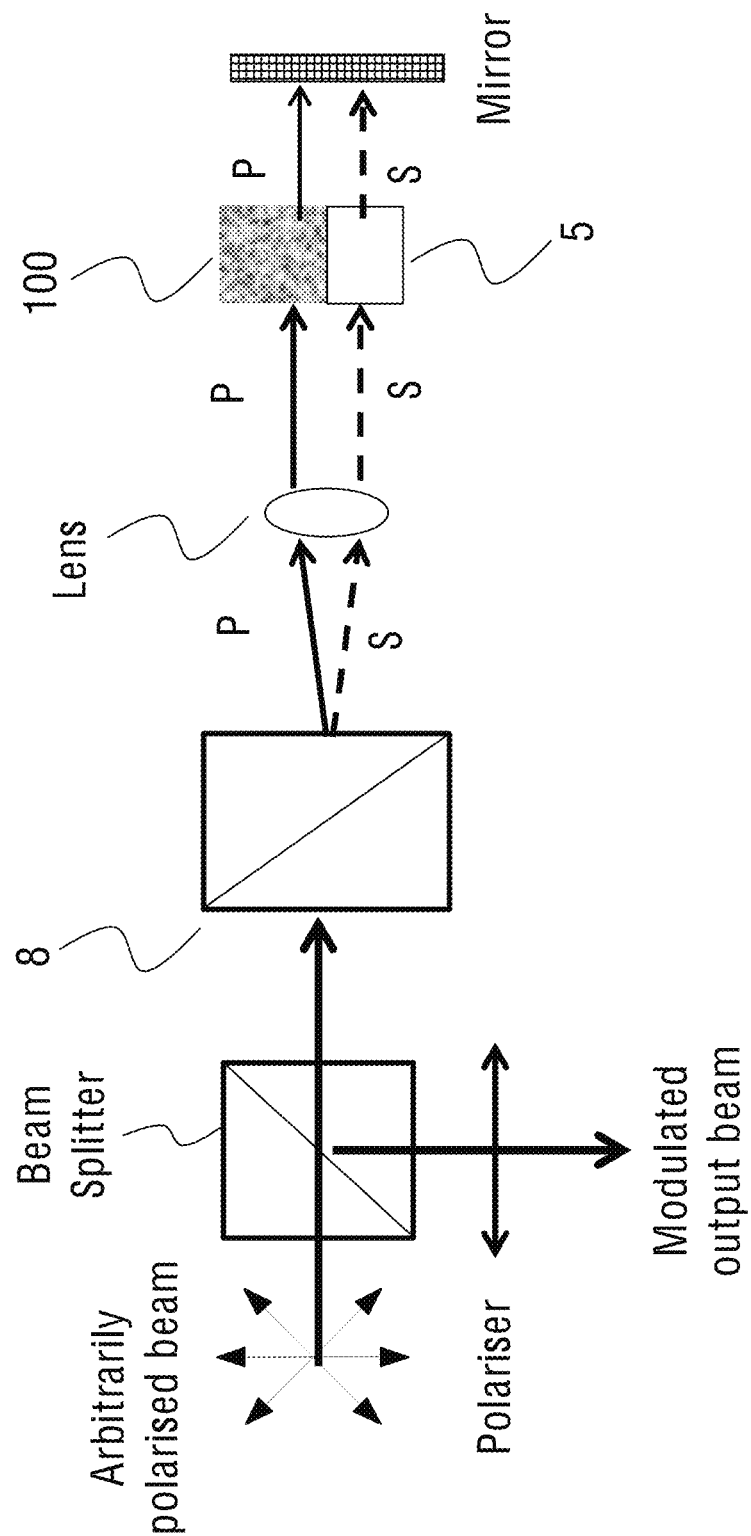
FIG. 9c schematically shows a liquid-crystal retarder system with improved light throughput, incorporating the Wollaston polariser or the Rochon polariser, having the bottom cell empty or filled and positioned at 0 degree, and operating in a reflection mode.

Reference is now made to FIG. 9*c* showing the equivalent configuration with only one Wollaston polariser or with one Rochon polariser (8) but operating in a reflection mode with the advantage of doubling the phase retardation to $\Gamma=4\pi d(n_e-1)/\lambda$. The polarisation-independent phase modulation can also be achieved in all the configurations shown in FIGS. 9*a*-9*c*, provided that, for example, a half-waveplate or polarisation rotator is inserted in the path of the S-beam both before and after the cell, so that the light beam passing the cell (5) becomes P-polarised and converted back to S to be recombined with the other beam in the Wollaston or Rochon polariser.

System Configuration 5: Two-Channel Mach-Zehnder Interferometer

Figure 10:
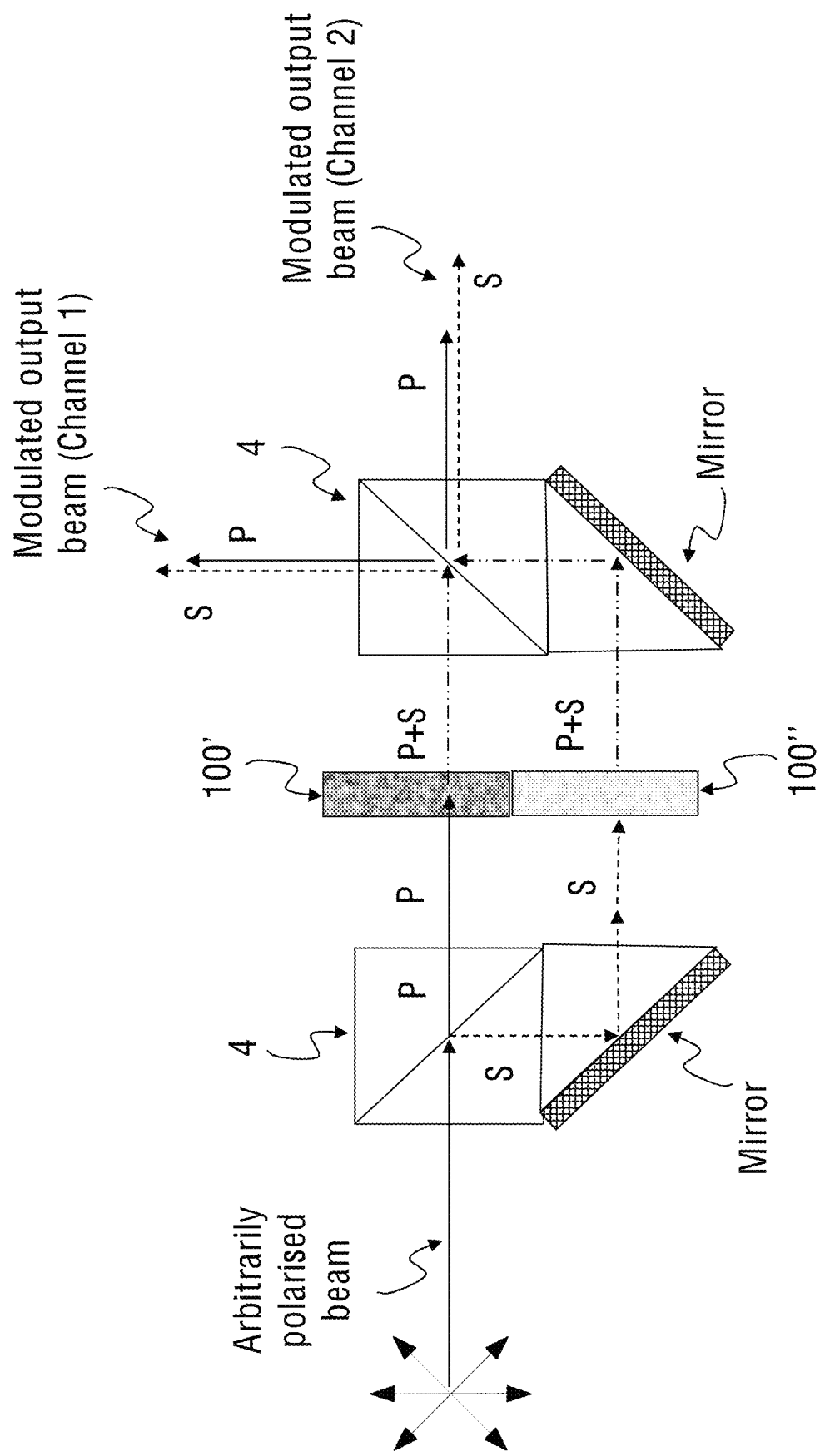
FIG. 10 schematically shows a liquid-crystal retarder system with improved light throughput based on the two-channel Mach-Zehnder interferometer configuration.

Reference is now made to FIG. 10 showing the Mach-Zehnder interferometer configuration with two channels. It is similar to the configuration shown in FIG. 5a except that there are two LCDs (100' and 100"), and their optic axes are aligned at 45 degrees with respect to the P or S polarisations, both at the top and at the bottom of the system. As a result, the two beams become modulated, and when passing through the output polarised beam splitter (4), two modulated channels of the same or differently modulated beams are obtained. This configuration has no loss in light throughput and the advantage of having two modulated beams at the same time, which can be useful for measuring two different samples simultaneously.

System Configuration 6: Fabry-Perot Interferometer

A Fabry—Pérot interferometer (resonator or etalon) is a linear optical resonator (or cavity) which consists of two highly reflecting parallel mirrors or made of a transparent plate with two reflecting surfaces (having some small transmissivity) and is often used as a high-resolution optical spectrometer.

Figure 11:
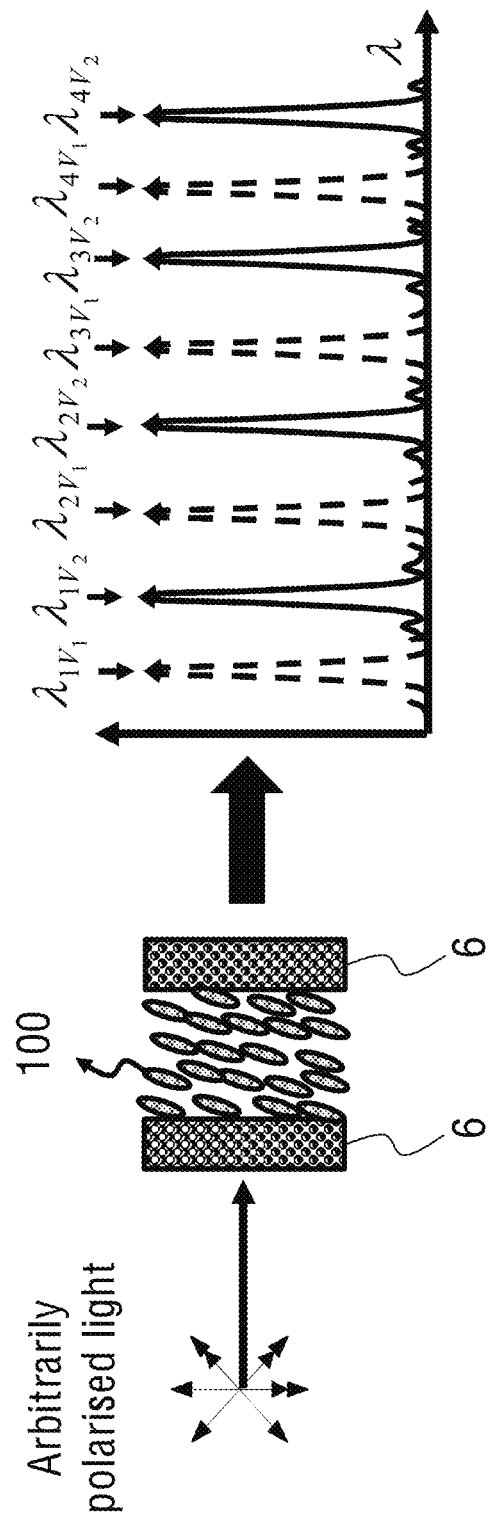
FIG. 11 schematically shows a liquid-crystal retarder system based on a thick liquid crystal Fabry-Perot interferometer.

Reference is now made to FIG. 11 schematically showing a system configuration comprising the LCD of the present invention and based on a thick liquid crystal Fabry-Perot interferometer, which produces large number of narrow spectral bands in the transmission spectrum. The narrow bands shown in FIG. 11 can be modulated with the applied voltage. The dashed peaks in the spectrum are obtained at voltage V1, while the solid curves are obtained at voltage V2. The tuneable multiple-band Fabry-Perot can also be used in multispectral imaging with the bands selected are the ones of interest, thus replacing the passive multiple bandpass filter. This configuration has an advantage of achieving high resolution within shorter processing time in the compressed sensing or computational spectroscopy methodologies.

The system configuration shown in FIG. 11 may be combined with coloured parallel detectors. As an example, consider an output of three wavelengths centred at the standard colour camera band at 450 nm, 550 and 650 nm. Since the three bands are tuned, three spectral images are obtained at each voltage, and the final number of spectral images obtained is the number of the voltages multiplied by 3. Similarly, with the relatively modern multispectral parallel detectors, it is possible to design the Fabry-Pérot resonator with the LCD of the present invention to produce peaks centred at the major wavelengths of the coloured pixels, and by tuning them the larger number of spectral images can be obtained. The thick LCD (100) of the present invention shown in FIG. 11 is sandwiched between either two regular dielectric mirrors or polarisation conversion mirrors (6). In the case of the polarisation conversion mirrors, the output is polarisation-independent, thereby creating larger light throughput. In case of the regular mirrors, the light has to be linearly polarised.

In yet further embodiment, the dielectric mirrors (6) in FIG. 11 may be made in a way that the reflection and transmission through the device exhibit interference with no need for polarisers, for example by having different reflectivity at different wavelengths. The tuneable birefringent element (TBE) sandwiched between these two mirrors can then tune these colours by applying an external field. If the TBE layer is made thick enough, then the colours can disappear at the high retardation state, because the different interference orders become close to each other. As the retardation decreases, for example by applying voltage to the LCD (100), the interference orders become separated, and colours start to appear depending on the applied voltage or temperature. Thus, using this configuration, an interference-based smart window can be built.

The system configurations of the above embodiments, which incorporate both the LCD (100) and the empty cell (5) can be used for measurements of a refractive index or thickness of transparent materials. These configurations acting as orthogonal polarisation interferometers have the LCD sample arm (100) with the S-polarisation and the empty cell reference arm (5) with the P-polarised beam. As described above, the reference arm may contain the cell filled with liquid crystal or tuneable birefringent element instead and then should be positioned at 0 degree. The output phase of the light traversing the sample can be measured similar to the phase-shift interferometry by providing different known phase changes to the P-polarised beam passing the tuneable birefringent element. The output analyser is a must in this case in order to combine the two beams. It is then possible to extract the phase change of the light traversing the sample from the output signal after the output analyser by providing at least three known different phase differences between the reference and sample arms. This can be used for refractive index measurement of gases and liquids flowing through the empty cell or for solid transparent materials. In the case of the solid transparent materials, it is possible to measure their thickness, assuming that the refractive index is known. Alternatively, it is also possible to extract intrinsic birefringence in the sample and calculate stresses in the sample material, for example, in glass.

Figure 12A:
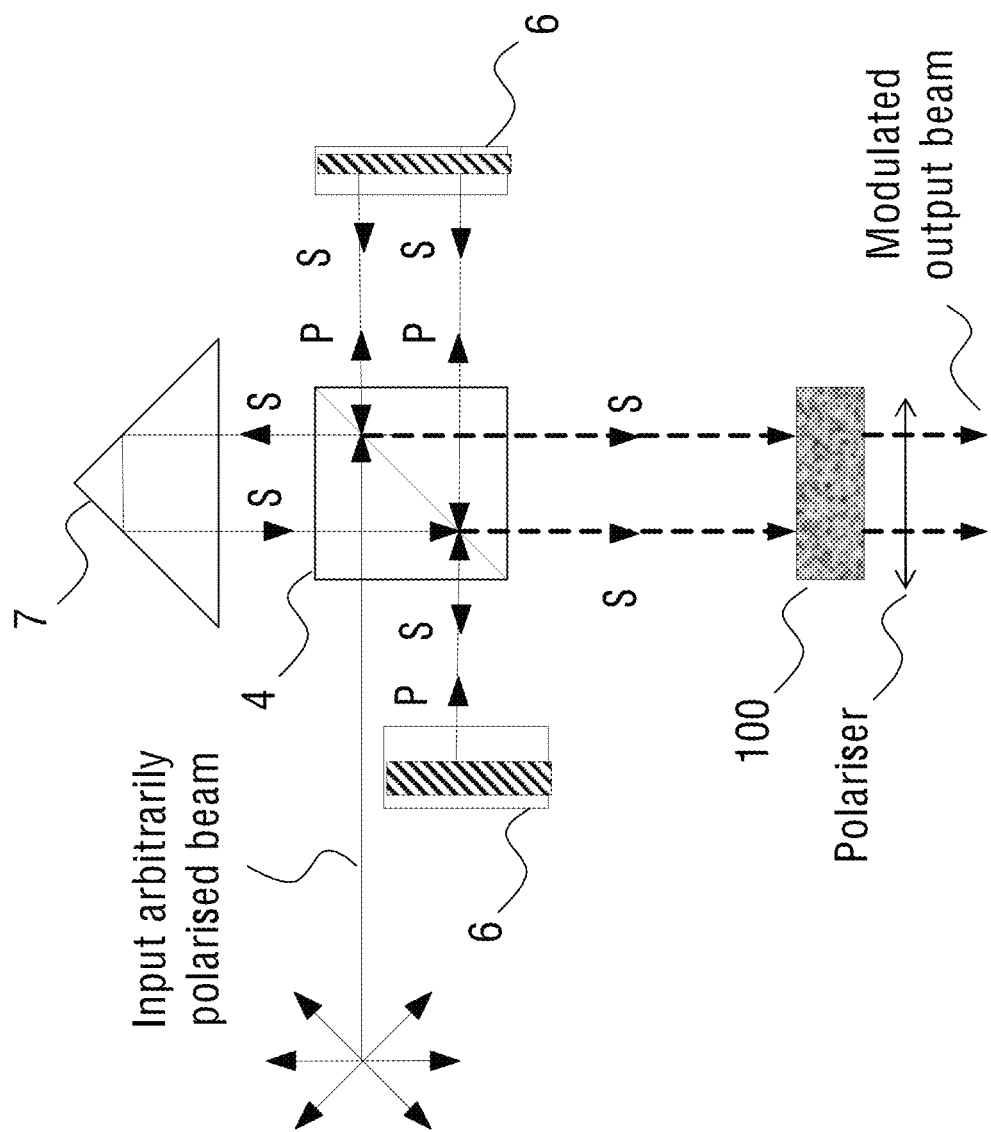
FIG. 12a schematically shows a liquid-crystal retarder system having a spatial separation configuration for converting one of the polarisations into the other.

In a further embodiment, the system of the present invention can be configured to convert one of the polarisations into the other. The system shown in FIG. 12a has a spatial separation configuration, while the system shown in FIG. 12b has an angular separation configuration. The polarisation conversion in FIG. 12a is done with the help of the polarised beam splitters (4) and polarisation conversion mirrors (6). The LCD (100) must be oriented at 45 degrees to the output polarisation direction, and the net phase retardation is then calculated as $\Gamma = 2\pi d(n_e - n_o)/\lambda$ with the advantage of having higher light throughput.

Figure 12B:
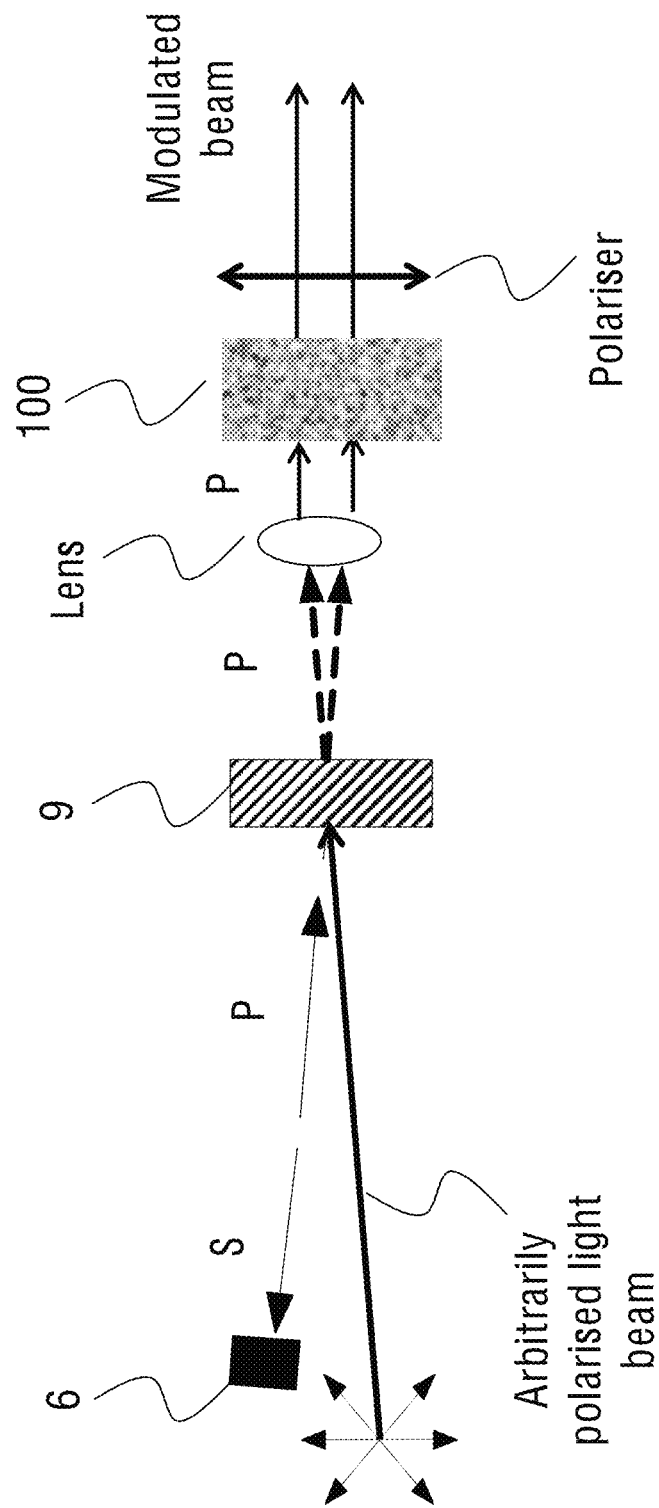
FIG. 12b schematically shows a liquid-crystal retarder system having an angular separation configuration for converting one of the polarisations into the other.

The configuration shown in FIG. 12b has a further advantage of using the flat elements, such as a wire grid polariser (9) or an achromatic quarter waveplate (not shown). The wire grid polariser (9) lets the P-polarisation to pass but reflects the S polarisation. Consequently, the S-polarised beam upon reflection from the polarisation conversion mirror (6) becomes P-polarised, thus passing through the wire grid polariser (9) at different angle from the initial P-polarised beam. The angles of the two beams should be small in order to avoid any modulation variations over different sections of the beams. The liquid crystal device (100) positioned at 45 degrees, capable of minimising the angle dependence, such as pi-cell, is preferably used in this case.

Figure 13:
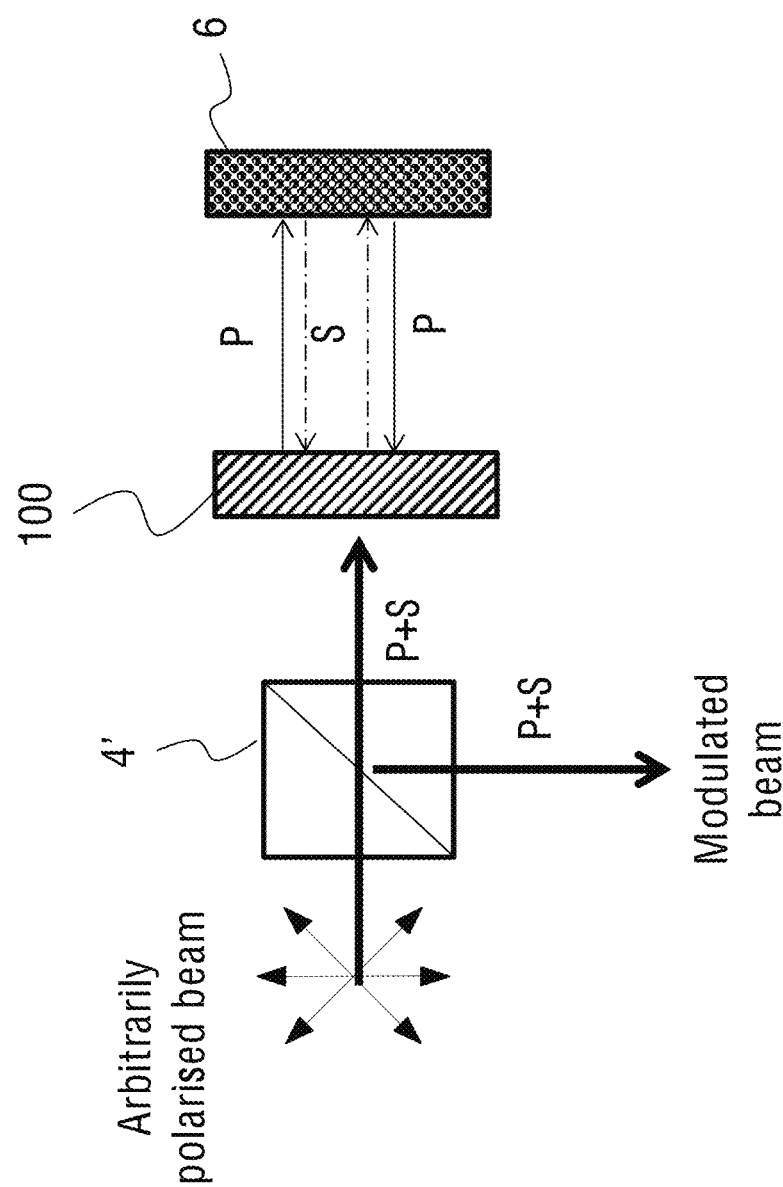
FIG. 13 schematically shows a liquid-crystal retarder system with a polarisation conversion mirror for polarisation-independent phase-only modulation.

Reference is now made to FIG. 13 showing a polarisation liquid-crystal retarder system with a polarisation conversion mirror (6) for polarisation-independent phase-only modulation. In this configuration, the polarisation conversion mirror (6) is installed behind the LCD (100) oriented at an arbitrary angle. In a specific embodiment, the polarisation conversion mirror (6) may comprise a quarter waveplate (QWP) combined with a mirror, or it can be made of a metallic grating with the grating lines having Gaussian profile. In another specific embodiment, a Faraday rotator can also operate as the polarisation conversion mirror (6) in the reflection mode.

The P polarisation is converted to S upon reflection, while S converts to P. As a result, the two polarisations accumulate the same phase modulation as shown in FIG. 13. In fact, the retarder does not have to be oriented at a specific angle for the polarisation-independent phase-only modulation to occur. For the retarder with its optic axis oriented at an angle $\zeta$, the Jones matrix maybe written as:

$$W = \exp(-i\Gamma_{av}) \begin{pmatrix} \cos(\Gamma/2) - i\cos2\xi\sin(\Gamma/2) & -i\sin2\xi\sin(\Gamma/2) \\ -i\sin2\xi\sin(\Gamma/2) & \cos(\Gamma/2) + i\cos2\xi\sin(\Gamma/2) \end{pmatrix},$$

where $\Gamma_{av}=2\pi d(n_o-n_e)/2\lambda$ is the average retardation. In reflection using a polarisation reflection mirror, the Jones matrix becomes:

$$W_{tot} = i\exp(-2i\Gamma_{av}) \begin{pmatrix} \cos(\Gamma/2) - i\cos2\xi\sin(\Gamma/2) & i\sin2\xi\sin(\Gamma/2) \\ i\sin2\xi\sin(\Gamma/2) & \cos(\Gamma/2) + i\cos2\xi\sin(\Gamma/2) \end{pmatrix}$$

$$\begin{pmatrix} 0 & 1 \\ 1 & 0 \end{pmatrix} \begin{pmatrix} \cos(\Gamma/2) - i\cos2\xi\sin(\Gamma/2) & -i\sin2\xi\sin(\Gamma/2) \\ -i\sin2\xi\sin(\Gamma/2) & \cos(\Gamma/2) + i\cos2\xi\sin(\Gamma/2) \end{pmatrix} =$$

$$i\exp(-2i\Gamma_{av}) \begin{pmatrix} \cos(\Gamma/2) - i\cos2\xi\sin(\Gamma/2) & i\sin2\xi\sin(\Gamma/2) \\ i\sin2\xi\sin(\Gamma/2) & \cos(\Gamma/2) + i\cos2\xi\sin(\Gamma/2) \end{pmatrix}$$

$$\begin{pmatrix} -i\sin2\xi\sin(\Gamma/2) & \cos(\Gamma/2) + i\cos2\xi\sin(\Gamma/2) \\ \cos(\Gamma/2) - i\cos2\xi\sin(\Gamma/2) & -i\sin2\xi\sin(\Gamma/2) \end{pmatrix} =$$

$$i\exp(-2i\Gamma_{av}) \begin{pmatrix} 0 & 1 \\ 1 & 0 \end{pmatrix}$$

As a result, the assembly of an arbitrarily oriented retarder and polarisation conversion mirror acts as a polarisation-independent phase-only modulator with the phase modulation equal to $2\Gamma_{av}$. The beam splitter (4') shown in FIG. 13 is optional and may be removed if the light incidence is at oblique angle. Alternatively, the Sagnac configurations shown in FIGS. 8a-8d can be used in this system. In some of the LCD modes, such as the ferroelectric LC modes, twisted modes or in-plane switching modes, the optic axis rotates in the plane of the transparent panels and is characterised by the angle $\zeta$. Hence the presented polarisation-independent phase-modulation configuration can also work with ferroelectric liquid crystals which are faster.

Figure 14A:
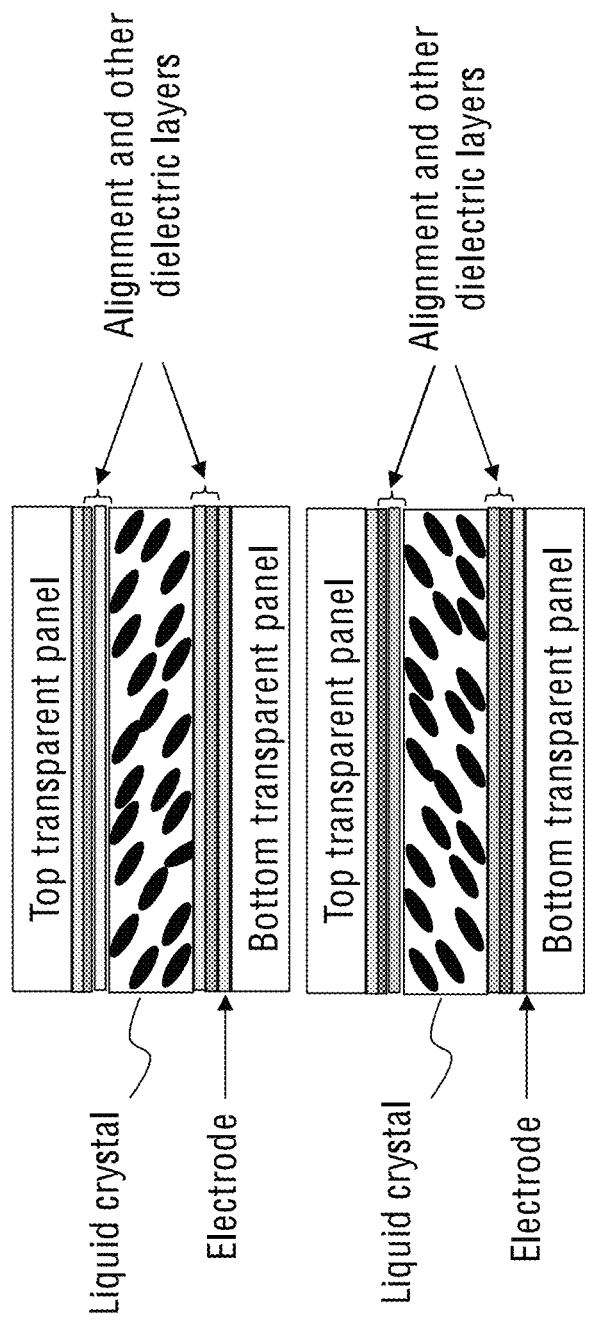
FIG. 14a schematically shows two anti-parallel aligned LCDs of the present embodiments positioned at 180 degrees to each other, so that the LC molecules of these two LCDs are mirrored to each other.
Figure 14B:
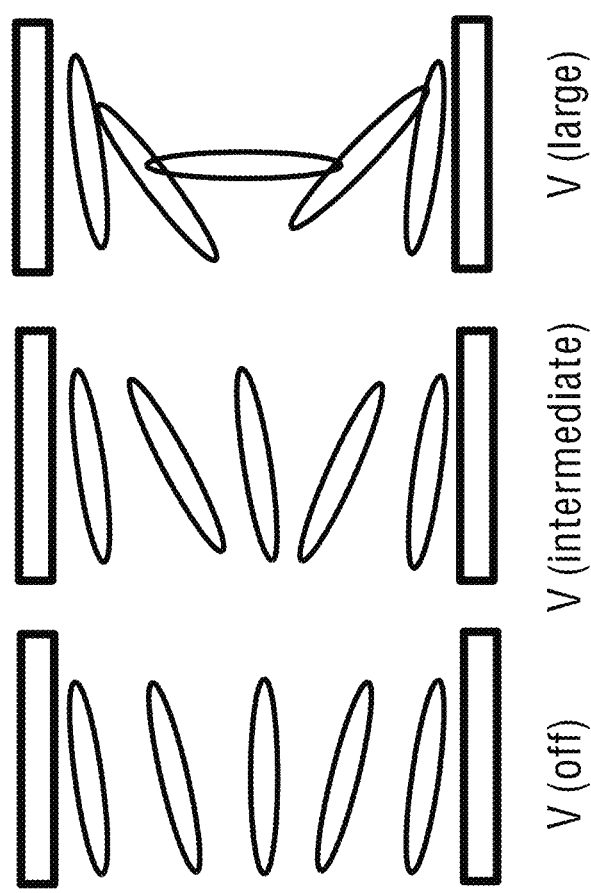
FIG. 14b schematically shows the pi-cell configuration of the LCD of the present invention.
Figure 15A:
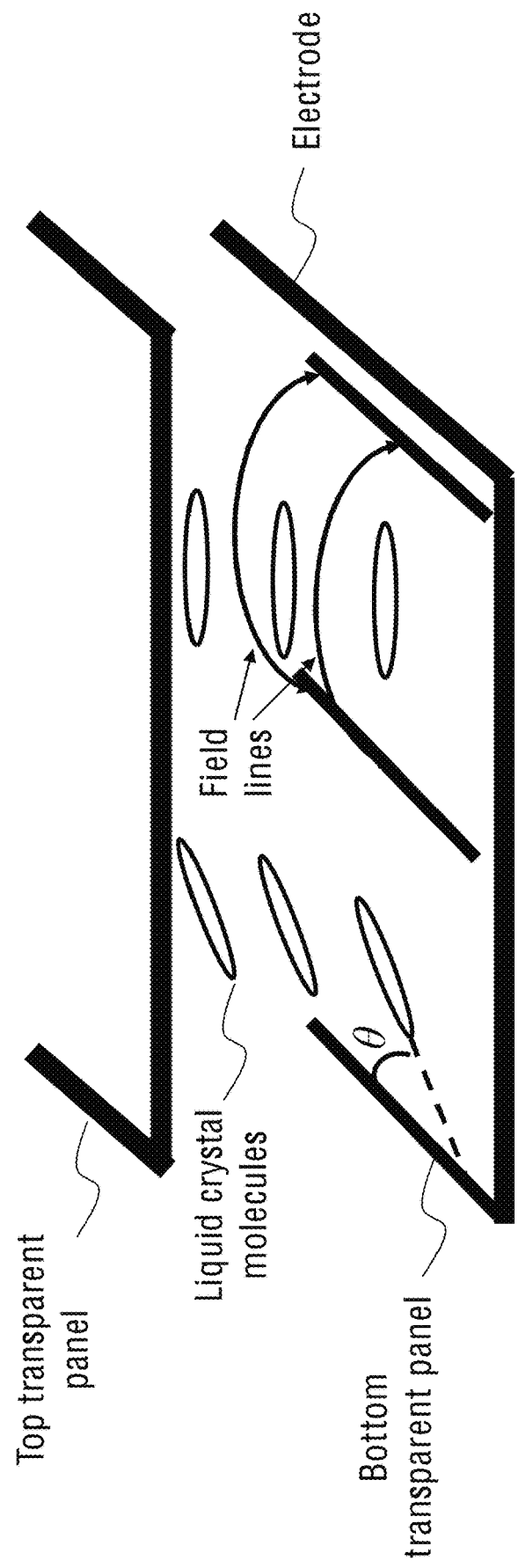
FIG. 15a schematically shows the in-plane switching mode in which the optic axis remains in the plane of the transparent panels of the LCD of the present invention.
Figure 15B:
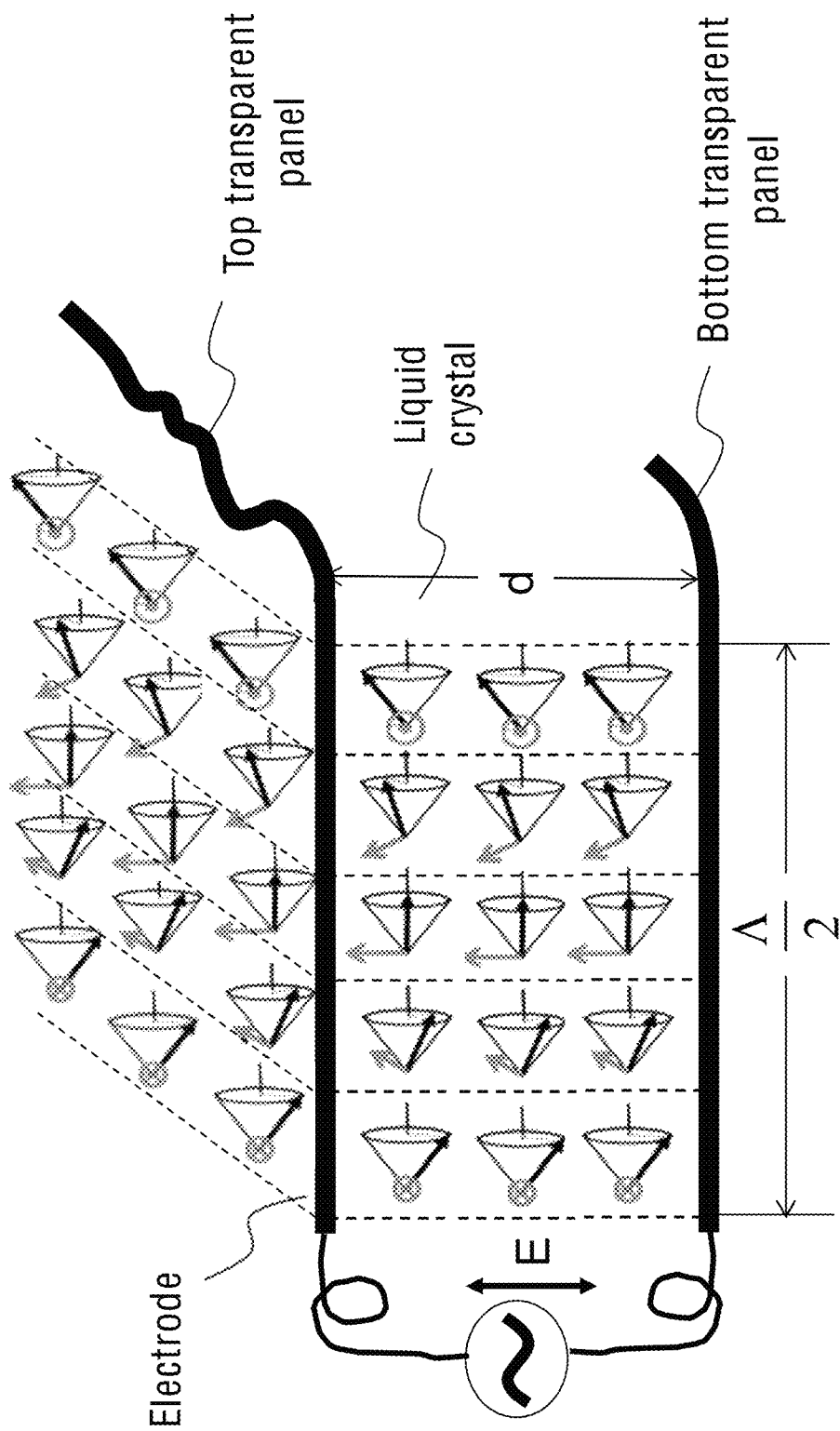
FIG. 15b schematically shows the ferroelectric mode of the LCD of the present invention.
Figure 16A:
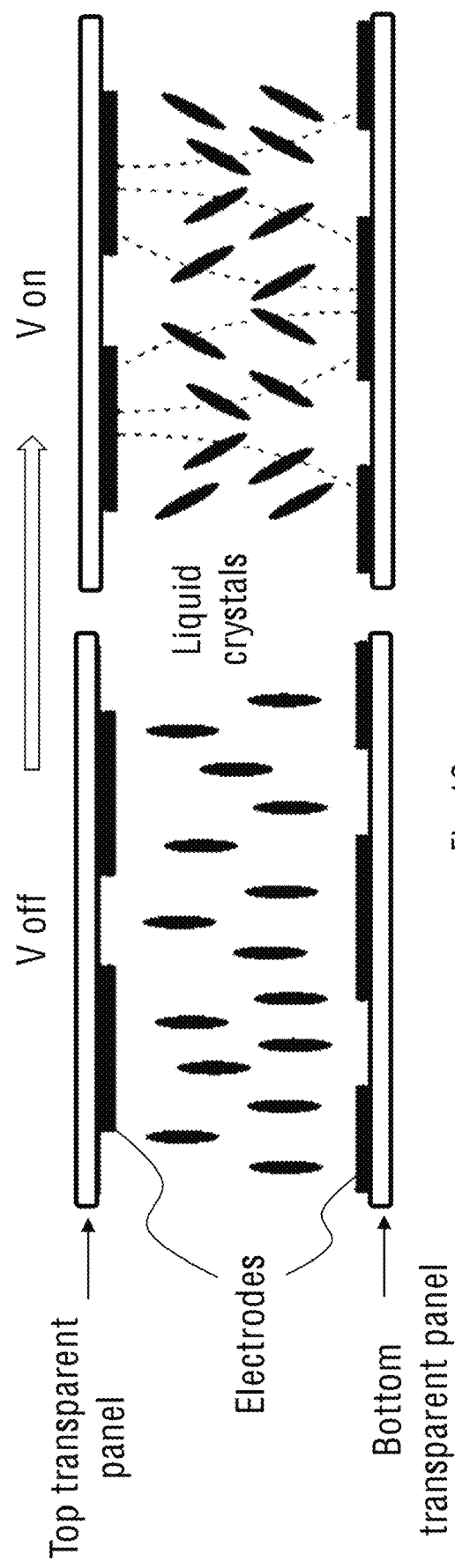
FIGS. 16a-16b schematically shows the multiple domains modes of the LCD of the invention that create small neighbouring domains compensating for asymmetry in the angle dependence, thereby improving the field of view.
Figure 16B:
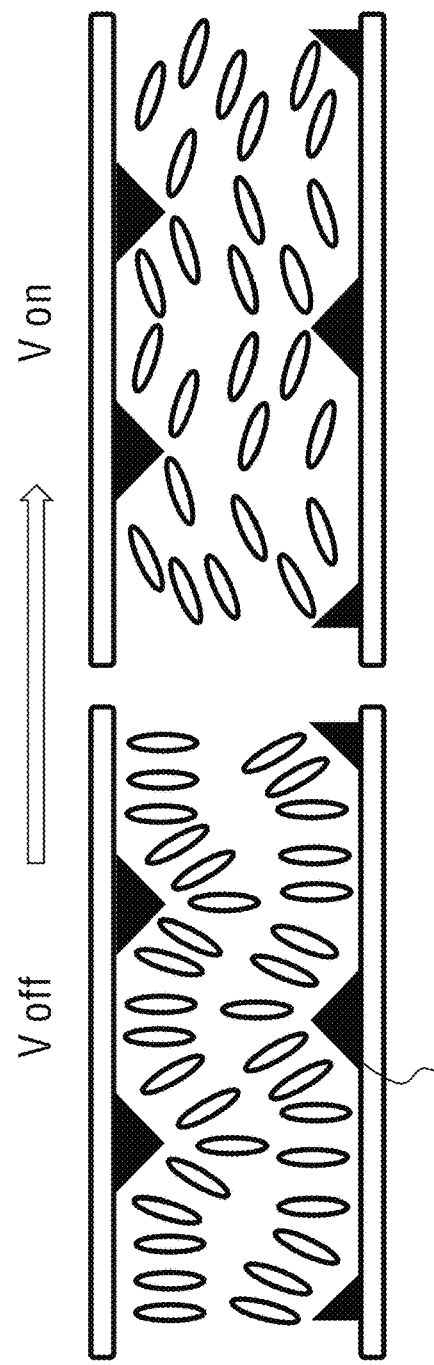

In a further embodiment, the spectral- or phase-modulated LCDs of the present invention are used in imaging systems which usually contain large angular extent. It is therefore critical to minimise the angular dependence of the phase retardations. Reference is now made to FIGS. 14a-14b showing the LCDs of the present invention that are capable of minimising the angle dependence. For example, FIG. 14a shows two anti-parallel aligned devices of the present invention positioned at 180 degrees to each other, so that the liquid crystal molecules of the top LCD mirror the molecules of the bottom LCD. FIG. 14b shows the configuration with the parallel aligned LCD, i.e., pi-cell. Since the two halves of the pi-cell are mirror images of each other, this device has wider field of view than the anti-parallel aligned LCD. The exemplary liquid crystal modes in which the optic axis remains in the plane of the LCD transparent panels are the in-plane switching mode shown in FIG. 15a and the ferroelectric mode shown in FIG. 15b. Another exemplary liquid crystal mode is shown in FIGS. 16a-16b illustrating the LCD with compensating waveplates and other modes containing multiple domains: (a) a patterned vertically aligned mode; and (b) a multi-domain vertically aligned mode, in two voltage regimes (switched of and switched on).

The LCD of the present invention can be modified to exhibit coloured bands on its surface which can be tuned with the voltage. Reference is now made to FIG. 17a showing a wedge-type LCD of the present embodiments with partially reflecting panels (10). Each panel (10) is coated with a transparent electrode and alignment layer. This LCD has a thickness varying in the range between $d_1$ and $d_2$ over the length L of the retarder, so that the wedge angle is determined by $\tan\overline{\omega}=(d_2-d_1)/L$. Because of the wedge, the coloured interference bands appear on the facets of the wedge which can be selected serially using the slit aperture. These coloured bands correspond to the maxima in transmission or reflection. Similarly, as shown in FIG. 17b, the wedge can be spherical, thereby producing the spectral (coloured) concentric rings appearing on the surface. These coloured rings (spherical bands) can be selected using the annular aperture. In both cases, the same effect can be obtained using a flat uniform LCD with highly resistive electrodes at high-frequency operation, so the voltage across the electrode is non-uniform and the colours will therefore appear due to the voltage distribution. The voltage non-uniformity in this case is a function of the frequency and electrical resistance. The highly resistive electrodes have conducting contacts on one side for activating the linear wedge and an annular contact around the liquid crystal active area for activating the spherical wedge. In the case of the linear wedge, the beam-steering effect can be made tuneable with the voltage because of the linear refractive index gradient. In case of the spherical wedge, the tuneable lensing effect can be created by applying symmetric voltage profile when using the annular highly conducting electrodes around the liquid crystal active area. This tuneable lensing effect makes it possible to use a polarisation-independent tuneable lens in the configurations of the embodiments described above for polarisation-independent phase-only modulation.

Thus, there are two configurations which can impart colour variations across the liquid crystal composite tuneable device of the present invention:

1) The LCD of the present invention has a negligible reflection from internal surfaces of its two transparent panels. In this case, the device should be oriented between crossed or parallel polarisers at the 45-degrees azimuthal angle, and the colour bands appear at the maxima of the transmission functions $T=\sin^2(\pi d\Delta n/\lambda)$ or $T=\cos^2(\pi d\Delta n/\lambda)$ depending on the product $d\Delta n$ which varies because of the wedge (d-variation) or the voltage ($\Delta n$ variation).

2) The LCD of the present invention has a high reflection from internal surfaces of its two transparent panels. In this case, multiple interferences having maxima at the surface of the device take place, when the condition for constructive interference on the surface of the device is fulfilled, depending on $dn_{o,e}/\lambda$ which varies because of the wedge (d-variation) or the voltage ($n_e$-variation) or the wavelength ($\lambda$).

The interference pictures shown in FIGS. 17a-17b suggest that it is possible to place an aperture (rectangular slit or circular aperture) centred at $d_c$ and having a width $\Delta$, so that only one colour passes at a particular voltage. If the transmission function is $T(\lambda, d)$, the total transmission of the spectrum from $\lambda_1$ till $\lambda_2$ of the slit is given by:

$$T_{slit} = \int_{\lambda_1}^{\lambda_2} \int_{d_c-\Delta/2}^{d_c+\Delta/2} T(\lambda, t) d\lambda dt,$$

where the variable d is changed to t inside the integral. Thus, the narrower the aperture is used, the narrower the spectral line is selected.

Reference is now made to FIG. 18 showing a tuneable filtering system comprising the LCD (100) of the present invention with a passive linearly variable bandpass filter (11), which is commercially available, for example from Delta Optical Thin Film, and prepared on a transparent substrate. The common mode of using such filters is by mechanically moving them. However, mechanical motion is slow and might add noise to the imaging or sensing system. In the system configuration of the present embodiment, the LCD (100) is combined with the linearly variable passive filter (11), and therefore, it is capable of selecting one or more different transmitted spectral passbands at a time. A lens system (12) then directs the filtered beam and couples it into an optical fibre (13) or focuses it onto an imaging or sensing system (not shown in the figure).

Figure 19:
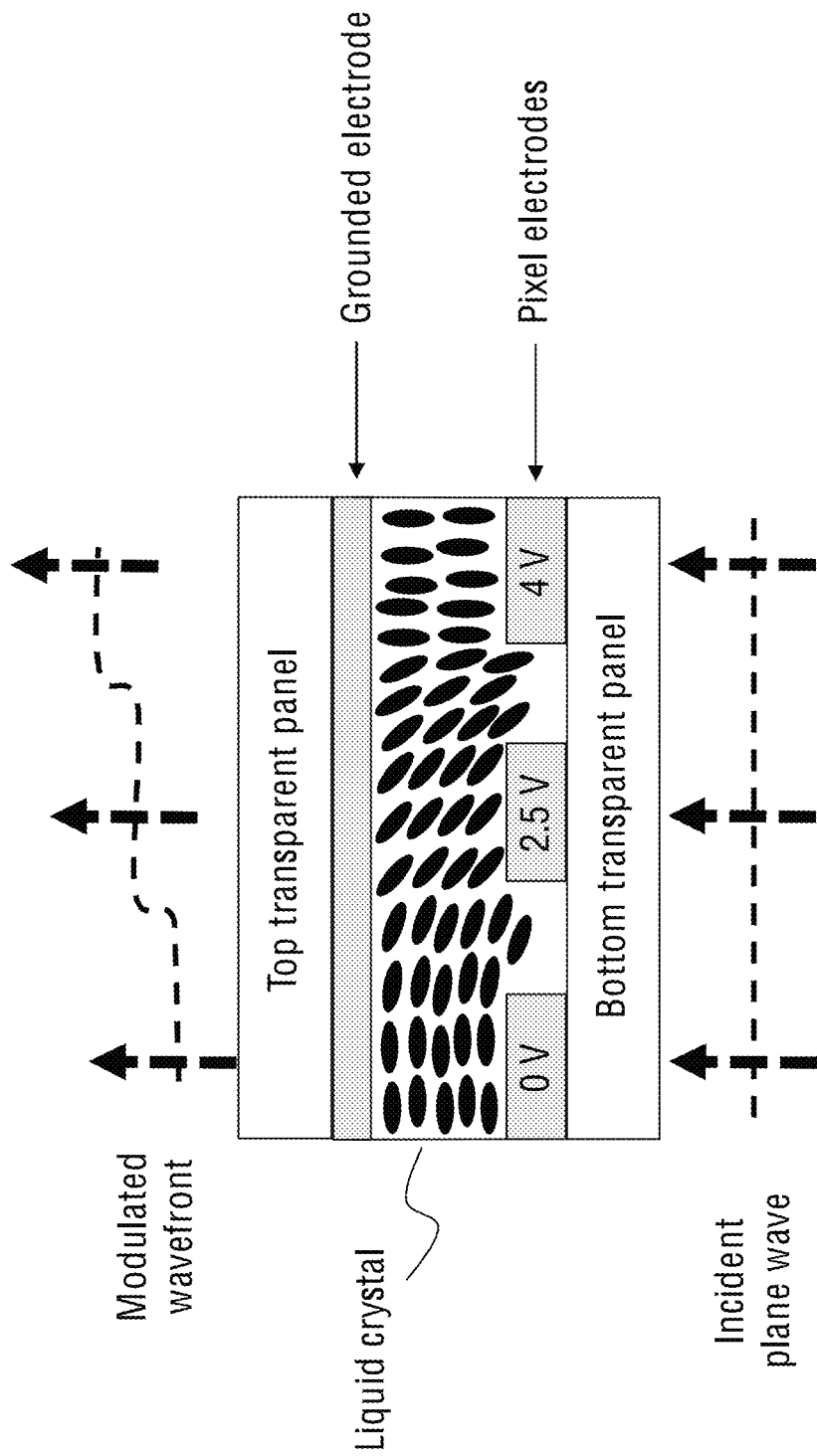
FIG. 19 schematically shows a pixelated liquid crystal composite tuneable device of the embodiments.

As shown in FIG. 19, the LCD of the present invention may be pixelated. Such pixelated LCD (100) is integrated within a polarisation-independent assembly (14) which is shown in FIG. 18. The pixelated LCD (100) further comprises two polarisers (not shown here) positioned either in a parallel or crossed configuration, so that the voltage on each pixel or group of pixels facing the beam coming from one single passband is transmitted, while all other bands are blocked.

A single LCD (100) is capable of selecting a limited range of wavelengths and relatively wide band beam. However, for a wide range and narrow-band operation, three LCDs maybe installed in the system. Two of them form a two-stage Lyot filter, and the third is installed between the crossed polarisers, so it can block the side interference peaks of the Lyot filter, thereby improving the dynamic range by approximately the factor of 2. Another option would be to use three LCDs, each one of them installed between the crossed polarisers and having their LC layer thicknesses as d, 3 d and 5 d, thereby providing a wider dynamic range and creating the narrowband beams with a smaller full width at the half maximum (FWHM), compared to a single LCD system.

Figure 20:
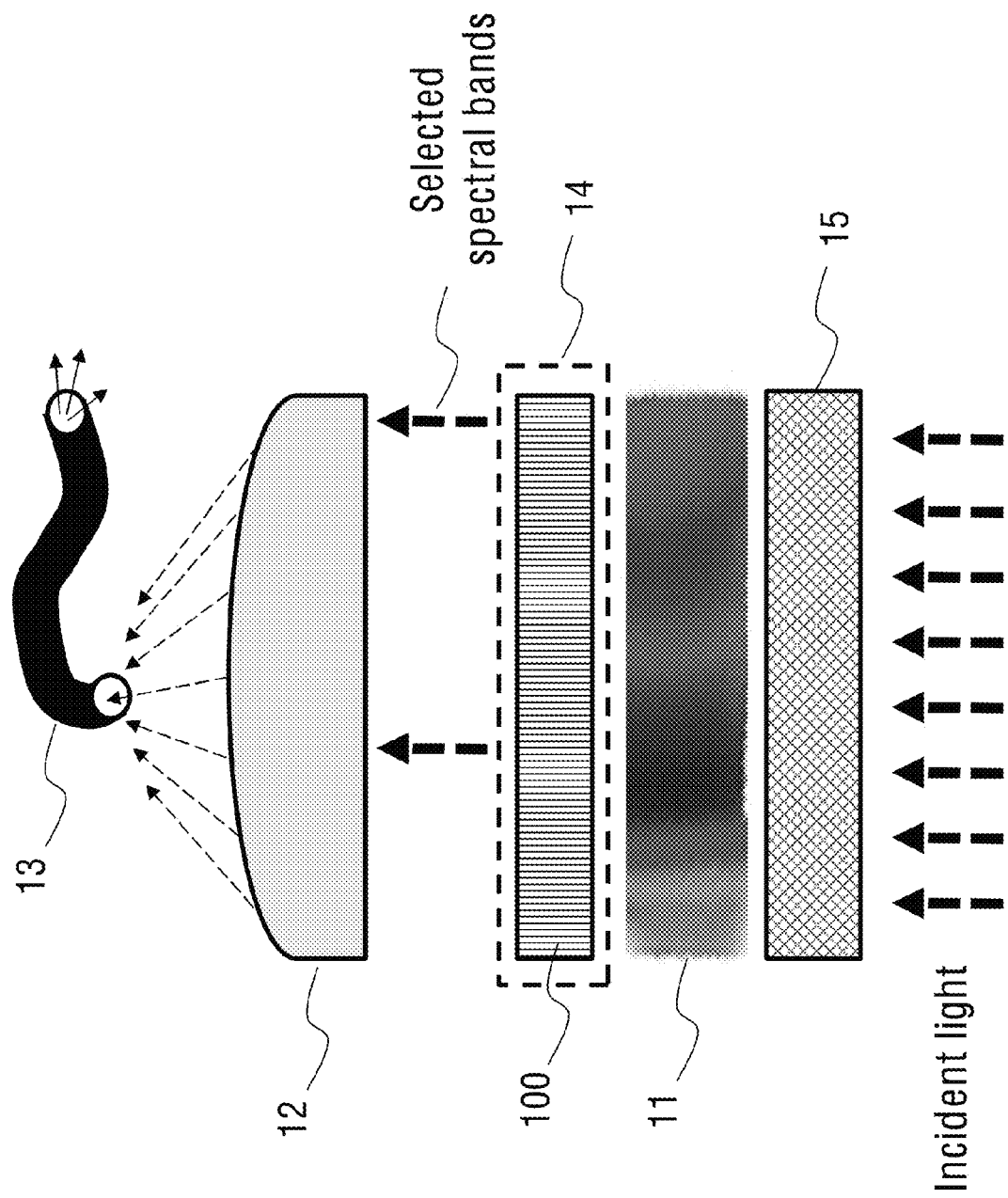
FIG. 20 schematically shows a tuneable filtering system comprising the LCD of the present invention with a dispersive element.

FIG. 20 schematically shows a tuneable filtering system comprising the LCD of the present invention with a dispersive element (15) having appropriate optics. The dispersive element (15) can be a prism or grating and can produce the array of filtered beams. The system of the present embodiment can operate also in a reflection mode with appropriate and commercially available mirrors, lenses, and polarised beam splitters arrangements. In this configuration the linearly variable passive filter (11) of the previous configuration may also be replaced with a passive wedged cavity similar to that shown in FIGS. 17a-17b, but without the voltage applied to the liquid crystal layer. Alternatively, the linearly variable passive filter (11) may be replaced with an empty cavity or a cavity filled with any passive material. In case of the spherical cavity, the pixelated LC device of FIGS. 18 and 20 should select an annular zone which is variable with the voltage applied.

Figure 21:
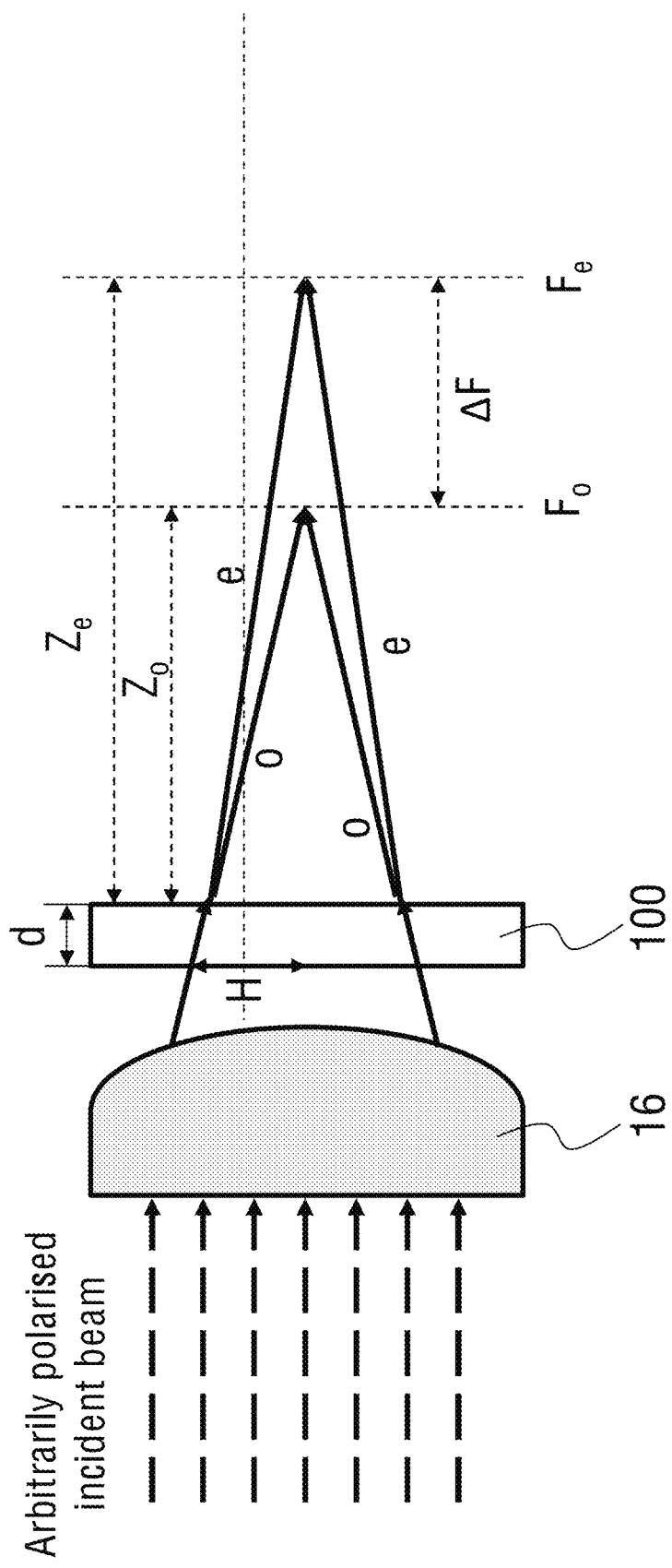
FIG. 21 schematically shows a double-focus system comprising the LCD of the present invention and a birefringent plate, a lens, or a lens system in the path of a converging beam.

Reference is now made to FIG. 21 schematically showing a double-focus system comprising the LCD (100) of the present invention and a birefringent plate, a lens or a lens system (16) installed in the path of a converging beam. It is known from ray optics that if a glass block of thickness $d_g$ is located in the path of a focused beam, the focal point shifts by an amount $\Delta F_g = d_g(\tan\alpha_g/\tan\alpha_i - 1)$, where $\alpha_i$, $\alpha_g$ are the incidence angle on the glass and the refraction angle inside the glass. These two angles are connected via Snell's law stating that $\sin\alpha_i = n_g \sin\alpha_g$, assuming that the glass block is located in air. However, the glass is usually isotropic, and therefore the two polarisations P and S are focused at the same point. In the presence of the LC layer having the thickness $d_{LC}$, these two orthogonal polarisations experience two different refractive indices $n_o$ and $n_e$ inside the LC layer ("o" stands for "ordinary" and "e" stands for "extraordinary". As a result, the two polarisations are focused at focal planes separated by:

$$\Delta F_{LC} = \frac{d_{LC}}{\tan\alpha_i}(\tan\alpha_e - \tan\alpha_o),$$

which for small angles can be approximated as $\Delta F_{LC} \approx d_{LC}(n_e - n_o)/n_e n_o$.

Since the refractive index of the extraordinary ray in nematic LCs can be varied between $n_\perp$ and $n_\parallel$, a double focus imaging is obtained at two orthogonal polarisations with the distance between the two focal planes variable by the amount:

$$\Delta F_{LC} \approx d_{LC}(n_\parallel - n_\perp)/n_\parallel n_\perp$$

Taking the typical values of the LC refractive indices of $n_\parallel = 1.76$ and $n_\perp = 1.51$, and thickness $d_{LC}$ of 100 μm, the calculated $\Delta F_{LC}$ will be approximately 9.8 μm. As a result, using the thicker LC layer and a material with higher birefringence, it is possible to obtain higher tunability of the focus. Thus, using this configuration several functionalities can be achieved:

1. If the light is polarized and the LCD is oriented such that only the extraordinary ray is excited, a tuneable focus is achieved using a planar LCD of the present invention. This can be used to perform the Z-scan in confocal microscopy or optical coherence tomography. By dynamically changing the focus, an extended depth of field imaging can be obtained. The same can be obtained using the polarisation-independent LCD of the embodiments, for example using the configurations of the embodiments described above with the advantage of no need for polarising the incident light.
2. Using the LCD of the present invention, which is tuneable faster than the camera frame rate, the focal plane may be modulated by dynamically tuning the LCD, so that the final image grabbed by the camera will have an extended depth of field. Although the contrast of the image will deteriorate in this case, some minor image processing can bring it back to nearly the same quality of a focused image.
3. A double focusing for each polarisation with one of the focal planes (extraordinary wave) can be made tuneable for unpolarised light, elliptically polarised light or linearly polarised light containing both P and S components, so that both the ordinary and the extraordinary beams are excited inside the birefringent LC layer. This functionality can be used for orthogonal polarisation interferometry or interference microscopy, as will be detailed with reference to FIG. 22 below.

Figure 22:
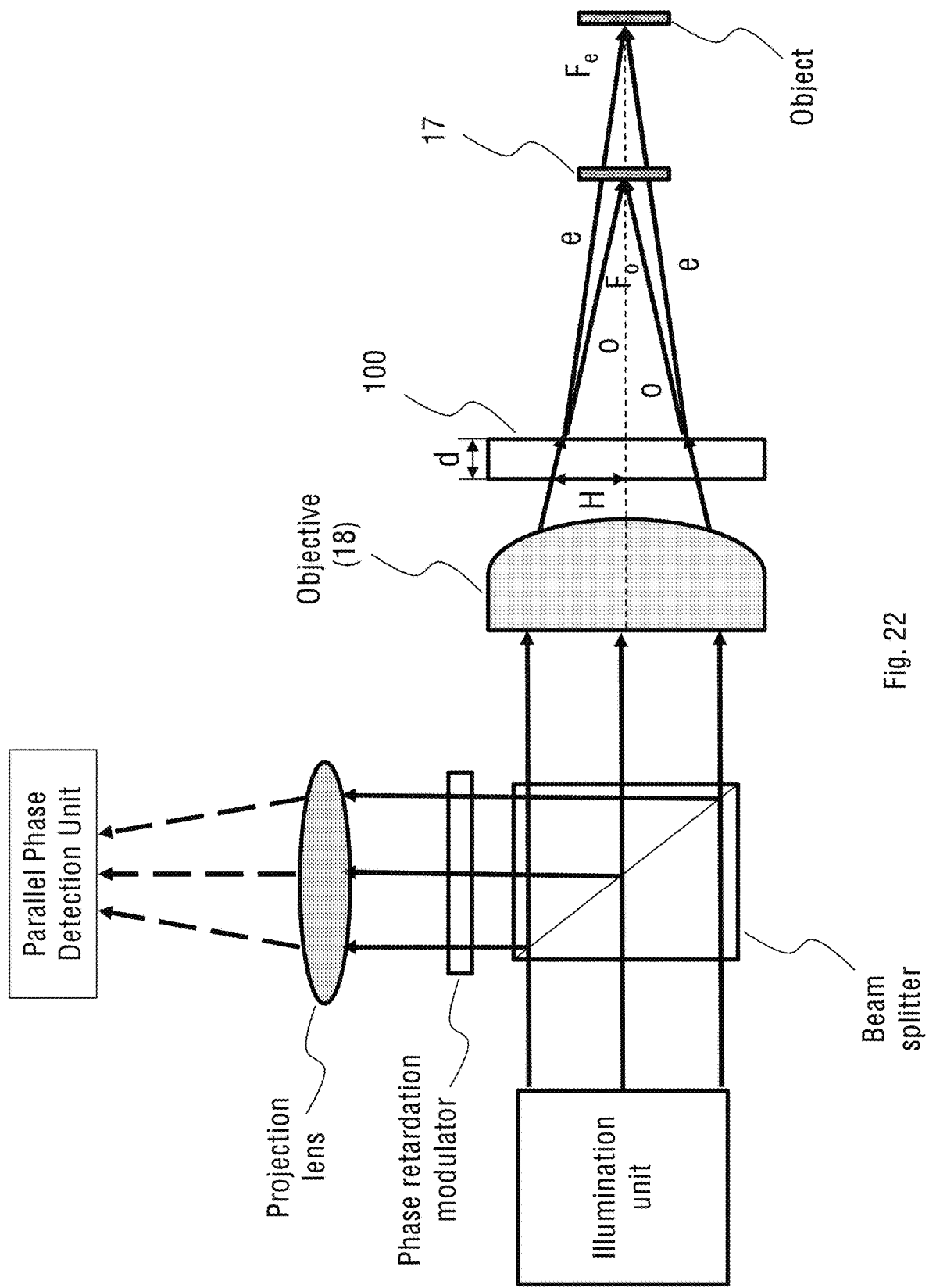
FIG. 22 schematically shows an orthogonally polarised beam in-line interferometer based on the system of FIG. 21 above.

It is possible to use a single channel (one camera or detector), but produce the phase shift between the two beams using a phase modulator located above the beam splitter as shown in FIG. 21. Reference is now made to FIG. 22 schematically showing an orthogonally polarised beam in-line interferometer based on the system configuration shown in FIG. 21. A polarisation splitting mirror (17) reflecting only the ordinary wave is introduced at the focal plane $F_o$ (ordinary), thereby producing a reference beam, while the object of interest is located at the focal plane $F_e$ (extraordinary). The polarisation splitting mirror (17) may be made of a planar wire grid polariser or using the multi-layered flat polarizing beam splitter available from 3M industries. If the path length difference between the two beams is within the coherence region of the incident beam, the almost common-path orthogonal polarisation interferometry is obtained. In this configuration, the two orthogonally polarised beams are split into three channels, and a waveplate is inserted in each channel to produce different phase shifts. The two orthogonal polarisations are then recombined at an analyser plane located before each detector (camera or single detector). Without the objective and projection lenses, this interferometer can still operate as an in-line parallel-beam interferometer (an orthogonal-polarisation interferometer with parallel beams) and may be used for serial phase modulation. There are many applications of this interferometer in the field (where sub-nm resolution range and the axial direction matter), for example surface topography, focus tracking and vibrometry.

Figure 23:
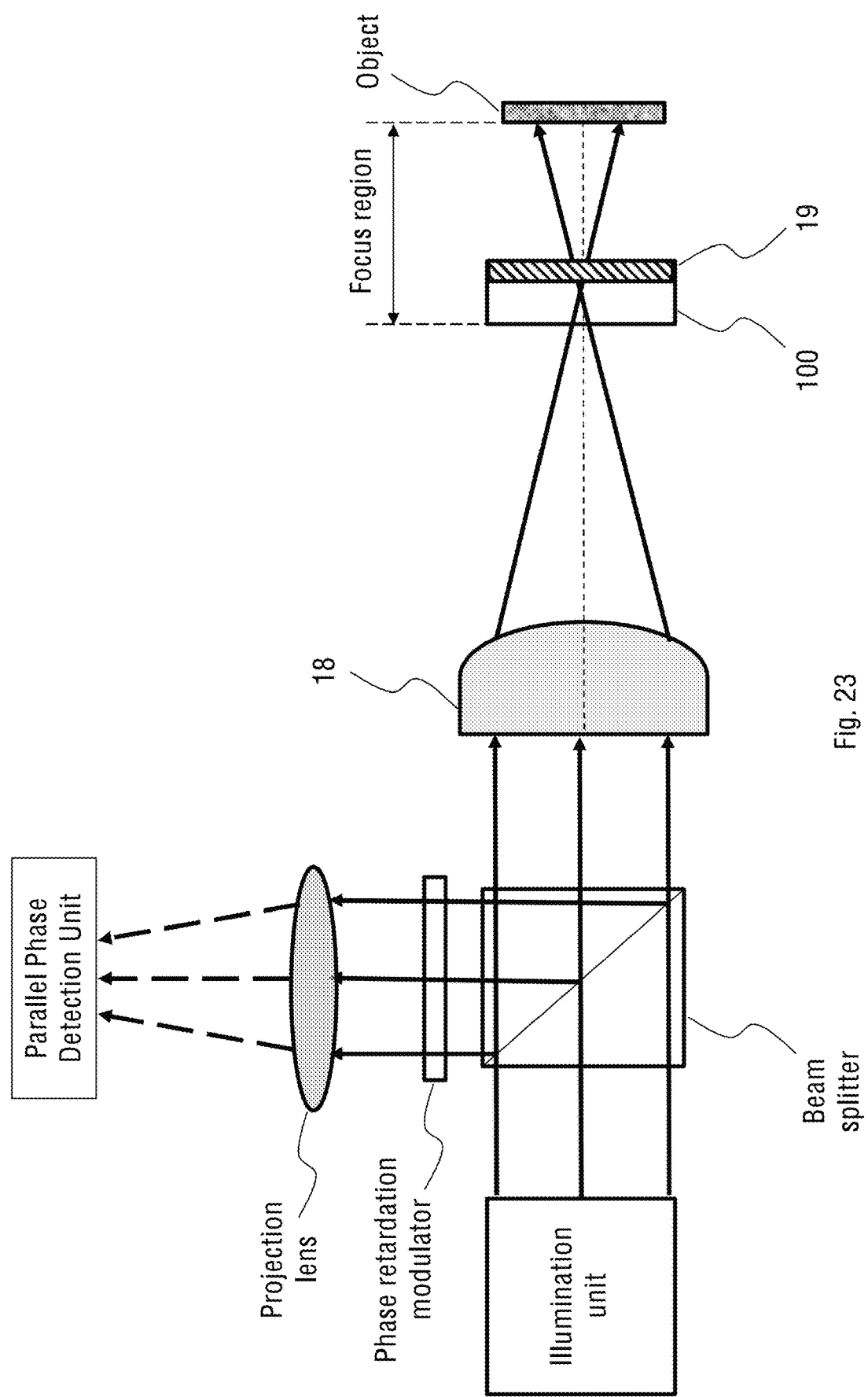
FIG. 23 schematically shows an orthogonally polarised beam in-line interferometer with the cholesteric LCD of the present invention combined with a quarter waveplate.

Reference is now made to FIG. 23 schematically showing an orthogonally polarised beam in-line interferometer having the cholesteric LCD (100) of the present invention combined with a quarter waveplate (19). The quarter waveplate (19) is inserted near the object of interest within the focal region of a microscope objective (18) and within the temporal coherence region of the beam, so that both left and right circularly polarised beams are reflected from within the focal region of the objective (18). The reflected wave from the cholesteric LCD (100) is circularly polarised having the same helicity as the cholesteric LC helix, while the transmitted wave has the opposite helicity. This selective reflection phenomenon is also known as the circular Bragg reflection phenomenon. The opposite helicity wave passes through the quarter waveplate (19), get reflected from the object and passes again through the quarter waveplate (19). Upon this round trip the wave's helicity remains unchanged, and therefore, it consequently passes back through the cholesteric LCD (100). As a result, there are two beams that are orthogonally polarised (right and left circularly polarised) which give the rise to the in-line orthogonally polarised interferometer of the present embodiments.

The two beams are brought together to interfere on a detector. At least three phase shifts can be introduced between the two beams serially using a modulator, or in parallel using at least three channels having different phase shifts. Since the two interfering beams are now circularly polarised, the phase shifts can be introduced by passing the two beams through the linear polarisers positioned at different orientations without the need for waveplates. The serial phase modulation can be achieved by rotating the linear polariser. Since the LCD (100) reflects one circular polarisation at certain range of wavelengths, the operating wavelengths can be chosen to be within the reflection band of the LCD (100).

It is possible to tune the reflection band, and consequently, to tune the operation spectral band by applying voltage to the LCD (100). This is really important if the multiple-wavelengths phase-shift interferometry mode is used which allows overcoming the phase unwrapping problems without any complicated algorithms. This interferometer can still operate without the objective and projection lenses, simply as an in-line orthogonal-polarisation interferometer. Another group of helical structures exhibiting the circular Bragg phenomenon can be equally used instead of the cholesteric LCD such as the chiral sculptured thin films prepared by the glancing angle deposition technique.

The double focus for two orthogonally linearly polarised beams can also be achieved using an LC lens or a combination of the LC phase-only spatial light modulator with a standard lens. To achieve this, a parabolic radial mask is written on the spatial light modulator plane with large number of pixels. The ordinary wave is not affected this way. It is focused in the close proximity to the original focal plane of the lens. The extraordinary wave is to the contrary modulated and shifted by the amount determined by the maximum phase written on the spatial light modulator and on the numerical aperture of the lens. A rough estimate for the case when the distance between the spatial light modulator and the lens is very small results in $\Delta f = \lambda \phi_{max}/\pi NA^2$. Polarisation-independent tuneable focusing can then be obtained by cascading two devices oriented at 90 degrees to each other, or by combining the proposed device with the polarisation-independent assembly configuration described above.

In another embodiment, the spatial light modulator may be used to extend the depth of field of the imaging system by placing it in the exit pupil plane and writing the annular regions on it that provide equal phase shifts, but variable from one annulus to another. In a specific embodiment, the spatial light modulator uses several parabolic profiles of the phase, each corresponding to slightly different focal point. The combination of the several focus regions provides an extended depth of field. Alternatively, one can scan the different phase shift masks fast enough, so that an average image is obtained with the extended depth of field. Minor image processing can then bring the image back to nearly the same quality as the original focused image.

Figure 24A:
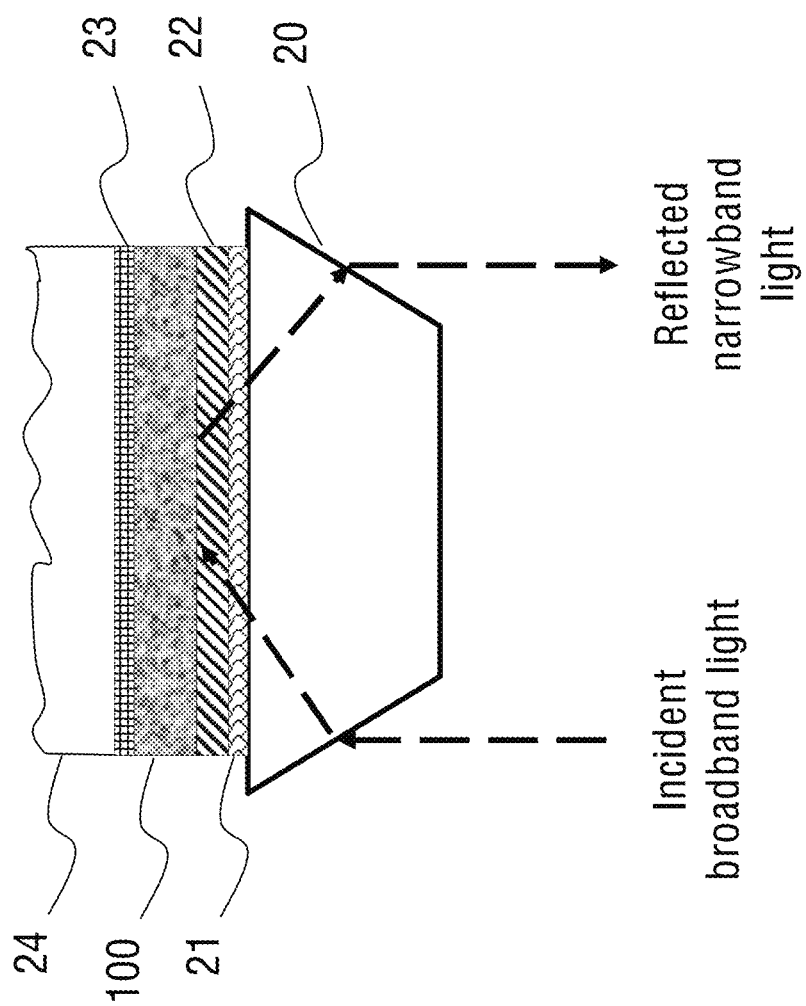
FIG. 24a schematically shows a wide-range tuneable spectral filter comprising a tuneable waveguide layer such as the LC of the present invention and a resonantly reflective multi-layered guided wave structure.
Figure 24B:
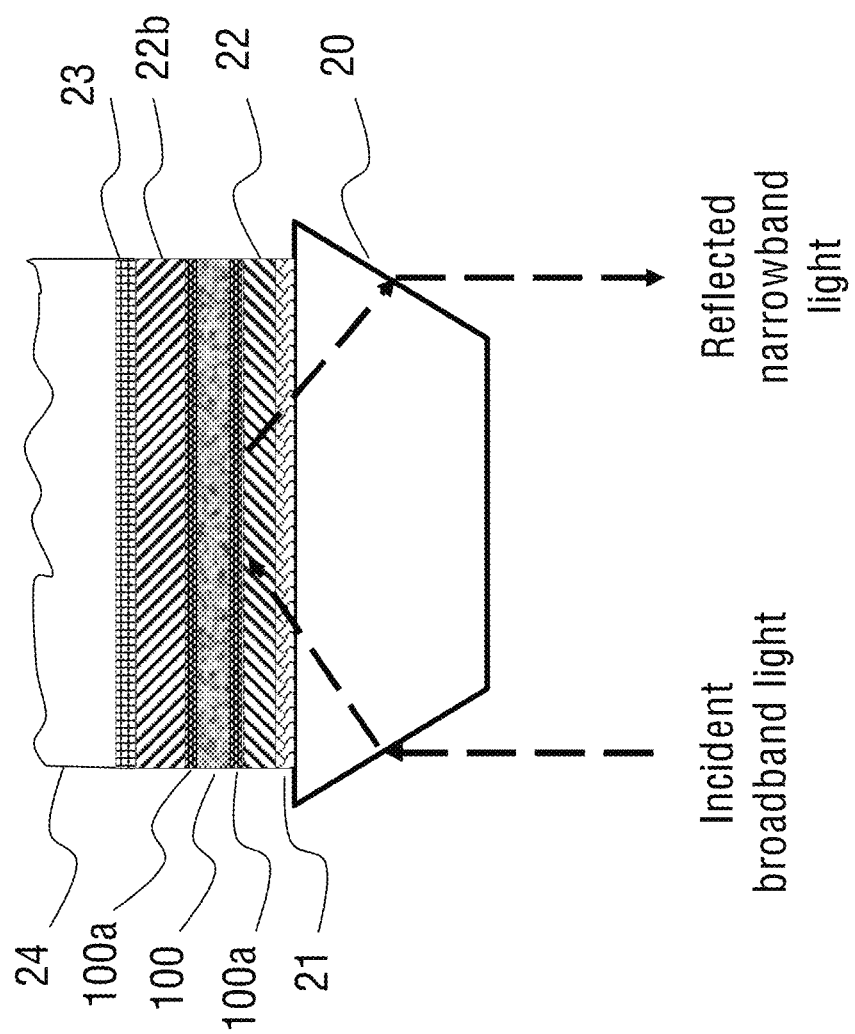
Figure 24C:
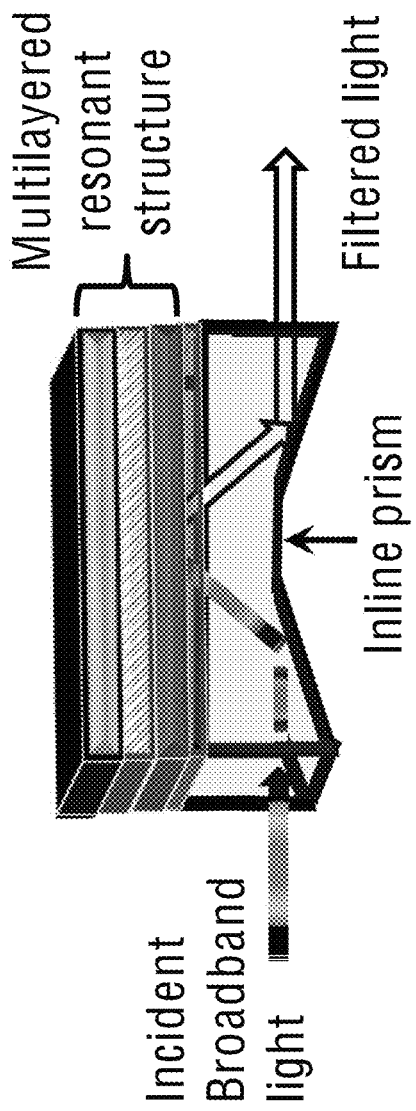
FIG. 24c schematically shows a prism made in the configuration allowing the incoming incident beam and the output reflected beam to be in line with each other, thus simplifying the incorporation of the tuneable filter or modulator into optical systems.

In yet further embodiment shown in FIG. 24a, a wide-range tuneable spectral filter comprises a coupling medium (20), such as a prism, gratings, a waveguide or an optical fibre, coated with a multilayer structure comprising a thin absorbing layer (21), such as metal (for example, chromium metal of 4-8-nm thickness for the visible and near infrared range, or thicker for larger wavelengths) in contact with said coupling medium (20), a low refractive index dielectric layer (22) acting as first clad or coupling layer (for example, magnesium fluoride or Si oxide having few hundreds of nanometre thickness) on top of said absorbing layer (21), the liquid crystal composite tuneable device (LCD) (100) of the present invention superimposed on top of said dielectric layer (22), a transparent electrode layer (23) coating the top transparent panel (1) of said LCD (100), and a semi-infinite dielectric medium layer (24) on top of said electrode layer (23). The absorbing layer (21) preferably be conducting such as absorbing metal, semimetal, or semiconductor to act also as a first electrode. This structure is actually a backward resonating structure with the resonance tuned by the liquid crystal composite tuneable device of the present invention. The tunability is obtained by modulating the optical path (thickness times the refractive index) of the waveguide layer (100). Hence in principle any transparent thermochromic, electrooptic, magnetooptic, piezoelectric or photosensitive layer can be used. The electrodes are required when tuning is to be done using electric field, however for magneto-optic, optical or thermo-optic tuning no electrodes are required. The resonance maybe interpreted in several terms, such as a special type of a guided mode resonance, Fano resonance or coupled waveguides resonance. Tunability can be achieved by modulating an external magnetic field, electric field, optical field, or thermal field applied to the filter. Since for this device, the modulation required is phase-only, then the LCD layer (100) maybe even replaced with other electro-optic, magneto-optic, photosensitive or thermo-optic material, which may provide easier means of preparation or operation or maybe exhibiting ultrafast tuning of the resonance wavelength. The dielectric layer (22) thickness strongly affects the full width at half maximum, and it is possible to get extremely narrow peaks by increasing the thickness of this layer. This is not possible by either using plasmonic structures because of their high absorption, or by the standard guided mode resonant structure at a wide spectral range as demonstrated here. The LCD layer with the two bounding alignment layers 100*a* is shown in FIG. 24*b*. To minimize losses due to interaction between the optical field in the waveguide and the top electrode, a low refractive index layer acting as a top clad layer maybe added between the waveguide layer and the top electrode layer. Note that a metallic absorbing layer 21 can be used as the bottom electrode in addition to functioning as the source of broadband lossy surface wave. The prism may also be made in the configuration shown in FIG. 24*c* to allow the incoming incident beam and the output reflected beam to be in line with each other thus simplifying the incorporation of the tuneable filter or modulator into optical systems.

The incident light beam can be generated after polarisation splitting using one of the system configurations of the embodiments described above. Thus, the entire system based on this backward resonating structure further comprises polarisation conversion elements to get the two polarisation components modulated similarly by the same device. The tuneable spectral filter of the present embodiment can be combined with the system configurations described above to achieve polarisation-independent operation.

The absorbing layer (21) and its combination with the dielectric layer (22) allows propagation of several types of surface electromagnetic waves, such as Zennick wave, Tamm wave, or surface plasmon resonance wave, however the choice of highly absorbing layer to excite a broadband lossy wave is the best as it allows the wide tuning range of the resulting Fano resonance. The LCD (100) of the present invention incorporated in this tuneable spectral filter is thick enough to allow guided waves. The interaction between the two different types of waves (surface electromagnetic waves and guided waves) causes a resonance in reflection due to constructive interference in the backward direction. The location of this resulting resonance is highly sensitive to the liquid crystal properties and therefore, can be used as a tuneable filter or a refractive index sensor. The advantages of this tuneable filter are in its wide range tuning, narrowband and fast response because the thickness of the LCD layer can be thinner than 1 micron for visible range operation. As mentioned above, other electro-optic, magneto-optic, photosensitive or thermo-optic materials can be used instead of the LCD layer.

Figure 25:
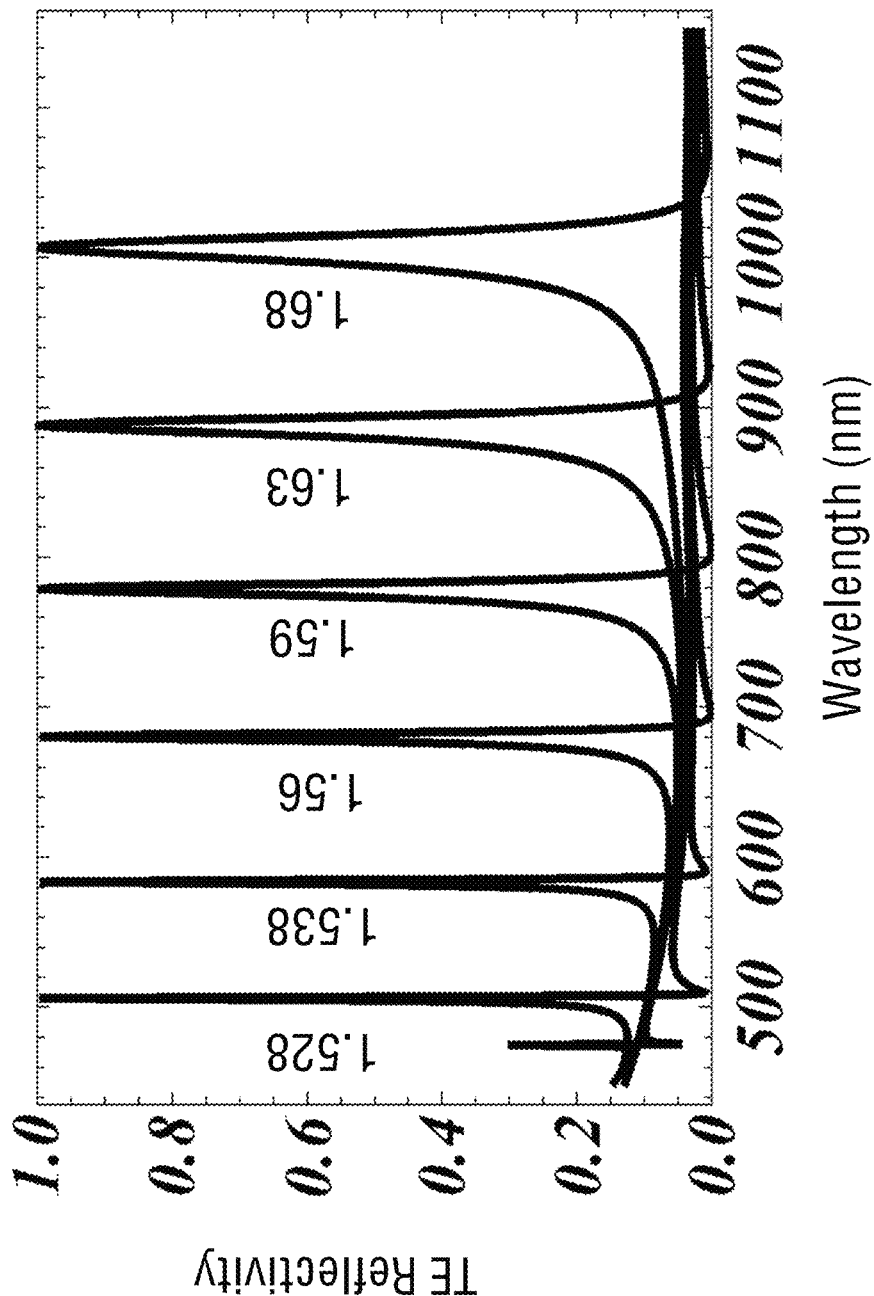
FIG. 25 shows an exemplary simulated transverse electric reflectivity from the wide-range tuneable spectral filter.

As an example, FIG. 25 shows a simulated transverse electric reflectivity from the wide-range tuneable spectral filter of the above embodiment shown in FIG. 24. In this example, the coupling medium (20) is a right angle SF11 glass prism, the angle of incidence inside the prism is 52 degrees, and the stack of layers is 6-nm Cr (21)/575-nm MgF$_2$ (22)/603-nm liquid crystal (100) oriented so that the extraordinary mode is excited, and the refractive index is variable as shown near each resonance peak/MgF$_2$ layer (22).

Considering the fact that the speed of electrooptic materials usually increases as their electrooptic effect becomes weaker, it is of high importance to increase the sensitivity of the resonance to the waveguide layer refractive index. This can be achieved by choosing the refractive index of the waveguide layer closer to that of the cladding. To demonstrate this, FIGS. 26*a*-26*d* show simulations for lower waveguide layer refractive index. The conditions are similar to the case in FIG. 25 except that the liquid crystal (100) layer has thickness of 1000 nm in FIGS. 26*a* and 26*c*, while it is 2000 nm in FIGS. 26*b* and 26*d*. Typically the refractive index difference between the clad and waveguide layers should be less than 0.1 and the waveguide layer thickness should be at least few wavelengths.

Note that for the transverse magnetic (TM) wave a dip is obtained in reflectivity and not a peak. This is observed in the majority of cases depending on the phases accumulated by this wave, however there are cases when a peak is observed also for TM wave, although not at the same position as that for the TE wave and it comes broader in width. Therefore, for polarization independent operation it is important to combine this structure with the different configurations proposed in this invention particularly those which convert the TM into TE polarization so that narrower filter is obtained.

Figure 26A:
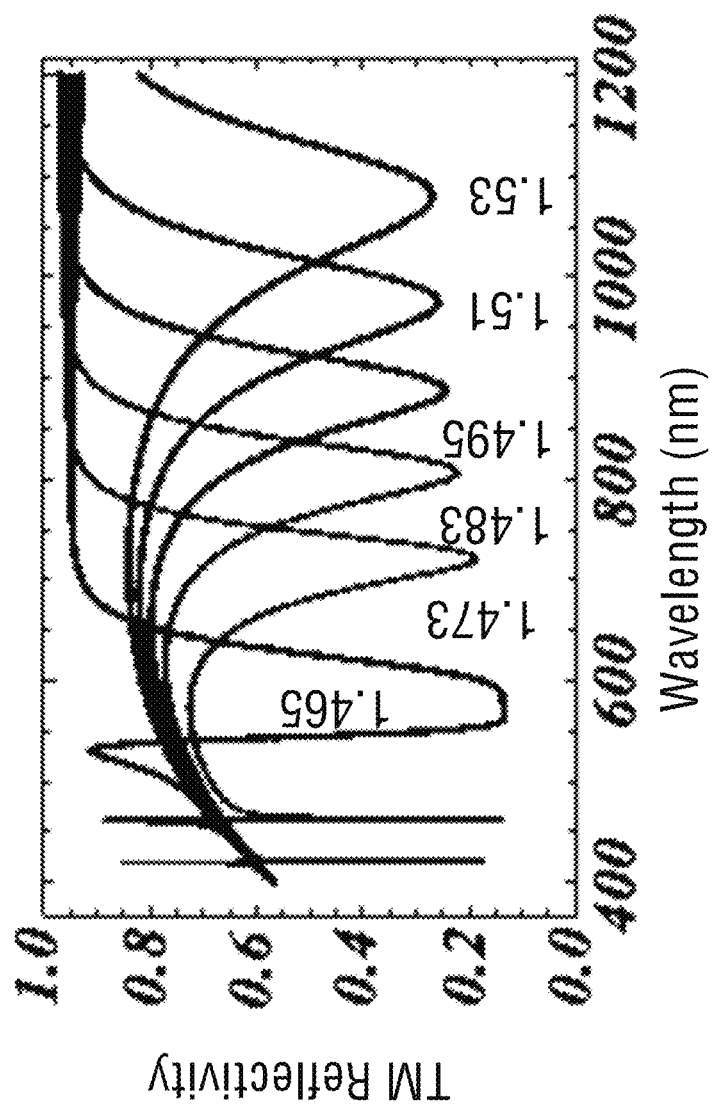
FIGS. 26a-26d show simulations for a lower waveguide layer refractive index.
Figure 26B:
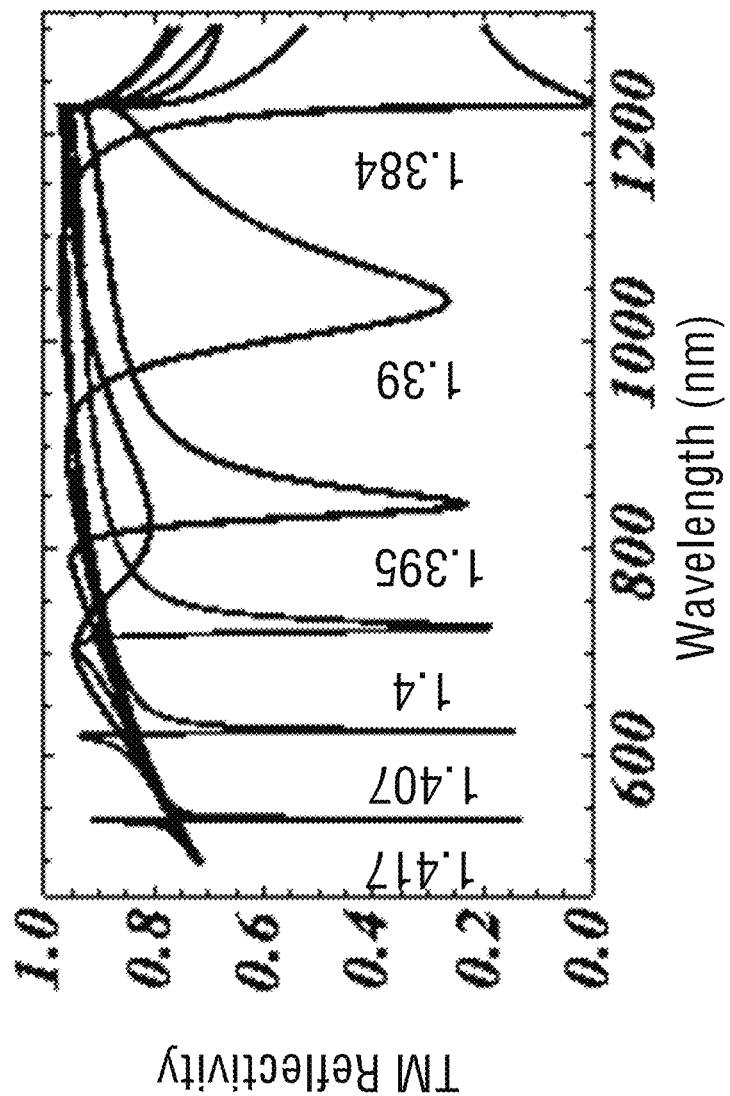
Figure 26C:
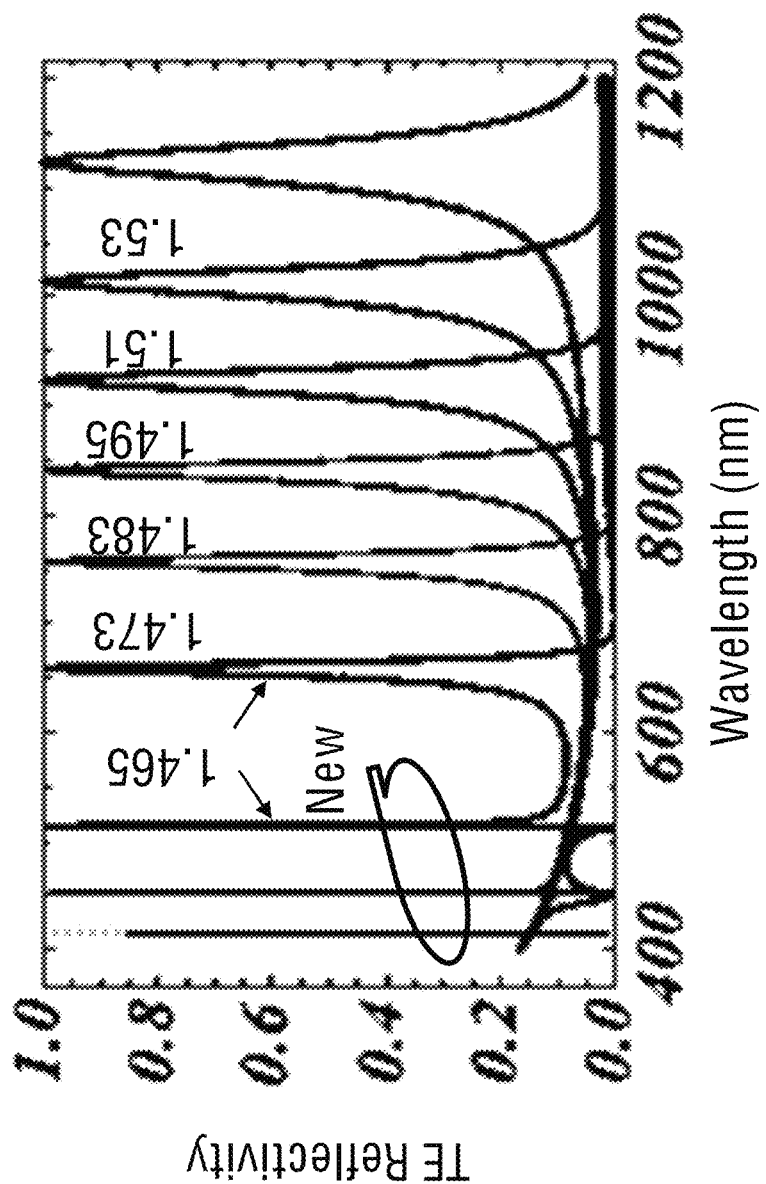
Figure 26D:
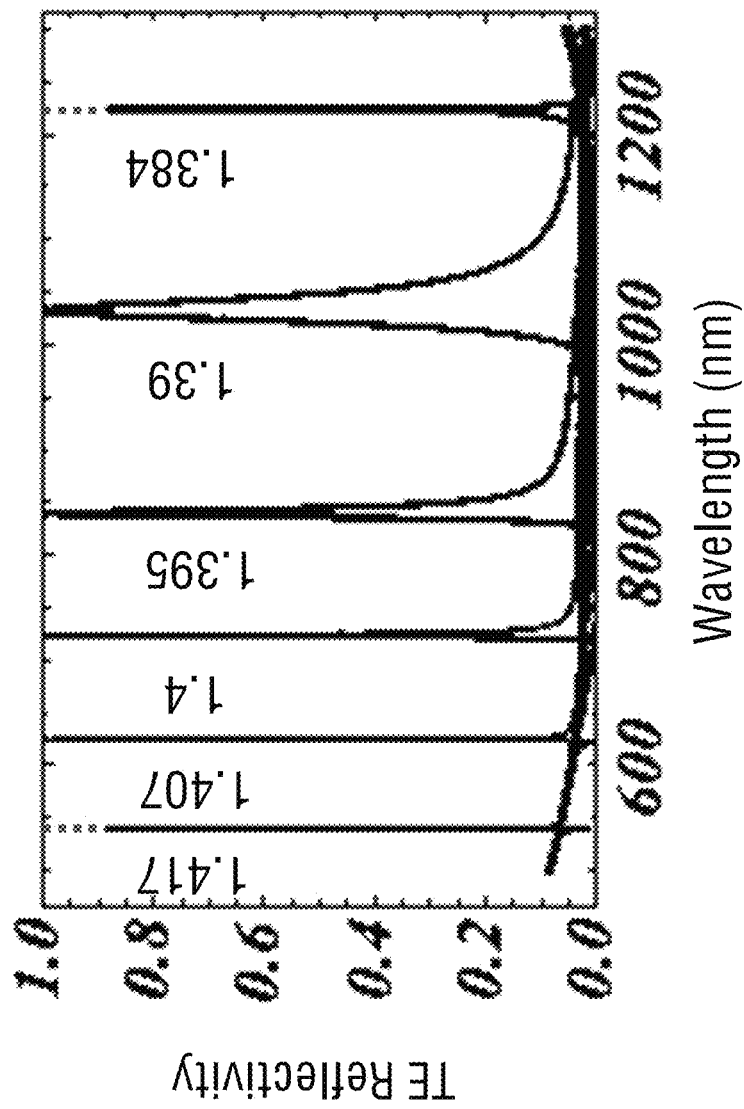

In FIGS. 26*a* and 26*c*, it is clearly seen that the resonance shifts by more than 500 nm upon changing the WG refractive index by 0.06, almost three times higher sensitivity than the case of FIG. 25, meaning the sensitivity increased by around factor of x3-x4. The sensitivity has strong dependence on the different parameters of the structure and optimum conditions can be easily found as the structure contains mainly planar stratified layers which can be modelled using Abeles 2×2 matrix method easily and with the LC layer incorporated possible also with the 4×4 matrix approach.

When the spectral sensitivity increases, the angular one increases drastically showing that in this case tuning within more than 300 nm range occurs within less than a degree change of the incidence angle. Two important phenomena occur as the difference between the refractive index of the waveguide (WG) $n_w$ and that of the cladding $n_c$, $\delta n = n_w - n_c$ decreases:
(i) the WG thickness has to increase in order to bring the peak back to the VIS-NIR range, which is easily understood from the WG mode equation;
(ii) splitting of the peak into two with increasing gap as $\delta n$ increases similar to Rabi type splitting known in other systems such as when coupling occurs between extended and localized plasmons.

The new emerging peaks (FIG. 26*b*) shift in opposite manner to the original ones, meaning they blue shift as the WG refractive index increases and as the WG thickness increases or the incidence angle decreases. Even when $\delta n = n_w - n_c$ is not so large the splitting is over more than 500 nm, so one can use the newly emerging peak tunability for practical applications over broadband.

FIGS. 26*c* and 26(*d*) show for the case of WG thickness $d_w = 2000$ nm and refractive index $n_w = 1.417 - 1.384$ tunability over 700 nm range. Since the required refractive index of the electrooptic layer (LC or others) and its modulation needed are both small, this opens new possibility for ultra-high speed modulators and tuneable filters, even with liquid crystals. Hence this structure, being planar so it is easy to fabricate it in large area and being rich in applicable phenomena certainly triggers further industrial applications.

In yet another embodiment it is possible not to have the first cladding or what we called coupling layer. This requires the WG layer thickness to be larger and then we cannot control the full width at half maximum (FWHM) of the reflected peak.

The FWHM can be controlled by changing the thickness of the coupling layer, the larger it is the shorter the FWHM. Therefore, although this embodiment is easier to fabricate it is not the most preferable. For more detailed analysis on the different variations of the structure the reader is referred to the published article by the inventor (Ibrahim Abdulhalim, Tuneable filter and modulator with controlled bandwidth and wide dynamic range based on planar thin films structure, Optics Express 27(11), 16156-167 (2019)).

Another important embodiment of the resonant structure is as an optically addressed spatial light modulator (OASLM) by having either:

(i) with the waveguide layer being made of photosensitive material to one wavelength range not experiencing the resonant reflection to modulate the resonantly reflected waves of different spectral range where the photosensitive layer is transparent, or (ii) with the waveguide layer being adjacent to a layer photosensitive to one wavelength range not experiencing the resonant reflection to modulate the resonantly reflected waves of different spectral range where the photosensitive layer is transparent.

Another important application of the invented resonance structure is for generating large number of reflected peaks within the same spectral range. This can be done simply by increasing the thickness of the waveguides, as the number of modes that can be excited in the waveguide is proportional to the thickness. In this sense the structure will provide multiple spectral peaks similar to what a Fabry-Perot cavity or passive bandpass filter can provide. Using the LC layer or any other electrooptic material one can then tune the array of spectral peaks, hence a fast spectral modulator can be built, useful for hyperspectral or multispectral imaging when combined with computational spectroscopy techniques.

Figure 27:
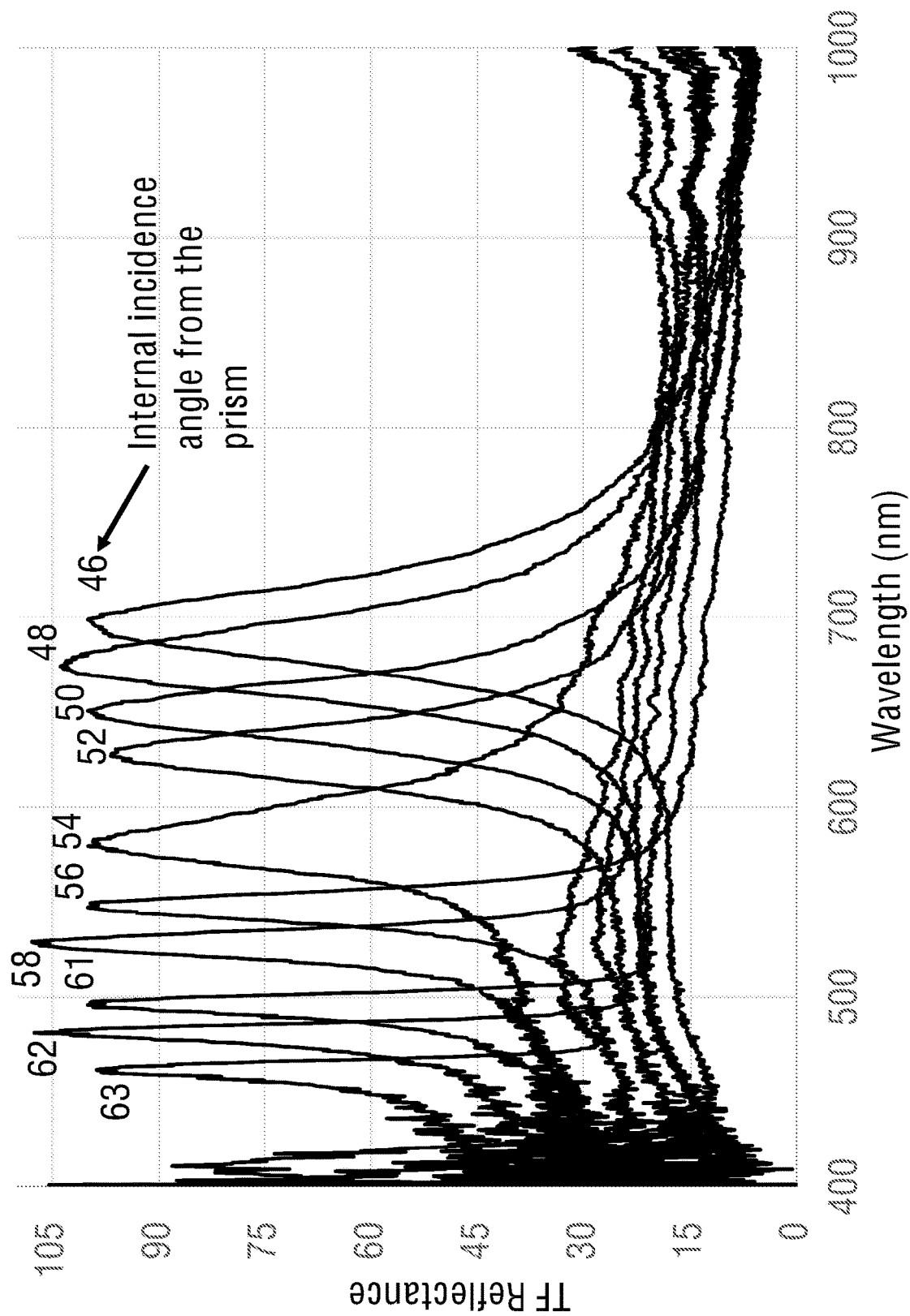
FIG. 27 shows a preliminary experimental result obtained using mechanical scanning of a structure coated on SF11 substrate made of three layers: 6 nm Cr, 180 nm $MgF_2$, and 250 nm $Ga_2O_3$.

Another important embodiment of the invention is the use of the structure as a high-resolution dispersive element due to the strong angular sensitivity of the reflected peak to the incidence angle. Using a collimating beam with angular scanning it is possible to get then a mechanically tuneable filter. Because the scanning required is as small as one degree, this can be a fast mechanically tuned filter. FIG. 27 shows a preliminary experimental result obtained using mechanical scanning of a structure coated on SF11 substrate made of three layers: 6 nm Cr, 180 nm $MgF_2$, 250 nm $Ga_2O_3$. The SF11 substrate was attached to SF11 right angle prism using index matching oil. Although the scanning was done manually and therefore the experimental error is relatively high (estimated +/−10%) the general behaviour observed is as expected from the simulations, thus proving the main concept. For a demonstration with LC layer, the proposed technique of glass etching is used in order to obtain high uniformity of the LC layer thickness. Another embodiment that uses the high dispersion property of the structure is to use a one dimensionally diverging beam diverging in the plane of incidence, which then upon reflection will generate a rainbow of colours or wavelengths corresponding to the resonant peaks as function of angle. The wavelength distribution can then be measured in one shot using a detectors array or camera, hence acting as a spectrometer. Alternatively, a scanned slit can be used at the output to generate the different filtered beams thus acting as a monochromator.

As mentioned above, the liquid crystal composite tuneable device of the present invention can be used in privacy or smart windows. The system comprising the LCD (100) of the present invention for use in such tuneable windows is illustrated in FIG. 28 and further comprises a polariser and an achromatic waveplate (25). The achromatic waveplate (25) is tuneable and designed to manipulate the polarisation state of the incident light and its transmission through the LCD (100), which is in turn controlled via the tuneable achromatic waveplate (25). Helical anisotropic LCDs, such as chiral smectic LCDs, cholesteric LCDs, heliconical LCDs, or helical photonic crystals prepared by the oblique angle deposition technique, are examples of the LCDs of the present invention used in the privacy or smart windows of the embodiments. These helical structures reflect only one circular polarisation which has the same helicity of the helical structure. The circular polarisation having the opposite helicity is transmitted through.

The reflection band centre wavelength is determined by $\lambda_p = Pn_{av}$ with P being the period of the helix and $n_{av}$ is the average refractive index. The full width at half the maximum of the reflected peak is given by FWHM=P$\Delta$n, where $\Delta$n is the local effective birefringence. Therefore, by choosing the helix pitch in the centre of the visible spectrum, i.e., P=550 nm, with the high-birefringence material having $\Delta$n=0.25, the obtained reflection band covers most of the visible range from blue to red. It is also possible to have the pitch in the infrared range to manipulate the infrared part of the solar spectrum.

The polariser shown in FIG. 28 is preferably reflective, such as a metallic wire-grid polariser reflecting one component of the unpolarised solar spectrum, while the other component is transmitted. Nearly 50% reflection from the polariser surface prevents seeing clearly from one side of the privacy window, whereas the other side of the window is completely transparent for seeing due to the light part that transmitted through. The linear polarisation is transmitted through the tuneable achromatic waveplate (25) which can be at several switching states:

1) In the "Switch-ON" state, it acts as an achromatic quarter waveplate, so that the light passing it becomes circularly polarised with the opposite helicity to the helix of the helical LCD. The light is then transmitted through the helical LCD giving a total transmission close to 50%.

2) In the "Switch-OFF" state, it acts as a quarter waveplate with 180-degrees phase retardation shift from the previous state so that the light passing it becomes circularly polarised with the same helicity as the helix and thus reflected with the same helicity. Because the reflected light is at the same helicity, it will be converted to the same linear polarisation (transverse-magnetic, in case of the wire grid) when it passes back through the quarter waveplate and also through the polariser. As a result, the window becomes totally dark from one side and completely reflective, like a mirror, from another side.

3) At any intermediate state, the transmitted light through the polariser becomes mostly elliptically polarised upon passing through the tuneable achromatic waveplate, and the intermediate transmission state can be controlled with an external field (voltage, thermal, optical, magnetic). At these intermediate states, some light reflection from the helical LCD may leak back through the polariser, thus making the window looks coloured, which is an important property from an architectural point of view.

FIGS. 29a-29b shows a prototype privacy window of the present invention with no voltage applied on the left and with applied voltage on the right. FIG. 29a shows this privacy window based on the LCD (100) of the present invention comprising the porous microparticles made of porous silica of about 2-3 µm in size and 4% concentration. The liquid crystal used in this example is Nematic BL036 purchased from Merck, and the gap thickness was 12 µm. FIG. 29b further shows this window based on the LCD of the present invention comprising non-porous silica microspheres of 2.54 µm and 4% concentration. The liquid crystal used in this example was also Nematic BL036 purchased from Merck, and the gap thickness was 12 µm. These two figures compare the use of the porous versus non-porous microparticles in the device of the present invention and clearly demonstrate the superiority of using the porous microparticles over non-porous microparticles.

The tuneable window described herein may also be used to transmit 50% of the visible light of the solar spectrum at all times while controlling the transmission of the infrared light. This can be accomplished by choosing the pitch of the helix to be in the microns range and the achromatic waveplate to operate in the infrared range. This way the window acts as a smart window to keep the house cool during the summer period and warm during the winter period.

As described above, two LCDs of the present invention, having their optic axis preferably oriented at 90 degrees with respect to each other, may be combined in one system. In that case, the incident polarisation is at 45 degrees with respect to the optic axis of the first LCD in the system. Such system, when driven at different voltages applied to the two different LCDs, provides excellent tunability between an achromatic half wave, a quarter waveplate and a full waveplate.

In another embodiment, an achromatic tuneable lens comprises the LCD of the present invention. In yet further embodiment, an imaging system comprises an achromatic tuneable lens, which is a refractive lens, and a diffractive lens, for example the Fresnel-type lens having a negative dispersion. The focal length of this diffractive lens is dependent on the wavelength of the incident light, so that the longer the wavelength is, the shorter the focal length is, which is opposite to the focal length dispersion of a refractive lens.

The action of an element as a lens requires lateral variation of the effective refractive index $n_{\it eff}$. The optical path length difference exists between the rays passing through the centre of the lens and at some distance r from the centre:

$$OPD = 2\pi d(n_c - n_{\it eff}(r))/\lambda$$

The parabolic profile is usually the desired one to minimise aberrations, so that the transmission function of the lens is described by:

$$t(r) = \exp\left[(-jkd)\left(\frac{n_c - n_{\it eff}(r)}{R^2}\right)r^2\right],$$

where R is the radius of the lens, and d is its thickness. The focal length of such refractive lens is given by:

$$f = \frac{R^2}{2d(n_c - n_{\it eff})(r = R))} = \frac{R^2}{2d(n_c - n_p)},$$

where $n_c$ is the refractive index at the centre of the lens (for a positive lens, $n_c - n_p > 0$).

In the LCD of the present invention, or any LC lens, the focal length can be tuned because of the control of $n_e(r)$ with an external field. FIG. 30a shows a parabolic profile of the optical path difference (wavelength) of a refractive lens with the M maximum. Since the dispersion of glasses and LC materials is such that the refractive index decreases as the wavelength increases, it is evident from the above equation of the focal length f that the focal length increases as the wavelength increases. In other words, the blue colour is focused first, then the green colour and then the red colour. This phenomenon is usually observed with the human eye, which is a typical refractive lens.

Figure 30B:
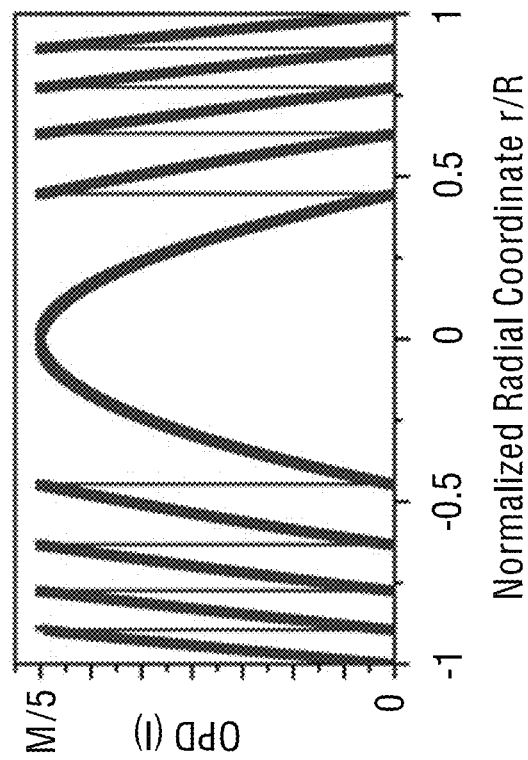
FIG. 30b shows the corresponding segmented profile of the refractive index of a diffractive lens (Fresnel lens).
Figure 30A:
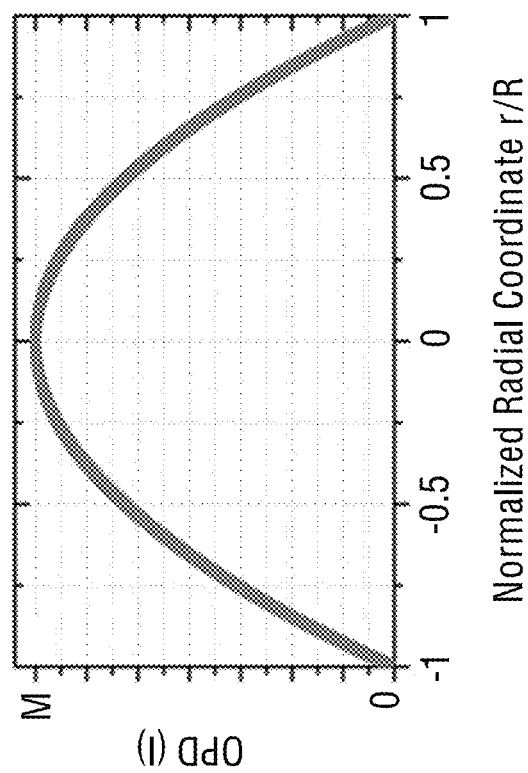
FIG. 30a shows a parabolic profile of the optical path difference of a refractive lens.

Reference is now made to FIG. 30b showing the corresponding segmented profile of the refractive index represented in a wrapped way of a diffractive Fresnel lens. In this presentation, the lens radius is divided into five regions and the phase is wrapped five times so that the maximum optical path difference at each zone is M/5 waves. However, to achieve the same total optical path difference of M waves, the zones become denser as the distance from the centre increases. In the Fresnel lens configuration, the radius of zone j is given by $r_j \approx \sqrt{j \lambda_0 f}$, where $\lambda_0$ is the design wavelength. Because of this specific design for the specific wavelength, the focal length varies with the wavelength in an opposite way to the refractive lens. More specifically it varies according to $$f(\lambda) = \frac{\lambda_0}{\lambda} f(\lambda_0).$$

Therefore, the red colour is now focused first, then the green and then the blue, opposite to the dispersion of the refractive lens. However, the focal length at the design wavelength has the dispersion due to the refractive index dispersion according to the above equation of the focal length f. This means that under assumption the diffractive lens zones are made from a material having the standard refractive index dispersion (index decreases with the wavelength), some compensation may occur, and the final focal length of the Fresnel lens might not have significant dispersion. However, this is not enough in many cases where the achromatic operation is required, for example in imaging systems.

According to the present embodiment, to get the achromatic operation of the imaging system, the diffractive lens is combined with the refractive lens having exactly the same focal length dispersion in magnitude, but opposite in sign. If the two lenses are attached together, then the total focal length is the sum of the two, i.e., $f = f_1 + f_2$. Assuming the glass refractive index dispersion follows the Cauchy equation:

$$n_g(\lambda) = A_1 + \frac{B_1}{\lambda^2} + \frac{C_1}{\lambda^4},$$

where $A_1$, $B_1$ and $C_1$ are constants, the dispersion of the focal length of the diffractive lens behaves approximately as follows:

$$f(\lambda) \approx \frac{\lambda_0}{2d} \frac{R^2}{\left(\lambda A_2 + \frac{B_2}{\lambda} + \frac{C_2}{\lambda^3}\right)},$$

where $A_2$, $B_2$ and $C_2$ are the Cauchy coefficients for the dispersion function of the refractive index of the Fresnel lens material.

Thus, the imaging system of the present embodiment is based on combining the refractive lens with the diffractive lens, so that the total focal length $f_{tot}=f_1(\lambda)+f_2(\lambda)$ is wavelength-independent simply because $f_1(\lambda)$ and $f_2(\lambda)$ have opposite trends with the wavelength. The refractive and diffractive lenses in their achromatic combination should be of the same power to minimise the requirement on the refractive index dispersion relation. It is also possible to choose them both to be made of the liquid crystal composite of the present invention and tune them so that at each external field the focal length obtained is wavelength-independent in a wide spectral range.

The diffractive element zones maybe optimised both in their width and in their optical path difference so that each zone is capable of minimising the chromatic aberration. Assuming the zones corresponding to one designed wavelength are $r_{j2} \approx \sqrt{j\lambda_1 f_2}$, then it is possible to introduce other zones between them that would correspond to a different design wavelength $r_{j2} \approx \sqrt{j\lambda_2 f_2}$. As a result, the obtained generalised Fresnel lens is suitable for wide range of wavelengths. In a particular embodiment of a manufacturing method shown in FIG. 31 and described below, these zones are created as annulus on the transparent electrodes having widths much less than the designed width of the Fresnel zone defined by $r_{j+1}-r_j$. Such Fresnel zone structure provides a further degree of freedom to adjust the phase profile, so as to minimise chromatic aberrations, extend the depth of field and avoid the polarisation dependence. Another advantage of having the fine structure of each Fresnel zone to be created of many annuli is a possibility to create different phase profiles interlaced with each other. Each profile can be designed to be appropriate for a specific wavelength region or specific focus region, so that the extended depth of field and achromatic operations is obtained.

The optimum phase profiles can be found using large variety of optimisation algorithms known in the art such as neural nets, simulated annealing, and machine learning. In yet further embodiment, part of the sub-Fresnel zones is nano-patterned with lines in one direction, but other sub-Fresnel zones are patterned with lines in the perpendicular direction. This is important because the LC molecules orientation follows the nano-grid pattern direction, and therefore, some regions of the Fresnel lens provide focusing for one polarisation (for instance, transverse-electric), and other regions with the perpendicular orientation provide tuneable focusing of the orthogonal polarisation (such as transverse-magnetic). The nano-grid pattern can be created with variety of lithographic techniques, nanoimprinting, or irradiation with femto-second- or ultrashort-pulsed lasers. The nano-grid pattern creates anisotropic surface tension which causes the LC molecules to be aligned in one direction. There are other techniques for generating the surface tension anisotropy, for example using mechanical rubbing in one direction, depositing material at oblique incidence, coating with black phosphorous layer or transition metal sulphides, coating the surface with photosensitive polymer layer or polyimide, or chalcogenide glass, and then irradiating it with polarised UV or blue light.

Figure 31:
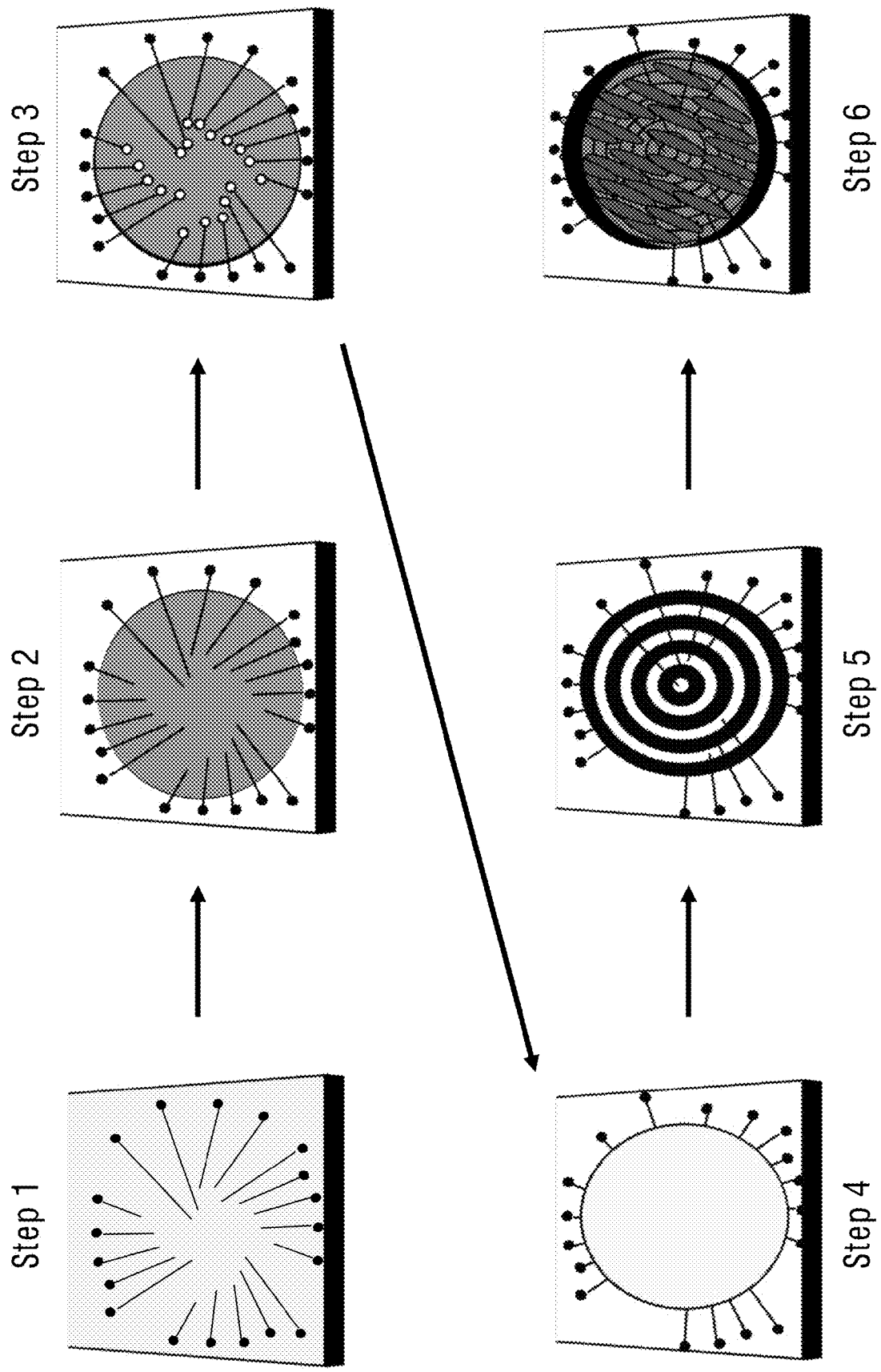
FIG. 31 illustrates the method for manufacturing the liquid crystal composite tuneable device of the present invention.

Reference is now made to FIG. 31 describing the method for manufacturing the liquid crystal composite tuneable device of the present invention. In order to make electrical connections to the different electrodes in a way that they do not disturb the transmitted light intensity or wave-front, the manufacturing method comprises the following steps:
(1) Deposition of a wiring pattern made from indium tin oxide or other TCE material on each of the transparent panels. In this step, the connecting wires are created on the glass transparent panel;
(2) Deposition of an insulation layer on top of the connecting wires. In this step, an insulating transparent layer, such as silicon oxide, is deposited on top of the wires, leaving only the external edges of the wires exposed for connections;
(3) Creation of through holes or blind vias in the insulation layer near the edges of the connecting wires;
(4) Deposition of the transparent conductive electrode layer made for example from titanium oxide on top of the insulation layer;
(5) Formation of the rings annulus pattern on top of the transparent conductive electrode layer, so that each ring is connected to one connecting wire; and
(6) Assembly of the LCD of the present invention with the liquid crystal layer introduced between the two transparent panels.

In yet another embodiment, the annular regions and sub-regions are replaced with rectangular lines or sub-lines so that the tuneable achromatic lens becomes a tuneable achromatic cylindrical lens. Once can also simplify the driving by combining two such achromatic cylindrical lenses oriented at 90 degrees with respect to each other. Another advantage of using the rectangular regions instead of annular ones is the ease of manufacturing and electrical connections.

While certain features of the present application have been illustrated and described herein, many modifications, substitutions, changes, and equivalents will be apparent to those of ordinary skill in the art. It is, therefore, to be understood that the appended claims are intended to cover all such modifications and changes as fall within the true spirit of the present application.

The invention claimed is:

1. A fast wide dynamic range, controlled-bandwidth tuneable filter and modulator of an incident light beam comprising a liquid crystal composite and a reflective planar multilayer resonant structure, said tuneable filter and modulator further comprising:
   (a) a coupling medium;
   (b) multilayer structure coated either directly on the coupling medium, or on a glass substrate attached to the coupling medium with an index matching fluid, said multilayer structure comprising:
      an ultrathin absorbing layer acting as a medium to excite a broadband lossy wave;
      a first transparent clad layer of low refractive index;
      a first transparent alignment layer;
      a transparent waveguide layer made of tuneable optical path material either refractive index or thickness tuneable;
      a second alignment layer;
      a second transparent clad layer of low refractive index;
      a transparent electrode layer as a second electrode layer; and
      a top transparent semi-infinite substrate of low refractive index;
   characterised in that:
      (i) said ultrathin absorbing layer is made of highly absorbing metal, semiconductor, or semimetal so it can act both as a first electrode in addition to being a medium for exciting the broadband lossy wave;

(ii) said first transparent clad layer of low refractive index is configured to control the bandwidth of the filter by varying its thickness;

(iii) said tuneable refractive index waveguide layer is a liquid crystal composite with porous microparticles of less than 0.1% concentration to prevent significant scattering and provide fast refractive index modulation;

(iv) said refractive index waveguide layer is made of a thermooptic, electrooptic, photosensitive or magnetooptic material;

(v) said electrode layers are patterned into pixels, and an external field is applied to each pixel separately or to a group of pixels, thereby resulting in said device being pixelated, and said each pixel is adjusted to modify wavelength, intensity, or phase of an optical beam, thereby turning said liquid crystal composite tuneable device into a spatial light modulator.

2. The tuneable filter and modulator of claim 1, wherein said coupling medium is a high refractive index prism, inline prism, grating or optical fibre.

3. The tuneable filter and modulator of claim 1, wherein the liquid crystal is in any of the transparent non scattering modes such as: nematic, twisted, vertically aligned, planarly aligned, in-plane switching mode, hybrid, smectic, chiral smectic, cholesteric, blue phase, nanoPDLC, dual frequency, ferroelectric, anti-ferroelectric, flexoelectric, electroclinic, conical, polymeric or ferronematic LCs.

4. The tuneable filter and modulator of claim 1, wherein the tuneable refractive index waveguide material is made of solid thin film electrooptic crystal, electrooptic polymer, piezoelectric or magnetooptic film, simplified by removing the top low index substrate.

5. The tuneable filter and modulator of claim 1 is tuned by angular scanning, wherein the structure is simplified by having the waveguide layer not limited to tuneable thermooptic, electrooptic, photosnesitive or magnetooptic and no need for the second cladding, the second electrode and the top refractive low index substrate.

6. The tuneable filter and modulator of claim 1, wherein the incident light beam is diverging in the incidence plane so that a rainbow of different colours or wavelengths is obtained at the output, each wavelength can then be detected in parallel using an array of detectors or using single detector through slit and mechanical scanning.

7. The tuneable filter or modulator of claim 1 further comprising a polarisation independent configuration to obtain a polarisation-independent modulator and tuneable filter.

8. The tuneable filter or modulator of claim 1, wherein first clad layer is absent resulting in the tuneable filter or modulator without control of the bandwidth.

9. The tuneable filter and modulator of claim 1, wherein the difference between the refractive indices of the waveguide layer and the cladding layer is small enough, and the waveguide layer thickness is large enough (above few wavelengths) to generate Rabi splitting for higher sensitivity and blue shift of the resonance, as the waveguide optical path increases thus allowing the use of fast materials, fast thermooptic, fast electrooptic, fast magnetooptic, fast photosensitive or fast piezoelectric effects that provide small refractive index or thickness modulation to generate wide tuning range.

10. The tuneable filter and modulator of claim 9, wherein the difference between the refractive indices of the waveguide layer and the cladding layer is less than 0.1, and the waveguide layer thickness is above few wavelengths.

11. The tuneable filter and modulator of claim 1 having large enough waveguide layer thickness to generate multiple reflection peaks within the spectral range of interest so to act as spectral modulator for hyperspectral or multispectral information extraction when combined with computational spectroscopy techniques.

12. The tuneable filter and modulator of claim 11, wherein the waveguide layer thickness is more than few wavelengths to generate multiple reflection peaks within the spectral range of interest so to act as spectral modulator for hyperspectral or multispectral information extraction when combined with computational spectroscopy techniques.

13. The tuneable filter and modulator of claim 1 acting as optically addressed spatial light modulator with the waveguide layer being made of photosensitive material to one wavelength range not experiencing the resonant reflection to modulate the resonantly reflected waves of different spectral range in where the photosensitive layer is transparent.

14. The tuneable filter and modulator of claim 1 acting as optically addressed spatial light modulator with the waveguide layer being adjacent to a layer photosensitive to one wavelength range not experiencing the resonant reflection to modulate the resonantly reflected waves of different spectral range in where the photosensitive layer is transparent.

* * * * *